US009891057B2

(12) United States Patent
Goto et al.

(10) Patent No.: US 9,891,057 B2
(45) Date of Patent: Feb. 13, 2018

(54) INFORMATION PROCESSING DEVICE, COMPUTER READABLE STORAGE MEDIUM, AND MAP DATA UPDATING SYSTEM

(71) Applicant: KABUSHIKI KAISHA TOYOTA CHUO KENKYUSHO, Nagakute-shi, Aichi-ken (JP)

(72) Inventors: Kunihiro Goto, Nagakute (JP); Koichiro Yamaguchi, Nagakute (JP); Kiyosumi Kidono, Nagakute (JP); Junichi Meguro, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 15/064,326

(22) Filed: Mar. 8, 2016

(65) Prior Publication Data

US 2016/0282127 A1 Sep. 29, 2016

(30) Foreign Application Priority Data

Mar. 23, 2015 (JP) .................................. 2015-059927
Feb. 26, 2016 (JP) .................................. 2016-036128

(51) Int. Cl.
*G01C 21/30* (2006.01)
*G01S 19/42* (2010.01)
(Continued)

(52) U.S. Cl.
CPC ........... *G01C 21/30* (2013.01); *G01C 21/005* (2013.01); *G01S 5/0027* (2013.01); *G01S 19/48* (2013.01)

(58) Field of Classification Search
CPC ..... G01C 21/30; G01C 21/005; G01S 5/0027; G01S 19/48
See application file for complete search history.

(56) References Cited

U.S. PATENT DOCUMENTS 7,363,151 B2 * 4/2008 Nomura ................. G01C 21/32
340/995.14
8,103,448 B2 * 1/2012 Nomura ................. G01C 21/32
340/995.11
(Continued)

FOREIGN PATENT DOCUMENTS

JP 2002-213966 * 7/2002
JP 2002-298148 * 10/2002
(Continued)

*Primary Examiner* — Michael J Zanelli
(74) *Attorney, Agent, or Firm* — Oliff PLC

(57) ABSTRACT

A position measurement section of an on-board device measures a position of a vehicle. A travelling position identification section identifies a travelling position of the vehicle on map data based on the measured position of the vehicle and the map data. Then, a position error measurement section computes error information indicating the difference between the measured position of the vehicle and travelling position. Then, a communications section transmits the error information and the position information to a server. A communication section of the server receives the transmitted error information and position information. An error registration section stores the error information in an error database in association with the received position information. Then, for each respective item of position information, a priority level setting section sets a priority level corresponding to the position information based on the error information stored in the error database.

18 Claims, 36 Drawing Sheets

(51) Int. Cl.
*G01C 21/00* (2006.01)
*G01S 19/48* (2010.01)
*G01S 5/00* (2006.01)

(56) References Cited

U.S. PATENT DOCUMENTS

| | | | | |
|---|---|---|---|---|
| 8,284,995 | B2* | 10/2012 | Diaz | G08G 1/0104 |
| | | | | 382/104 |
| 9,103,680 | B2 | 8/2015 | Kojima et al. | |
| 9,460,615 | B2* | 10/2016 | Basalamah | G08G 1/0112 |
| 2007/0198177 | A1* | 8/2007 | Yamada | G01C 21/30 |
| | | | | 701/412 |
| 2008/0162041 | A1 | 7/2008 | Nakamura | |
| 2009/0125235 | A1* | 5/2009 | Chen | G01C 21/32 |
| | | | | 701/414 |
| 2009/0228204 | A1* | 9/2009 | Zavoli | G01C 21/30 |
| | | | | 701/532 |
| 2013/0345955 | A1 | 12/2013 | Tashiro et al. | |
| 2014/0379254 | A1* | 12/2014 | Miksa | G01C 21/32 |
| | | | | 701/450 |
| 2015/0317900 | A1 | 11/2015 | Tashiro et al. | |

FOREIGN PATENT DOCUMENTS

| | | |
|---|---|---|
| JP | 2008-164824 A | 7/2008 |
| JP | 5029009 B2 | 9/2012 |
| JP | 5315363 B2 | 10/2013 |
| JP | 2014-130529 A | 7/2014 |
| JP | 2014-153236 A | 8/2014 |

* cited by examiner

US 9,891,057 B2

INFORMATION PROCESSING DEVICE, COMPUTER READABLE STORAGE MEDIUM, AND MAP DATA UPDATING SYSTEM

CROSS-REFERENCE TO RELATED APPLICATION

This application is based on and claims priority under 35 USC 119 from Japanese Patent Application No. 2015-059927 filed Mar. 23, 2015 and No. 2016-036128 filed Feb. 26, 2016.

All publications, patent applications, and technical standards mentioned in this specification are herein incorporated by reference to the same extent as if each individual publication, patent application, or technical standard was specifically and individually indicated to be incorporated by reference.

FIELD OF THE INVENTION

The present invention relates to an information processing device, a computer readable storage medium, and a map data updating system.

BACKGROUND ART

Conventional technology is known that detects changes to map data and implements updating (Japanese Patent No. 5315363, and Japanese Patent Application Laid-Open (JP-A) No. 2014-153236). In a road network analysis system described by Japanese Patent No. 5315363, probe information from plural probe cars is accumulated daily, and a change in traffic volume is computed for each road for each day. Then, when a road is detected for which there is a remarkable change in traffic volume before and after an identified reference day, it is determined that there has been a major road network change in that area that influences traffic, and that road is considered a change-related road. Next, routes between terminal points of plural change-related roads are searched for, routes with large overlaps between the found route and the change-related road are selected, and change-related roads and their terminal points are identified as related by being influenced by a single common cause. Thus, using changes in traffic volume and route searching to identify related locations enables survey route candidates to be effectively set for a possible field study of major road network changes.

In a road network analysis device described by JP-A No. 2014-153236, for specific portions constituting a road network, the traffic volume of vehicles passing through the portion is found from plural items of the probe information accumulated over a specific time period. A discontinuity incidence rate that is an incidence ratio of events in which vehicle positions become discontinuous is also found similarly. Changes in the road network are then detected based on the degree of change in the traffic volume and the degree of change in the discontinuity incidence rate between two different periods in the specific portions constituting the road network. If changes in the road network can be detected, these can be employed in road network surveys and the like.

A new road determination device described by Japanese Patent No. 2014-130529 performs map matching by identifying a travel path of a vehicle based on acquired probe information, and correcting the position of the vehicle to a position on the map when a link is present within a positional error range of the position of the vehicle on the travel path. Then, a travel path that could not be matched to a link in the map matching is extracted as a diverging path. Moreover, the extracted diverging path is determined to be a new road.

A map information generation system described by Japanese Patent No. 5029009 transmits travel path information as probe data to a map distribution center when a vehicle that is a probe car is travelling along a road not included in navigation map data. The map distribution center that has received the travel path information from respective vehicles accumulates the received data, and also groups together travel path information from travelling the same road and generates new road information related to one new road for each group.

The technologies described by Japanese Patent No. 5315363 and JP-A No. 2014-153236 mentioned above are methods of measuring traffic volumes within periods of given length on respective existing roads by associating probe information with road network information, and detecting changes in the road network from changes in traffic volume.

However, there is sometimes a need to carry out a repeat survey in order to determine sites at which change occurred, since changes in traffic volume accompanying changes to roads are highly likely to extend to roads in a range within the wider surrounding area.

Moreover, a road change can not necessarily be detected from traffic volume since traffic volume also arises from causes other than changes in roads (for example, the opening of a new commercial facility).

Moreover, the technology described by JP-A No. 2014-153236 mentioned above employs links in map data that are not continuous for information regarding passage of probe vehicles, and detects new roads with higher precision than when traffic volumes are employed alone. Although there is a possibility that the presence of new roads is detectable by this method, it is difficult to detect changes such as newly established pedestrian crossings or the installation of new signage by this method.

The technologies described in Japanese Patent No. 2014-130529 and Japanese Patent No. 5029009 mentioned above use probe vehicle travel paths on a map other than those of known links, vehicle speeds, and the like to detect new roads and to create map data. Again, although there is a possibility that the presence of new roads is detectable by these methods, it is difficult to detect changes such as newly established pedestrian crossings or the installation of new signage by these methods.

The present invention was arrived at in consideration of the above circumstances.

SUMMARY

According to a first aspect of the invention, an information processing device is configured including: a difference registration unit that associates (A) difference information indicating a difference between (a) a position of a moving object measured based on a satellite signal transmitted from a positioning satellite and (b) a travelling position of the moving object on map data identified based on (i) at least one of the position of the moving object or external environment information indicating an environment of surroundings of the moving object and (ii) the map data, with (B) position information indicating at least one of the position of the moving object or the travelling position, and stores the associated information in a difference database; and an update information setting unit that, for each item of the position information, sets information indicating whether or not the map data, which is associated with the item of position information, is to be updated, based on the difference information associated with the position information stored in the difference database.

According to a second aspect of the invention, an information processing device is configured including: a difference registration unit that associates (A) difference information indicating a difference between (a) a travel path of a moving object generated from a time series of travelling positions of the moving object on map data, the travel path being identified based on external environment information indicating an environment of surroundings of the moving object and on the map data, and (b) an integrated path of the moving object generated from a time series of motion amounts of the moving object generated based on at least one of the external environment information or a travelling state of the moving object, with (B) position information indicating a travelling position, and stores the associated information in a difference database; and an update information setting unit that, for each item of the position information, sets information indicating whether or not the map data, which is associated with the item of position information, is to be updated based on the difference information associated with the position information stored in the difference database.

According to a third aspect of the invention, an information processing device is configured including: a difference registration unit that associates (A) difference information indicating a difference between (a) at least one of surrounding environment information generated from external environment information indicating an environment of surroundings of a moving object or a positioning path of the moving object generated from a position of the moving object, and (b) map data, the difference information being generated according to at least one of (i) a result of a comparison between the position of the moving object measured based on a satellite signal transmitted from a positioning satellite and road information included in the map data, or (ii) an identification result for a travelling position of the moving object on the map data identified from the external environment information and the map data, with (B) position information indicating at least one of a position of the moving object or the travelling position, and stores the associated information in a difference database; and an update information setting unit that, for each item of the position information, sets information indicating whether or not the map data, which is associated with the item of position information, is to be updated, based on the difference information associated with the position information stored in the difference database.

BRIEF DESCRIPTION OF THE DRAWINGS

Exemplary embodiments of the present invention will be described in detail based on the following figures, wherein.

DETAILED DESCRIPTION OF THE INVENTION

Detailed explanation follows regarding exemplary embodiments, with reference to the drawings. In the exemplary embodiments, explanation is given regarding examples of a map data updating system that receives error information transmitted from on-board devices, and sets information indicating whether or not to update a map database based on the error information. Moreover, explanation is given regarding examples of cases in which a vehicle serves as a moving object in the exemplary embodiments. The map data updating systems of the exemplary embodiments include an on-board device installed to a vehicle, and a server.

First Exemplary Embodiment

Figure 1:
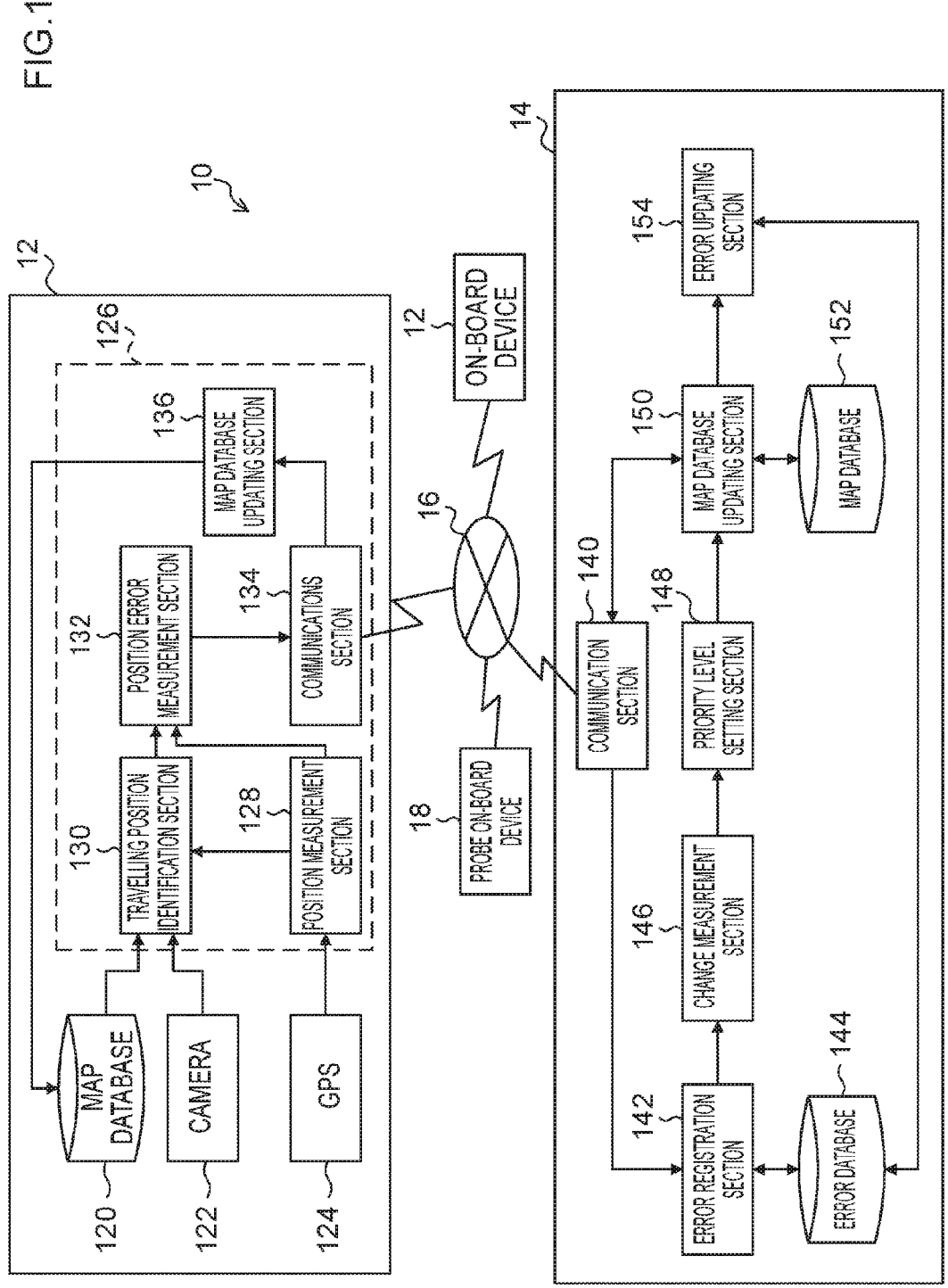
FIG. 1 is a block diagram illustrating a map data updating system according to a first exemplary embodiment.

Configuration of Map Data Updating System According to First Exemplary Embodiment As illustrated in FIG. 1, a map data updating system 10 according to a first exemplary embodiment includes an on-board device 12, a server 14, and a probe on-board device 18. The on-board device 12, the server 14, and the probe on-board device 18 are connected to each other via a network 16 such as the internet. The on-board device 12 is an example of an installed device, and the server 14 is an example of an information processing device. The on-board device 12 is installed to a vehicle. The server 14 receives error information transmitted from the on-board device 12, and updates a map database according to the error information. The probe on-board device 18 transmits, to the server 14, sensor information for updating map data based on a signal output from the server 14.

On-Board Device 12

The on-board device 12 includes a map database 120, a camera 122, a GPS 124, and a computer 126. The on-board device 12 is installed to the vehicle. The camera 122 is an example of an external environment detection unit.

Map data is stored in the map database 120. The camera 122 captures images of the surroundings of the vehicle. The GPS 124 receives a satellite signal transmitted from a positioning satellite. The computer 126 computes error information based on the image of the surroundings of the vehicle captured by the camera 122, and the satellite signal received by the GPS 124.

The map data is stored in the map database 120. Image information or three-dimensional information, recording a surrounding environment that includes a road surface, is recorded in the map data. In the present exemplary embodiment, explanation follows regarding an example of a case in which an image of the road surface on which the vehicle travels is recorded for each site on the map data. Moreover, the map data stored in the map database 120 is the same as map data stored in a map database 152 of the server 14, described later.

The camera 122 successively captures images of the surroundings of the vehicle as external environment information indicating the surrounding environment of the vehicle.

The computer 126 includes a CPU, RAM, and ROM storing a program for executing a transmission processing routine, described later, and is functionally configured as follows. The computer 126 includes a position measurement section 128, a travelling position identification section 130, a position error measurement section 132, a communications section 134, and a map database updating section 136. The position error measurement section 132 is an example of a difference information generation unit. The road surface image is an example of surrounding environment information generated from the external environment information.

The position measurement section 128 measures the position of the vehicle based on the satellite signal received by the GPS 124. The travelling position identification section 130 identifies a travelling position of the vehicle on the map data based on the position of the vehicle measured by the position measurement section 128 and the surrounding image of the surroundings of the vehicle captured by the camera 122. The position error measurement section 132 computes error information that indicates the difference between the position of the vehicle measured by the position measurement section 128 and the travelling position of the vehicle identified by the travelling position identification section 130. The communications section 134 transmits, to the server 14, the error information computed by the position error measurement section 132, and position information. The map database updating section 136 updates the map data stored in the map database 120 according to map data update information transmitted from the server 14.

The position measurement section 128 measures the position of the vehicle based on the satellite signal received by the GPS 124.

The travelling position identification section 130 identifies a travelling position of the vehicle on the map data, based on the position of the vehicle measured by the position measurement section 128 and the surrounding image of the surroundings of the vehicle captured by the camera 122, and based on the map data stored in the map database 120.

More specifically, the travelling position identification section 130 generates a road surface image that is the surrounding image of the vehicle surroundings, captured by the camera 122, projected onto the road surface. Then, the travelling position identification section 130 identifies a travelling position of the vehicle on the map data by collating the road surface image on the map data obtained from the map database 120 corresponding to the position of the vehicle measured by the position measurement section 128, with the generated road surface image.

Figure 2:
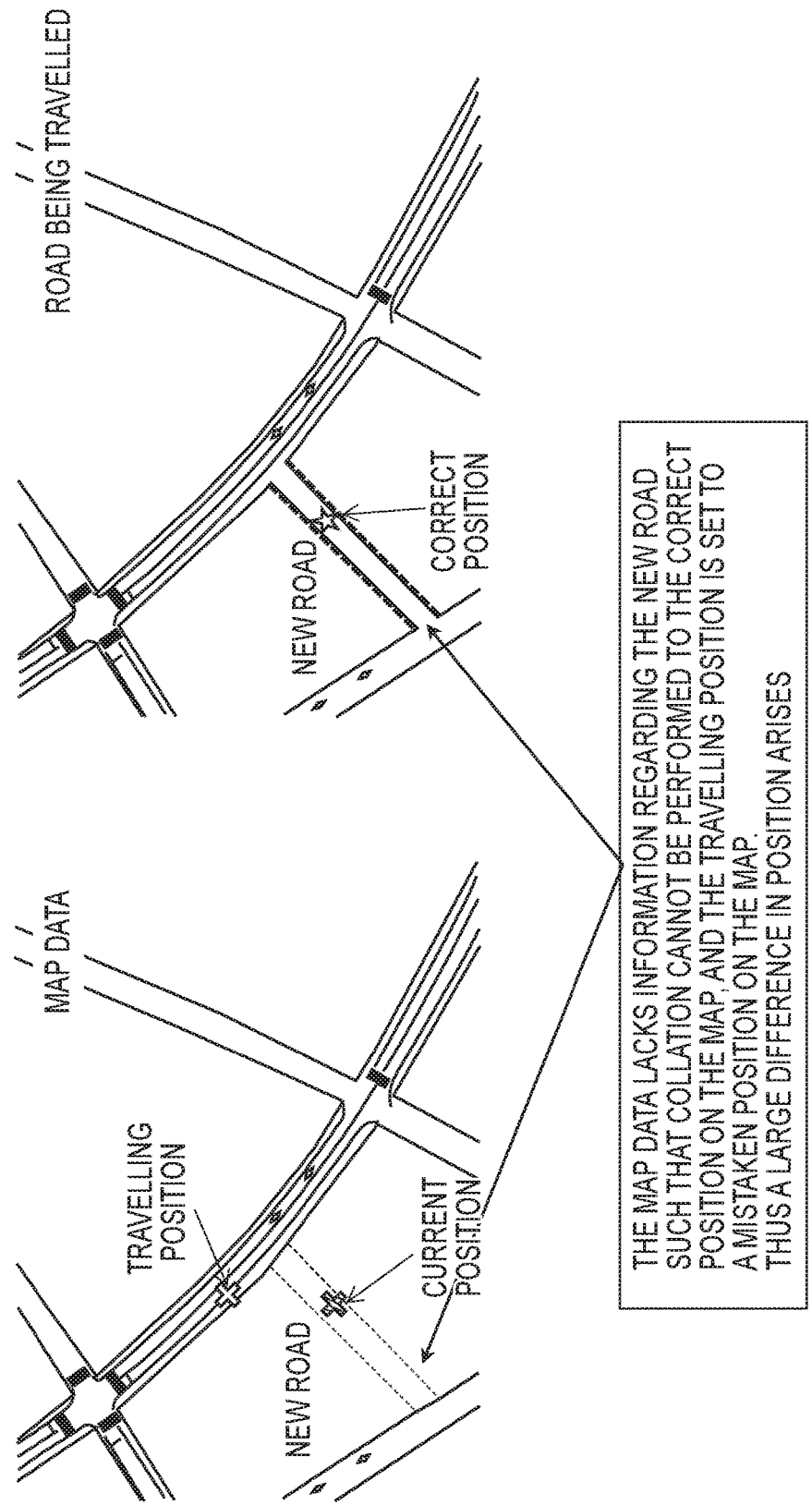
FIG. 2 is a diagram illustrating an example indicating the difference between a travelling position and a position measured by GPS.

FIG. 2 is a diagram for explaining error information related to positions given due to changes to road shape. As illustrated in FIG. 2, when the road that the vehicle is currently travelling along is a newly constructed road, the current travelling position does not exist on the map data, such that the travelling position identified by the travelling position identification section 130 is a mistaken position. Thus, as illustrated in FIG. 2, there is expected to be a large difference between the position of the vehicle measured by the position measurement section 128 and the travelling position of the vehicle on the map data identified by the travelling position identification section 130.

Figure 3:
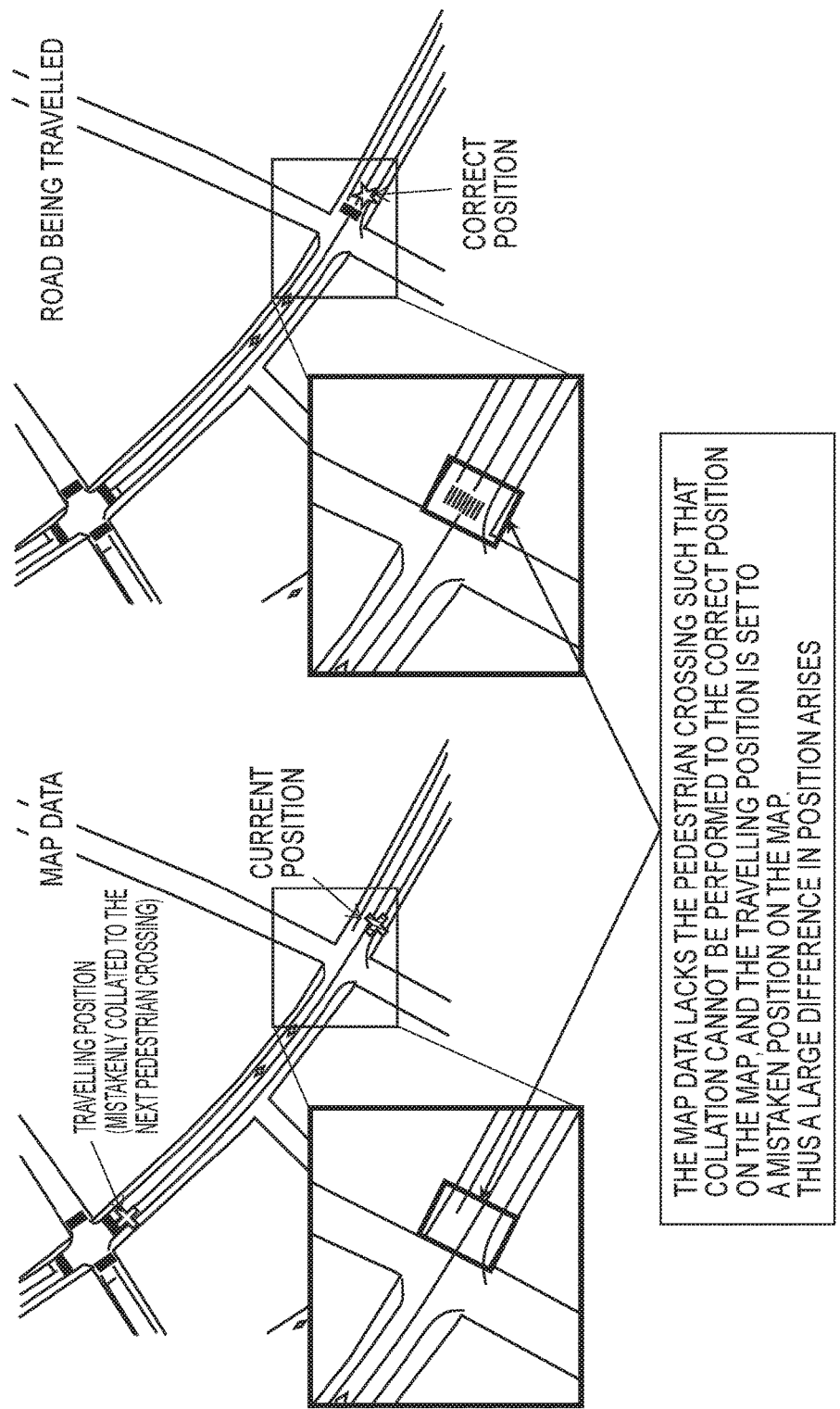
FIG. 3 is a diagram illustrating another example indicating the difference between a travelling position and a position measured by GPS.

Moreover, FIG. 3 is a diagram for explaining error information related to position caused by changes in road surface patterns. As illustrated in FIG. 3, in cases in which the road surface appearance differs between the map data and the road being travelled, the road surface pattern indicated by the road surface image on the map data and the road surface pattern indicated by the road surface image obtained from the surrounding image during travelling are collated at a mistaken position. Therefore, as illustrated in FIG. 3, a large difference is expected to arise between the travelling position of the vehicle on the map data identified by the travelling position identification section 130, and the position of the vehicle measured by the position measurement section 128.

The position error measurement section 132 computes difference information indicating the difference between the position of the vehicle measured by the position measurement section 128, and the travelling position of the vehicle identified by the travelling position identification section 130. In the present exemplary embodiment, the position error measurement section 132 computes, as the difference information, the difference between the position of the vehicle measured by the position measurement section 128 and the travelling position of the vehicle identified by the travelling position identification section 130 at the present moment. Note that average values or cumulative values of differences in positions at uniform intervals (for example, these may be time periods or travelled distances) can be taken as position errors. The error information is an example of difference information.

Moreover, the difference between the position of the vehicle measured by the position measurement section 128 and the travelling position of the vehicle identified by the travelling position identification section 130 may be found as the straight line distance between two sites, or may be found as a difference split into components of latitude and longitude. Moreover, a difference that has been split into a travelling direction component and a component in a direction orthogonal thereto may also be found. In the present exemplary embodiment, the straight line distance between two sites is computed as the error information.

A large volume is collected of data that have large errors at places where discrepancies arise for the error information computed by the position error measurement section 132, transmitted to the server 14, and aggregated and analyzed by the server 14. Locations needed to update the map data can thereby be identified, enabling update processing for the map data to be performed efficiently.

The communications section 134 transmits, to the server 14, the error information computed by the position error measurement section 132, and the position information indicating position of the vehicle measured by the position measurement section 128 and the travelling position of the vehicle identified by the travelling position identification section 130. The communications section 134 also receives map data update information transmitted from the server 14. Note that one alone out of the position of the vehicle measured by the position measurement section 128, or the travelling position of the vehicle identified by the travelling position identification section 130, may be employed as the position information.

The map database updating section 136 updates the map data stored in the map database 120 based on the map data update information received by the communications section 134.

Server 14

The server 14 is configured as a server including a CPU, ROM storing, for example, a program for implementing a processing routine, described later, RAM that temporarily stores data, memory serving as a storage unit, a network interface, and the like. The server 14 can be functionally represented as being configured by a communication section 140, an error registration section 142, an error database 144, a change measurement section 146, a priority level setting section 148, a map database updating section 150, a map database 152, and an error updating section 154. The communication section 140 is an example of a reception unit, the error registration section 142 is an example of a difference registration unit, the priority level setting section 148 is an example of an update information setting unit, and the error database 144 is an example of a difference database.

The communication section 140 receives the error information and the position information transmitted from the on-board device 12. The error registration section 142 registers the error information received by the communication section 140 in the error database 144. Error information is stored in the error database 144. The change measurement section 146 measures the amount of change in the error information stored in the error database 144. The priority level setting section 148 sets a priority level for a map data update based on the amount of change measured by the change measurement section 146. The map database updating section 150 updates the map data based on the priority level set by the priority level setting section 148. The map data is stored in the map database 152. The error updating section 154 updates the error information stored in the error database 144.

The communication section 140 receives the error information and the position information transmitted from the on-board device 12 of the vehicle. The communication section 140 also transmits, to the on-board device 12, the map data update information output from the map database updating section 150, described later. The communication section 140 also transmits request information to the probe on-board device 18 requesting sensor information for the area at which the map data is to be updated. The communication section 140 also receives the sensor information transmitted from the probe on-board device 18.

The error registration section 142 stores the error information in the error database 144 in association with a site corresponding to the position information received by the communication section 140.

Figure 4:
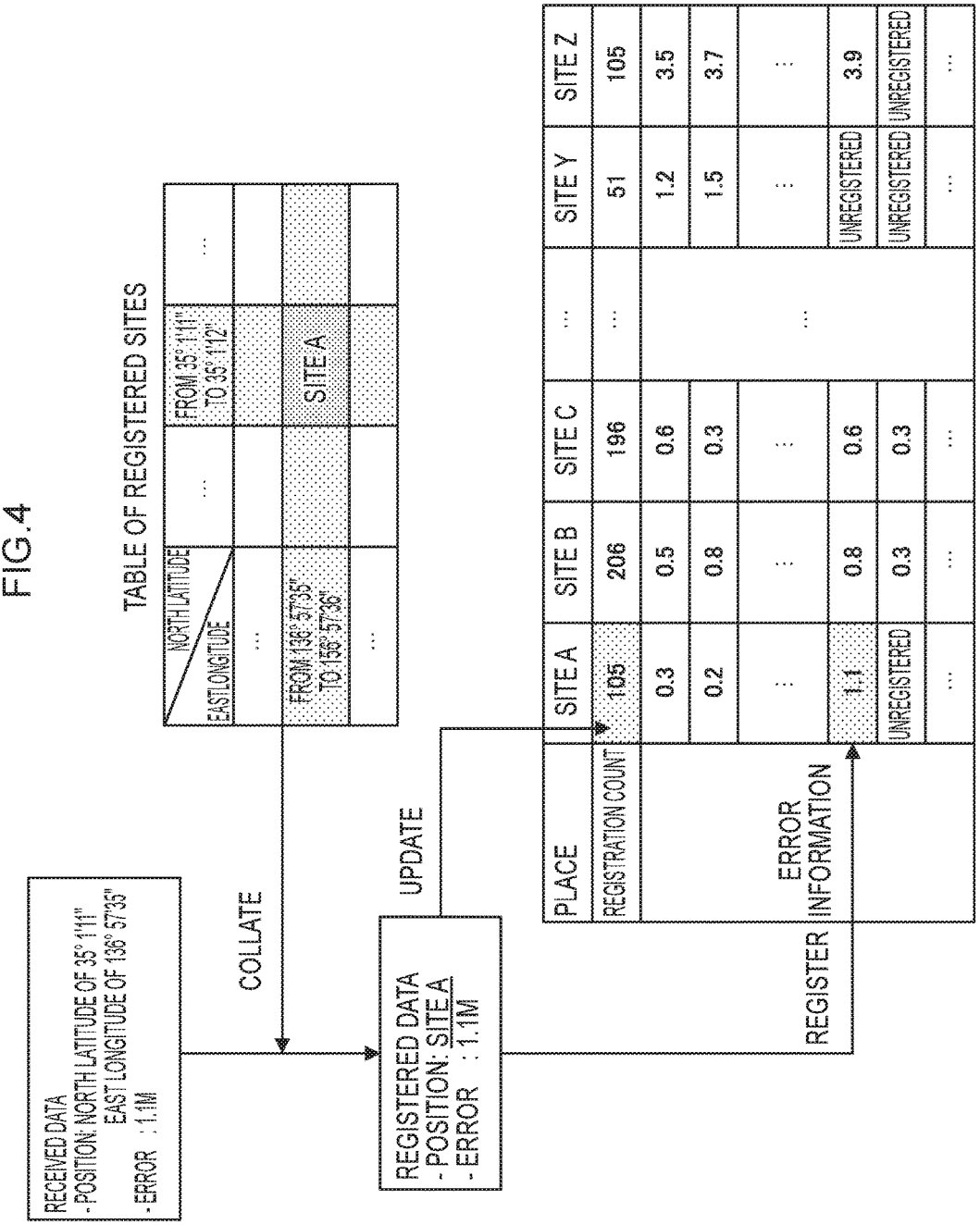
FIG. 4 is an explanatory diagram for explaining an example of an error database.

The error information stored in association with the site is stored in the error database 144. FIG. 4 illustrates a schematic diagram of the error database 144.

As illustrated in FIG. 4, the error information is registered in association with the site corresponding to the position information. The error registration section 142 also updates registered data counts for respective sites. A registered site is determined from the position information (for example, latitude and longitude) received by the communication section 140, by referencing against a preset registered sites table. Other than the error information, supplementary information such as the date and time of data reception may also be registered when the information is being registered. In the present exemplary embodiment, explanation is given of an example of a case in which the date and time of reception is registered in the error database 144 together with the error information.

The change measurement section 146 measures the amount of change at the given site based on the error information corresponding to the site stored in the error database 144. In the present exemplary embodiment, for each site, the change measurement section 146 computes an average value of all of the registered error information as the amount of change.

Figure 5:
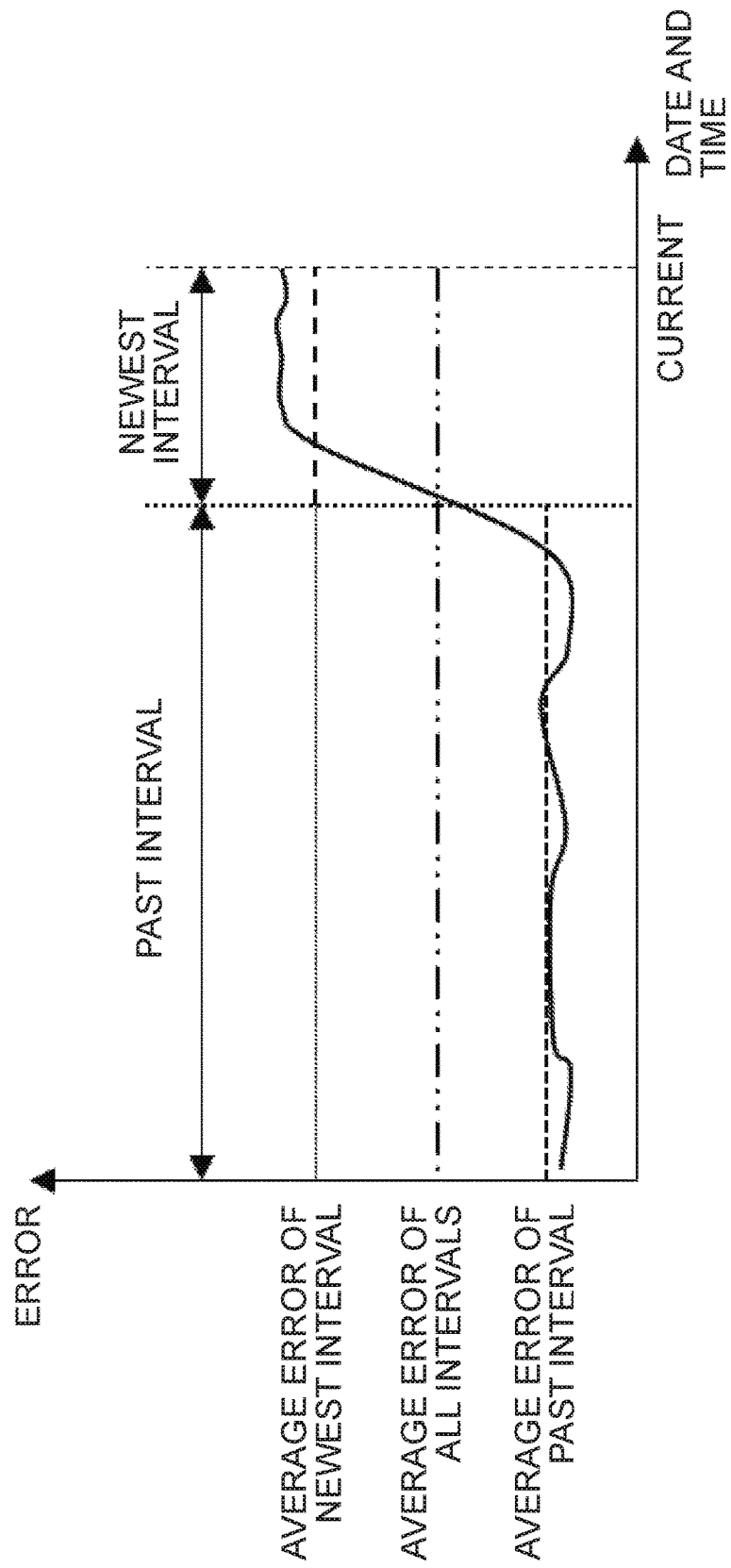
FIG. 5 is an explanatory diagram for explaining amount of change in error information for respective sites.

FIG. 5 is a diagram illustrating an example of the amount of change. As illustrated in FIG. 5, in cases in which the date and time of reception is registered for the error information, an average value of the error information over the latest period of given length can be computed as the amount of change. Moreover, the difference between the average value over the latest period of given length and the average value over another period of given length may be employed as the amount of change, since there is a possibility that a constant error is always present due to a GPS reception state. When date and time information is utilized, changes can be detected sooner than in cases in which an overall average value is employed.

As a value indicating the amount of change other than an average value, a variance value of the error information may be computed as the amount of change, since the variation in the error information registered for each site becoming large suggests that a discrepancy has occurred in the map.

The number of items of error information at a preset threshold value or above can also be taken as the amount of change. In such cases, the set threshold value may be always constant, or may be a value that varies between each site.

Figure 6:
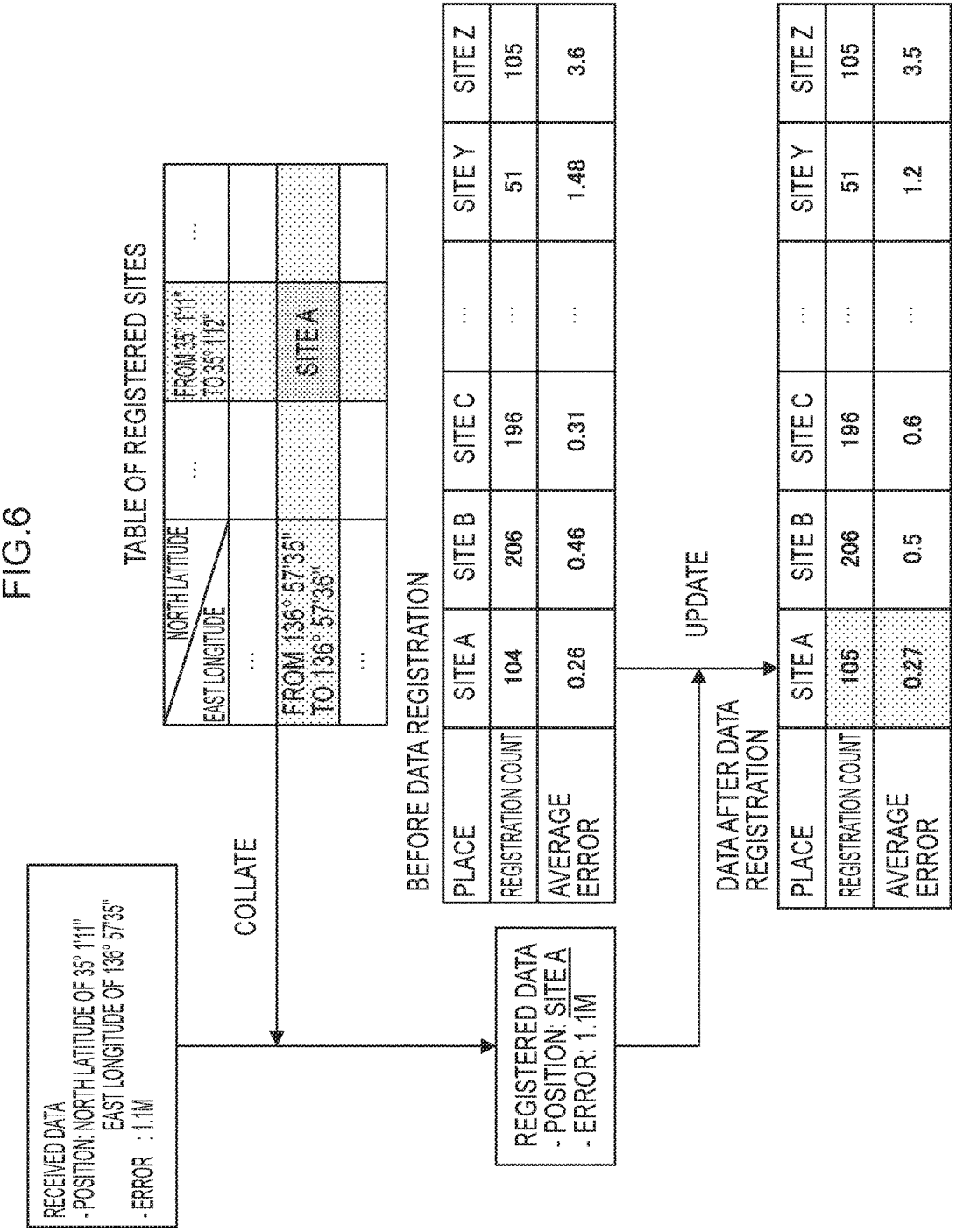
FIG. 6 is an explanatory diagram for explaining another example of an error database.

Note that the change measurement section 146 may compute the amount of change based on another method. FIG. 6 illustrates another example of the error database 144. As illustrated in FIG. 6, in order to reduce the data volume, error information may be registered so as to update counts of registered data for respective sites and successively computed average values, without registering all of the error information. Successive variance values may also be employed in combination therewith. Moreover, a method may be employed that, out of the received error information, updates error information having an error information count at a preset threshold or above.

In the case of the error database 144 like that of FIG. 6, a registered average value or variance value of error information, or an error information count at a preset threshold value or above, may be taken as the amount of change as is.

Figure 7:
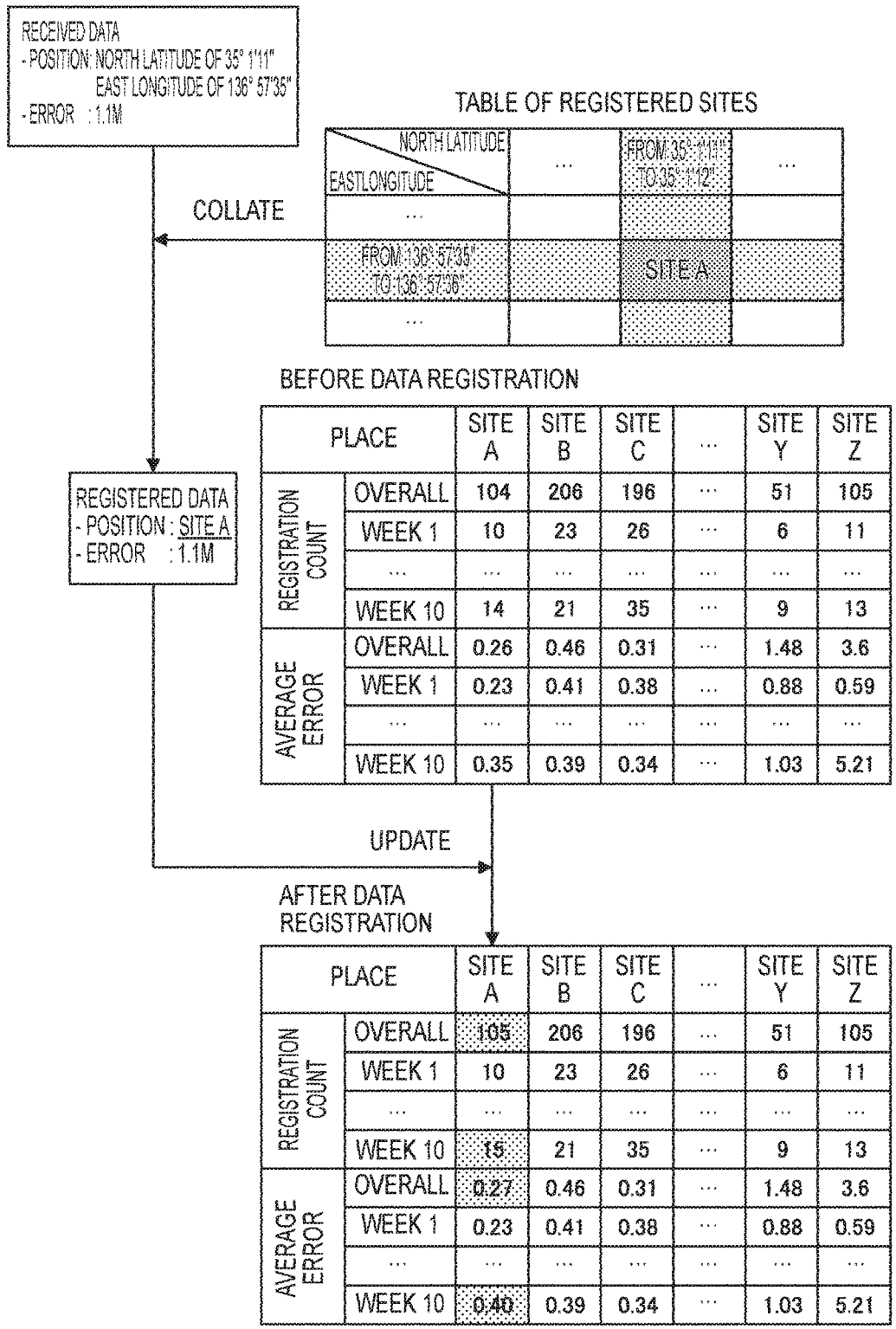
FIG. 7 is an explanatory diagram for explaining another example of an error database.

FIG. 7 illustrates another example of the error database 144. An average value of all of the data in which the error information was registered may be held alone; however, as illustrated in FIG. 7, average values of the error information registered for respective given time periods (for example, respective weeks) may be held, such that more detailed analysis can be carried out. In the case of the error database 144 like that illustrated in FIG. 7, by similar reasoning to that of FIG. 6, the average value in the latest period, or the difference between the average value in the latest period and the average value in another period, may be taken as the amount of change.

The above computation employs information regarding the amount of change of one site alone; however, in addition to the error information for the site of interest, the computation may also employ error information related to the surroundings in combination therewith. For example, the total value or a weighted average value of the amount of change for the site of interest and the amount of change for the surrounding sites may serve as the final amount of change for the site of interest. The measurement of the amount of change at this time requires the amount of change to also be measured at all sites influenced by the registered site data, in addition to the sites having registered error information.

Based on the error information corresponding to the site stored in the error database 144, the priority level setting section 148 sets an update priority level for each registered site as information indicating whether or not the map data corresponding to the site is to be updated. In the present exemplary embodiment, the priority level setting section 148 sets the update priority level based on a time series of error information averages corresponding to sites stored in the error database 144.

As the method of setting the update priority level, values of 5 stages, from 1 to 5 (for example, 1 indicating that updating is unneeded, and 5 indicating that an update is required), may, for example, be set based on a predetermined threshold value of amount of change. In such cases, the threshold value may be the same value across the entire region, or, since disparities sometimes arises in the GPS positioning precision between regions in urban areas and other regions, high threshold values may be set for regions in urban areas, and low threshold values may be set for other regions, such that determination conditions differ between each site.

However, the number of error information measurements is not included in the magnitude of the amount of change, and in cases in which large error information is coincidentally measured when the number of measurements is low (for example, when the map data has just been updated), the update priority level is sometimes set high despite there being insufficient data. Thus, it is preferable to set the update priority level low in cases in which the number of measurements is not a given number or above. However, in such cases, it is possible that the required minimum number of measurements will not be obtained in places with low traffic volumes even after a long time has elapsed. Thus, configuration is made such that in cases in which a period of a given length has elapsed since the previous update, the priority level can be set using the amount of change, even though the minimum measurement count has not yet been reached.

The map database updating section 150 updates the map data stored in the map database 152 based on the priority levels set by the priority level setting section 148.

More specifically, based on the update priority levels set by the priority level setting section 148, the map database updating section 150 transmits, to the probe on-board device 18 via the communication section 140, request information indicating a request asking for data to be gathered for required sites. Note that the map database updating section 150 may send a request asking for data to be gathered for all sites having a priority level at the predetermined threshold value or above. Alternatively, the map database updating section 150 may transmit request information asking for data to be gathered for sites having priority levels in the top X % according to the processing capacity of the server 14. In the present exemplary embodiment, the map database updating section 150 transmits, via the communication section 140, request information asking for data to be gathered for all sites having a priority level at the predetermined threshold value or above.

When the probe on-board device 18 receives request information from the map database updating section 150, the probe on-board device 18 uses a sensor to sense the surrounding environment of the sites having priority levels at the predetermined threshold value or above, and transmits the obtained sensor information to the server 14. The map database updating section 150 of the server 14 updates the map data stored in the map database 152 using the sensor information received from the probe on-board device 18.

Map data is stored in the map database 152. The map database 152 is recorded with image information recording the surrounding environment, including the road surface, similarly to the map database 120 of the on-board device 12. The map data stored in the map database 152 is the same as the map data stored in the map database 120 of the on-board device 12.

The error updating section 154 updates the error information at the sites where the map data has been updated. More specifically, the error updating section 154 erases all of the error information of the sites at which the map data has been updated, such that error information for newly acquired map data can be recorded.

Note that in cases in which the time and date information is appended to the error information, processing to erase past error data may be performed even in cases in which the map data was not updated, under predetermined conditions in consideration of the server capacity.

Map Data Updating System Operation

Figure 8:
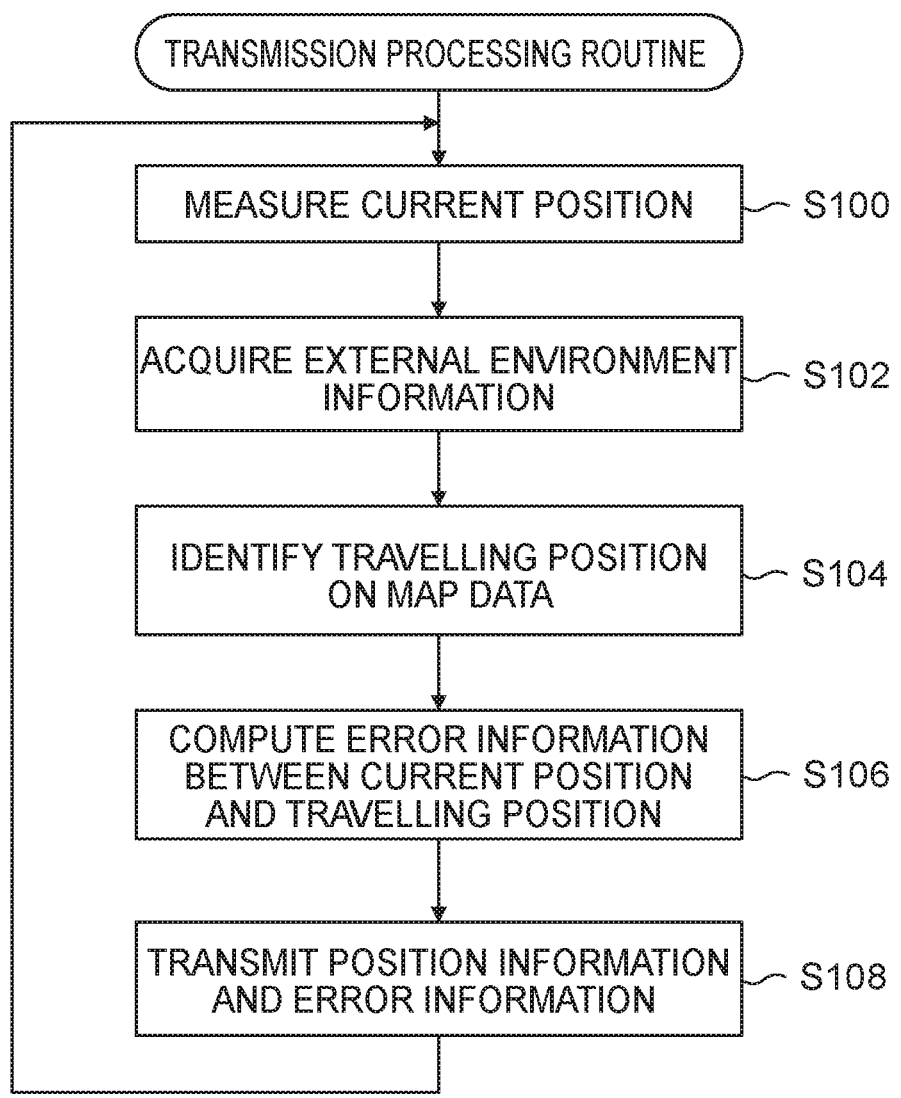
FIG. 8 is a flowchart illustrating contents of a transmission processing routine in a computer of an on-board device according to the first exemplary embodiment.

Next, explanation follows regarding operation of the map data updating system 10 according to the present exemplary embodiment. When respective vehicles installed with the on-board device 12 are travelling, the on-board device 12 of each of the vehicles executes the transmission processing routine illustrated in FIG. 8, and the server 14 executes the update processing routine illustrated in FIG. 9.

First, explanation follows regarding the transmission processing routine executed by the on-board device 12 of each of the vehicles. The on-board device 12 executes the transmission processing routine, illustrated in FIG. 8, when a satellite signal is received using the GPS 124 and images of the surroundings of the vehicle are successively captured by the camera 122.

Transmission Processing Routine

First, at step S100, the position measurement section 128 measures the position of the vehicle based on the satellite signal received by the GPS 124.

Next, at step S102, the travelling position identification section 130 acquires surrounding images of the surroundings of the vehicle captured by the camera 122 as external environment information.

At step S104, the travelling position identification section 130 identifies a travelling position of the vehicle on the map data based on the position of the vehicle measured at step S100 and the surrounding image of the surroundings of the vehicle acquired at step S102, and the map data stored in the map database 120.

At step S106, the position error measurement section 132 computes difference information indicating the difference between the position of the vehicle measured at step S100 and the travelling position of the vehicle identified at step S104.

At step S108 the communications section 134 transmits, to the server 14, the difference information computed at step S106, and the position of the vehicle measured at step S100 and the travelling position of the vehicle identified at step S104.

Next, explanation follows regarding operation of the server 14. When the communication section 140 of the server 14 receives error information and position information transmitted from the on-board device 12, the error registration section 142 stores the error information in the error database 144 in association with the site corresponding to the position information received by the communication section 140. The error registration section 142 of the server 14 stores the error information in the error database 144 for each received item of position information and error information.

Figure 9:
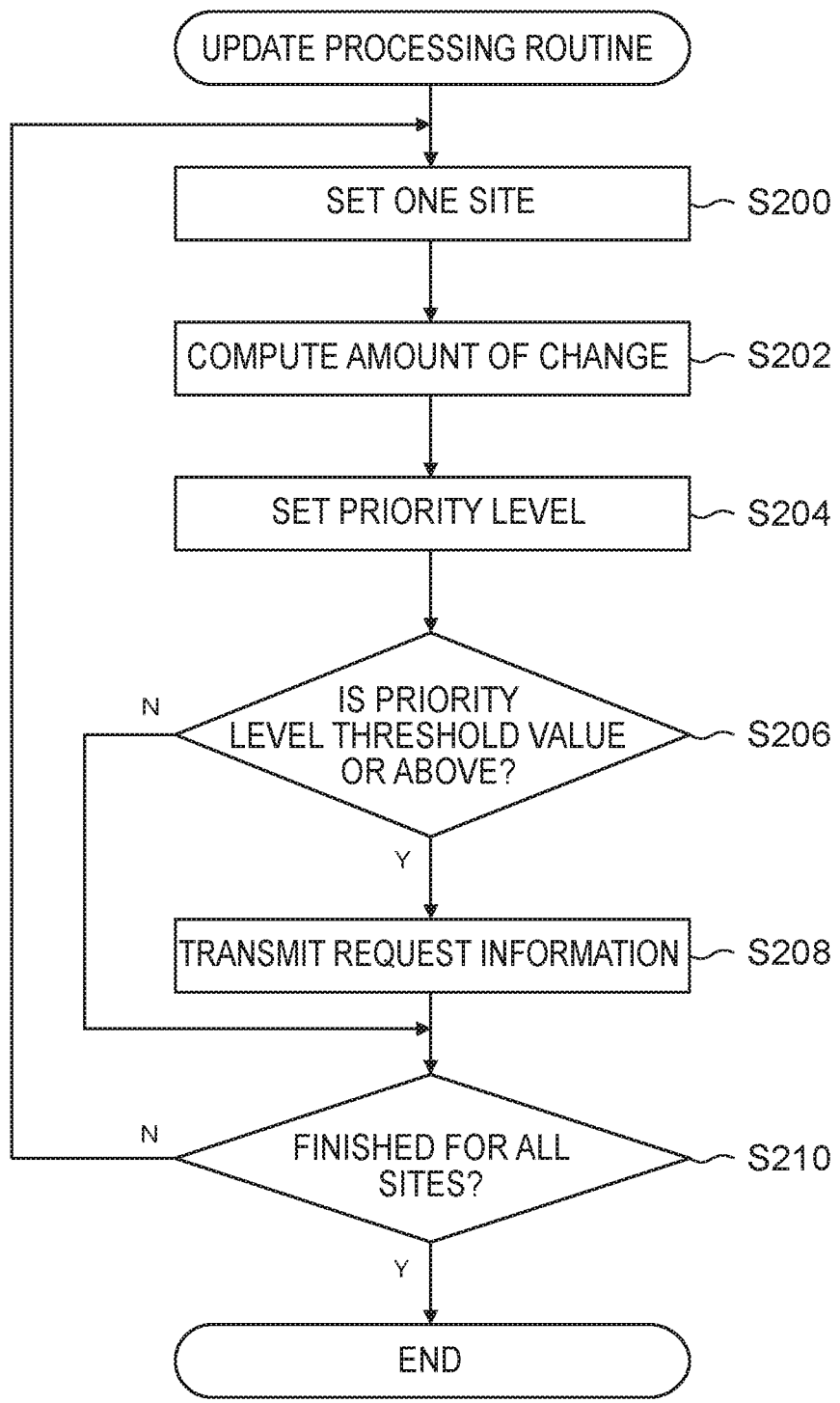
FIG. 9 is a flowchart illustrating contents of an update processing routine on a server according to the first exemplary embodiment.

Then, the server 14 executes the update processing routine illustrated in FIG. 9 for each predetermined period. Note that the server 14 may execute the update processing routine at another timing. For example, the server 14 may execute the update processing routine according to the volume of data stored in the error database 144.

Update Processing Routine

At step S200, one site out of the sites registered in the error database 144 is set.

At step S202, for the site corresponding to position information set at step S200, the change measurement section 146 measures the amount of change at the given site, based on the error information corresponding to the given site stored in the error database 144.

At step S204, the priority level setting section 148 sets the update priority level for the site for which the amount of change was computed at step S202.

At step S206, determination is made as to whether or not the priority level set at step S204 above is the predetermined threshold value or above. Processing proceeds to step S208 when the priority level set at step S204 is the predetermined threshold value or above. Otherwise, processing proceeds to step S210 when the priority level set at step S204 is less than the predetermined threshold value.

At step S208, the map database updating section 150 transmits, via the communication section 140, the request information indicating a request asking the probe on-board device 18 for data to be gathered for the site set at step S200, based on the priority level set at step S204 above.

At step S210, determination is made as to whether or not the processing of step S200 to step S208 above has been executed for all of the sites registered in the error database 144. In cases in which the processing of step 200 to step 208 above has been executed for all of the sites stored in the error database 144, the update processing routine ends. Otherwise, in cases in which sites for which the processing of step S200 to step S208 above has not been executed are present, processing returns to step S200.

When the probe on-board device 18 receives the request information transmitted at step S208 above, the probe on-board device 18 senses the surrounding environment of the given site, and transmits the obtained sensor information to the server 14.

The communication section 140 of the server 14 receives the sensor information transmitted from the probe on-board device 18. Then, the map database updating section 150 of the server 14 updates the map data stored in the map database 152 using the sensor information received by the communication section 140. Moreover, the error updating section 154 updates the error information at the site at which the map was updated by the map database updating section 150. Then, the map database updating section 150 transmits the map data update information corresponding to the updated site to the on-board device 12 via the communication section 140. Then, the map database updating section 136 of the on-board device 12 updates the map data stored in the map database 120 based on the map data update information received by the communications section 134.

As explained above, the map data updating system of the first exemplary embodiment computes error information indicating the difference between the position of the vehicle measured by the position measurement section 128, and the travelling position identified by the travelling position identification section 130. Then, the map data updating system transmits the computed error information and position information to the server 14, and stores the error information in association with the transmitted position information in the error database. Then, the map data updating system sets the priority level corresponding to the position information based on the error information corresponding to the position information stored in the error database. The need for an update at each position on the map data can thereby be determined.

Moreover, when a discrepancy arises between the map data and the road currently travelled by the vehicle, the error between the travelling position and the position measured by the GPS sensor becomes large. Accordingly, the need for an update and the priority level thereof can be determined by time sequence analysis of the error information measured by the vehicle.

Moreover, since presence or absence of modification is determined using a path error at each site, the sites to be modified can be limited, enabling performance of update processing to be limited to places requiring an update.

Moreover, in addition to the vehicle path information, information obtained by sensing the external environment of the vehicle (for example, images or three-dimensional data) is also utilized, thereby enabling changes on the map data that do not accompany changes in road shape, such as establishment of a new pedestrian crossing, to be detected, and update determination to be performed.

Second Exemplary Embodiment

Next, explanation follows regarding a second exemplary embodiment. Portions configured similarly to those of the first exemplary embodiment are allocated the same reference numerals and explanation thereof is omitted.

The second exemplary embodiment differs from the first exemplary embodiment in that error information is computed using vehicle paths, and a map database is updated according to the computed error information.

In the second exemplary embodiment, error information is computed from the difference between two different generated paths, and a map data update priority level is determined. The two paths employed by the second exemplary embodiment are as follows.

The first path is a travel path, and is a path generated by using a vehicle travelling state obtained by an inertial measurement unit (IMU), a vehicle surrounding image captured by a camera, or the like to collate a vehicle position that has been obtained by a GPS, with map data. The second path is an integrated path, and is a path generated by integrating vehicle motions that have been estimated using vehicle travelling states obtained by an IMU, surrounding images of the vehicle captured by a camera, or the like.

The travel path is a path indicating where the vehicle has travelled on the map data. The integrated path is a path generated from motion amounts of the vehicle (for example, from vehicle speed, yaw rate, and the like) without using map data.

Figure 10:
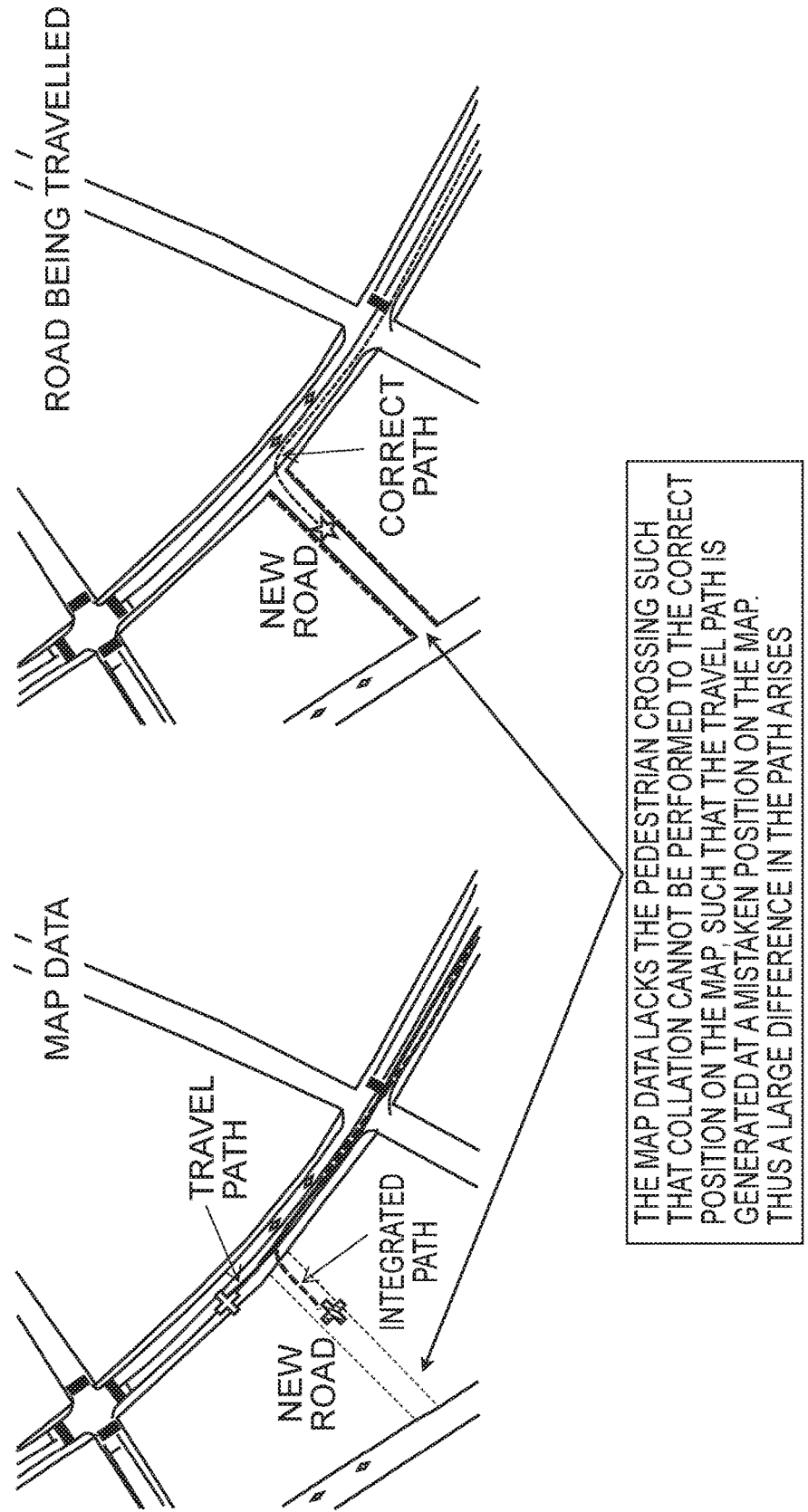
FIG. 10 is a diagram illustrating an example indicating difference between a travel path and an integrated path.

FIG. 10 is a diagram for explaining error information related to paths caused by changes in road shape. As illustrated in FIG. 10, in cases in which the road that the vehicle is currently travelling along is a newly constructed road, the current travelling position does not exist on the map data, such that the travel path of the vehicle generated by collating with the map data is a mistaken path. Thus, as illustrated in FIG. 10, the difference between the travel path and the integrated path is expected to become large.

Figure 11:
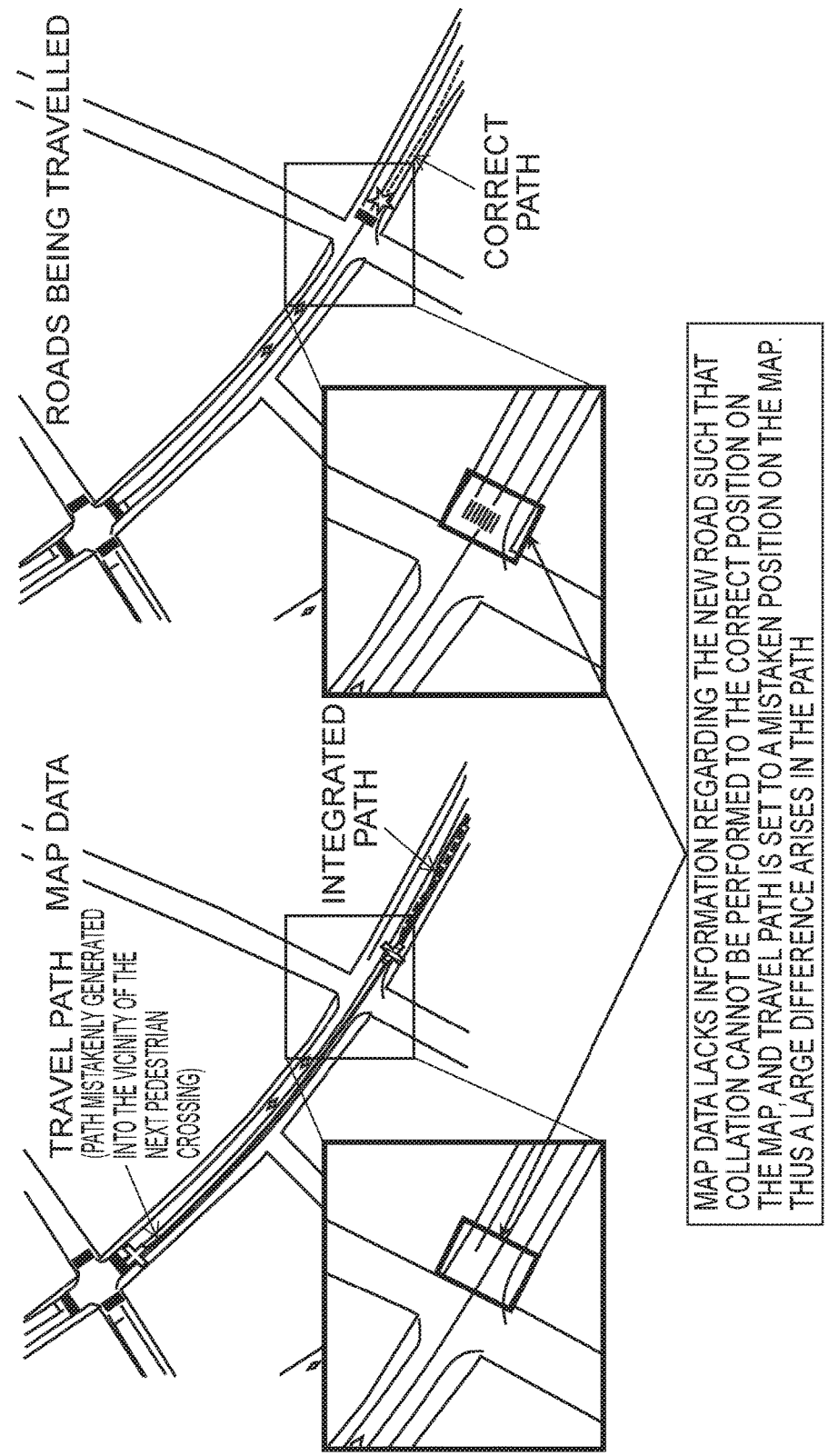
FIG. 11 is a diagram illustrating another example indicating difference between a travel path and an integrated path.

FIG. 11 is a diagram for explaining error information related to paths caused by changes to road surface patterns. As illustrated in FIG. 11, the road surface pattern indicating the road surface image on the map data and the road surface pattern indicating the road surface image obtained from the surrounding image when travelling are also collated to a mistaken position when there are discrepancies between the map data and the road surface appearance of the road being travelled. Thus, as illustrated in FIG. 11, a large difference is expected to arise between the travel path and the integrated path.

Accordingly, in the second exemplary embodiment, a large volume is collected of data that have large errors at places where discrepancies arise when the error information related to paths is aggregated and analyzed by the server 14. Locations requiring a map data update can thereby be identified, enabling prioritized update processing of map data to be performed thereon.

Figure 12:
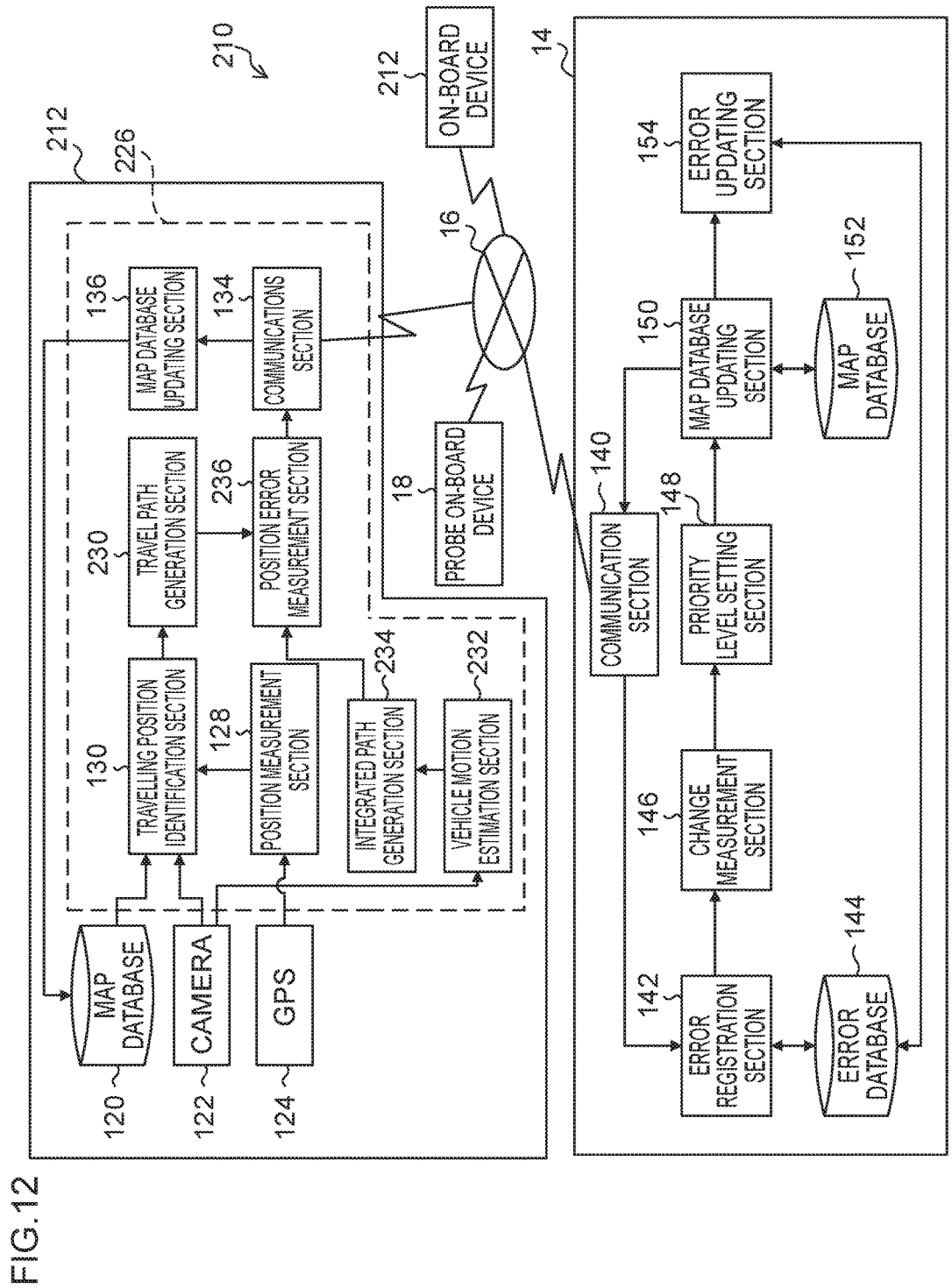
FIG. 12 is a block diagram illustrating a map data updating system according to a second exemplary embodiment.

Map Data Updating System 210 Configuration According to Second Exemplary Embodiment As illustrated in FIG. 12, a map data updating system 210 according to the second exemplary embodiment includes an on-board device 212, a server 14, and a probe on-board device 18. The on-board device 212, the server 14, and the probe on-board device 18 are connected together via a network, such as the internet. The on-board device 212 is an example of an installed device. The on-board device 212 is installed to a vehicle. The server 14 receives error information transmitted from the on-board device 212, and updates a map database according to the error information. The probe on-board device 18 transmits, to the server 14, sensor information for updating map data based on a signal output from the server 14.

On-Board Device 212

The on-board device 212 includes a map database 120, a camera 122, a GPS 124, and a computer 226. The on-board device 212 is installed to the vehicle.

Map data is stored in the map database 120. The camera 122 captures images of the surroundings of the vehicle. The GPS 124 receives a satellite signal transmitted from a positioning satellite. The computer 226 computes and transmits error information based on the image of the surroundings of the vehicle captured by the camera 122 and the satellite signal received by the GPS 124.

The computer 226 includes a CPU, RAM, and ROM storing a program for executing a transmission processing routine, described later, and is functionally configured as follows. The computer 226 includes a position measurement section 128, a travelling position identification section 130, a travel path generation section 230, a vehicle motion estimation section 232, an integrated path generation section 234, a position error measurement section 236, a communications section 134, and a map database updating section 136. The position error measurement section 236 is an example of a difference information generation unit. The vehicle motion estimation section 232 is an example of a motion amount estimation unit.

The position measurement section 128 measures the position of the vehicle based on a satellite signal received by the GPS 124. The travelling position identification section 130 identifies a travelling position of the vehicle on the map data based on the position of the vehicle measured by the position measurement section 128, the surrounding image of the vehicle surroundings captured by the camera 122, and the map data of the map database 120. The travel path generation section 230 generates a travel path of the vehicle based on a time series of travelling positions of the vehicle identified by the travelling position identification section 130. The vehicle motion estimation section 232 estimates the motion amount of the vehicle based on the surrounding image of the surroundings of the vehicle captured by the camera 122. The integrated path generation section 234 generates an integrated path of the vehicle based on a time series of motion amounts of the vehicle estimated by the vehicle motion estimation section 232. The position error measurement section 236 computes error information indicating the difference between the travel path generated by the travel path generation section 230 and the integrated path generated by the integrated path generation section 234. The communications section 134 transmits the error information computed by the position error measurement section 236 and the position information to the server 14. The map database updating section 136 updates the map data stored in the map database 120 according to the map data update information received from the server 14.

The travel path generation section 230 generates a travel path of the vehicle based on a time series of travelling positions identified by the travelling position identification section 130. More specifically, the travel path generation section 230 generates a travel path using the time series of travelling positions in given intervals identified by the travelling position identification section 130. Here, the given interval may be an interval of distance or an interval of time.

The vehicle motion estimation section 232 estimates the motion amount of the vehicle based on the surrounding image of the surroundings of the vehicle captured by the camera 122. In the present exemplary embodiment, explanation is given regarding an example of a case in which the vehicle motion estimation section 232 estimates the vehicle speed and yaw rate as the motion amount of the vehicle.

For example, the vehicle motion estimation section 232 estimates the motion amount of the vehicle by a technique described in the reference document below, based on continuous frames of surrounding images of the surroundings of the vehicle captured by the camera 122.

REFERENCE DOCUMENT

Yamaguchi, Kato, Ninomiya, *Vehicle Ego-motion Estimation Using a Vehicle Mounted Monocular Camera*, the Institute of Electrical Engineers of Japan magazine. C, vol. 129, No. 12, pp. 2213-2221, 2009.

The integrated path generation section 234 generates an integrated path of the vehicle based on a time series of vehicle speeds and yaw rates of the vehicle estimated by the vehicle motion estimation section 232. Here, the integrated path generation section 234 generates the integrated path at an interval equal to that at which the travel path is generated by the travel path generation section 230.

The integrated path is a path generated by integrating motion amounts of the vehicle from a set origin. Thus, the integrated path generation section 234 generates paths having equal intervals by setting the origin of the integrated path (for example, a position or a direction) to be the same as the origin of the path generated by the travel path generation section 230.

Figure 13:
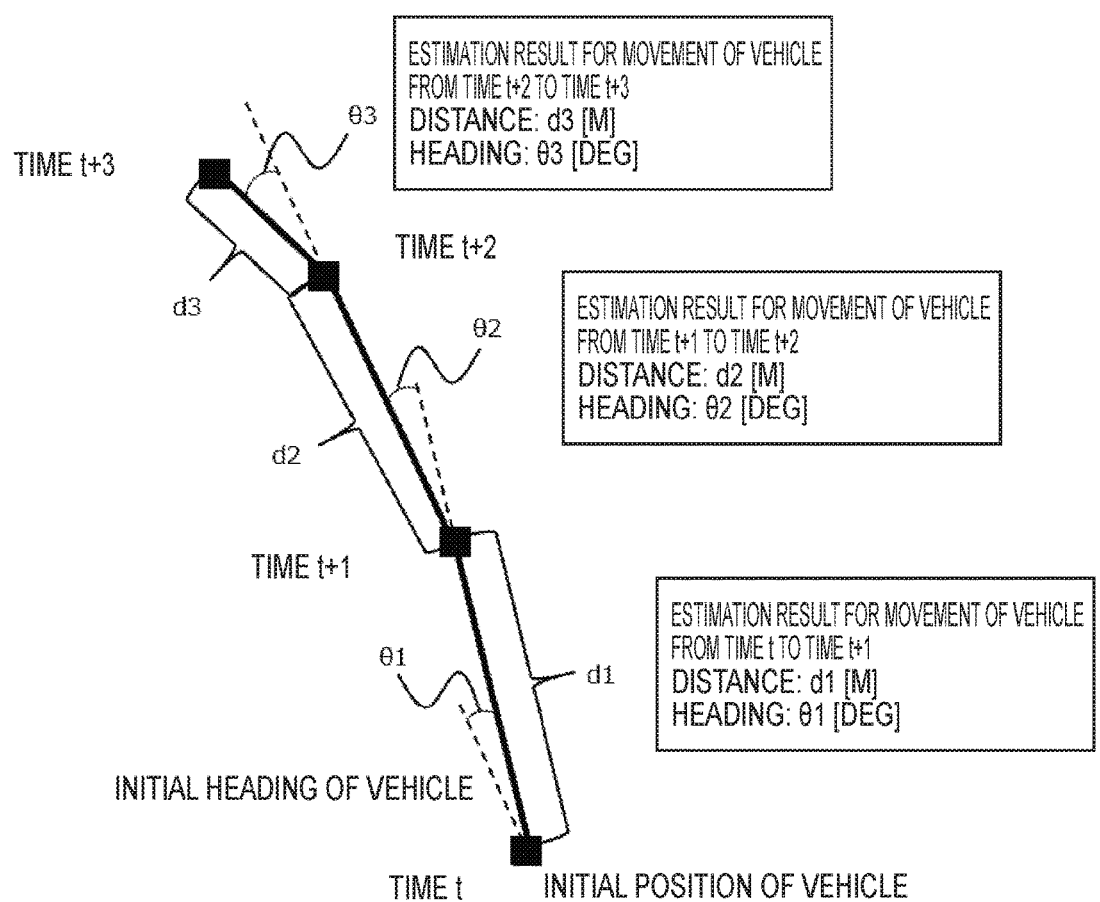
FIG. 13 is a diagram illustrating an example of a method of generating an integrated path.

FIG. 13 illustrates an example of a generation method for integrated paths. FIG. 13 illustrates an example of a case in which an estimation result for a migration distance d and a migration direction (for example, yaw rate) θ have been employed in path generation. The integrated path generation section 234 computes the migration distance d from the vehicle speed of the vehicle estimated by the vehicle motion estimation section 232, and generates the integrated path of the vehicle based on the time series of migration distances d and yaw rates θ.

More specifically, as illustrated in FIG. 13, the integrated path generation section 234 generates an integrated path by extending a path with respect to a position (for example, the black square at time t illustrated in FIG. 13) and direction (for example, the dashed line extending from the black square at time t illustrated in FIG. 13) of the vehicle at a time t, along an estimated direction and over an distance estimated to the span from a time t to a time t+1. When doing so, the estimated direction is an angle relative to time t. As illustrated in FIG. 13, an integrated path is generated by repeatedly executing similar processing.

Figure 14:
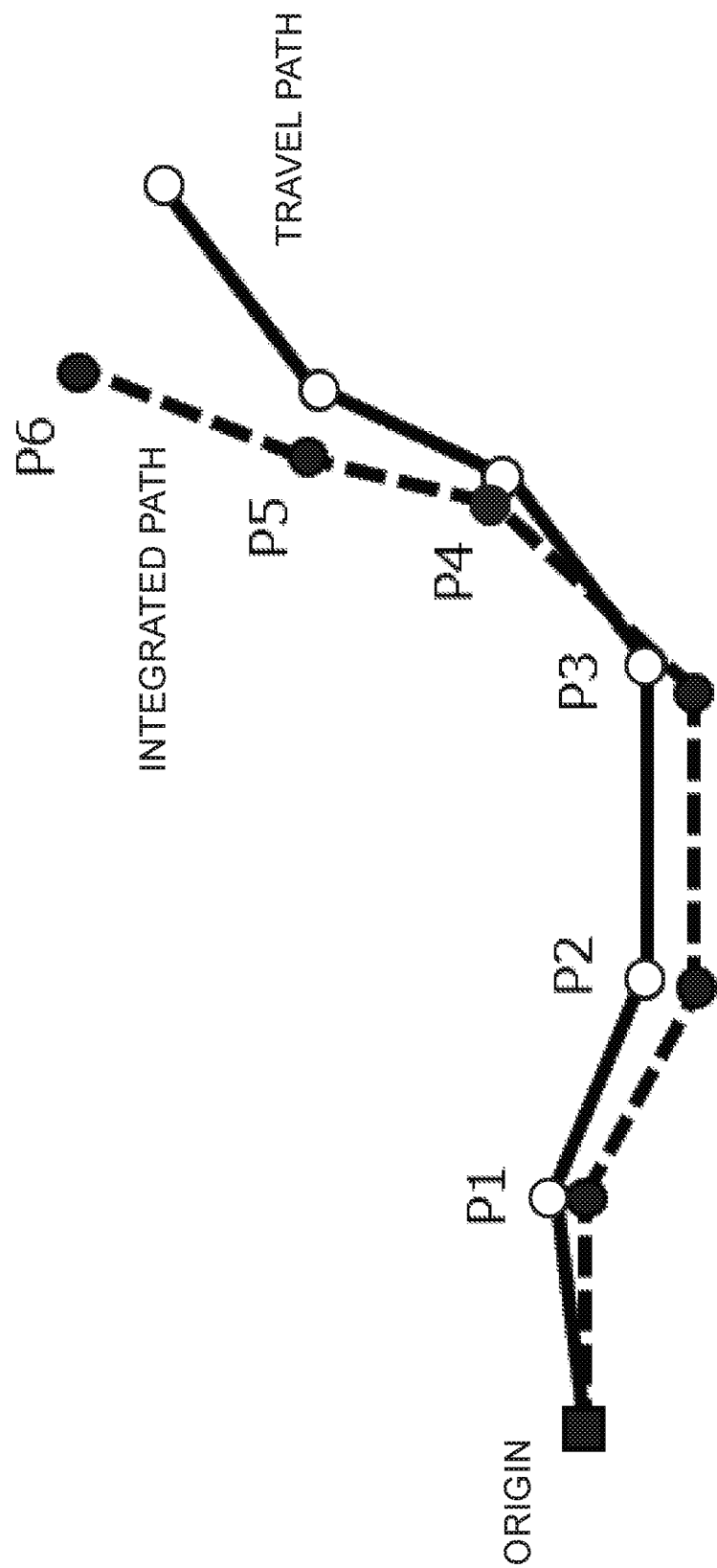
FIG. 14 is a diagram for explaining the difference between a travel path and an integrated path.

The position error measurement section 236 computes error information indicating the difference between the travel path generated by the travel path generation section 230 and the integrated path generated by the integrated path generation section 234. FIG. 14 illustrates an example of the difference between the travel path and the integrated path.

For example, as illustrated in FIG. 14, the position error measurement section 236 measures the difference between the positions at the current time on the travel path and the positions at the current time on the integrated path as the error information (for example, the difference at point P6 in FIG. 14). Alternatively, the position error measurement section 236 can take the average value or the cumulative value of the difference between the travel path and the integrated path at positions at respective sites (for example, the difference between the respective sites from point P1 to point P6 in FIG. 14) as the error information. Moreover, the difference may be found by taking the straight line distance between two sites, or may be found by splitting the difference into longitude and latitude components. Moreover, a difference split into a forward direction component and a component in a direction orthogonal thereto may be found.

Map Data Updating System Operation

Next, explanation follows regarding operation of the map data updating system 210 according to the second exemplary embodiment. When respective vehicles installed with the on-board device 212 are travelling, the on-board device 212 of each of the vehicles executes the transmission processing routine illustrated in FIG. 15, and the server 14 executes the update processing routine illustrated in FIG. 9 mentioned above.

Figure 15:
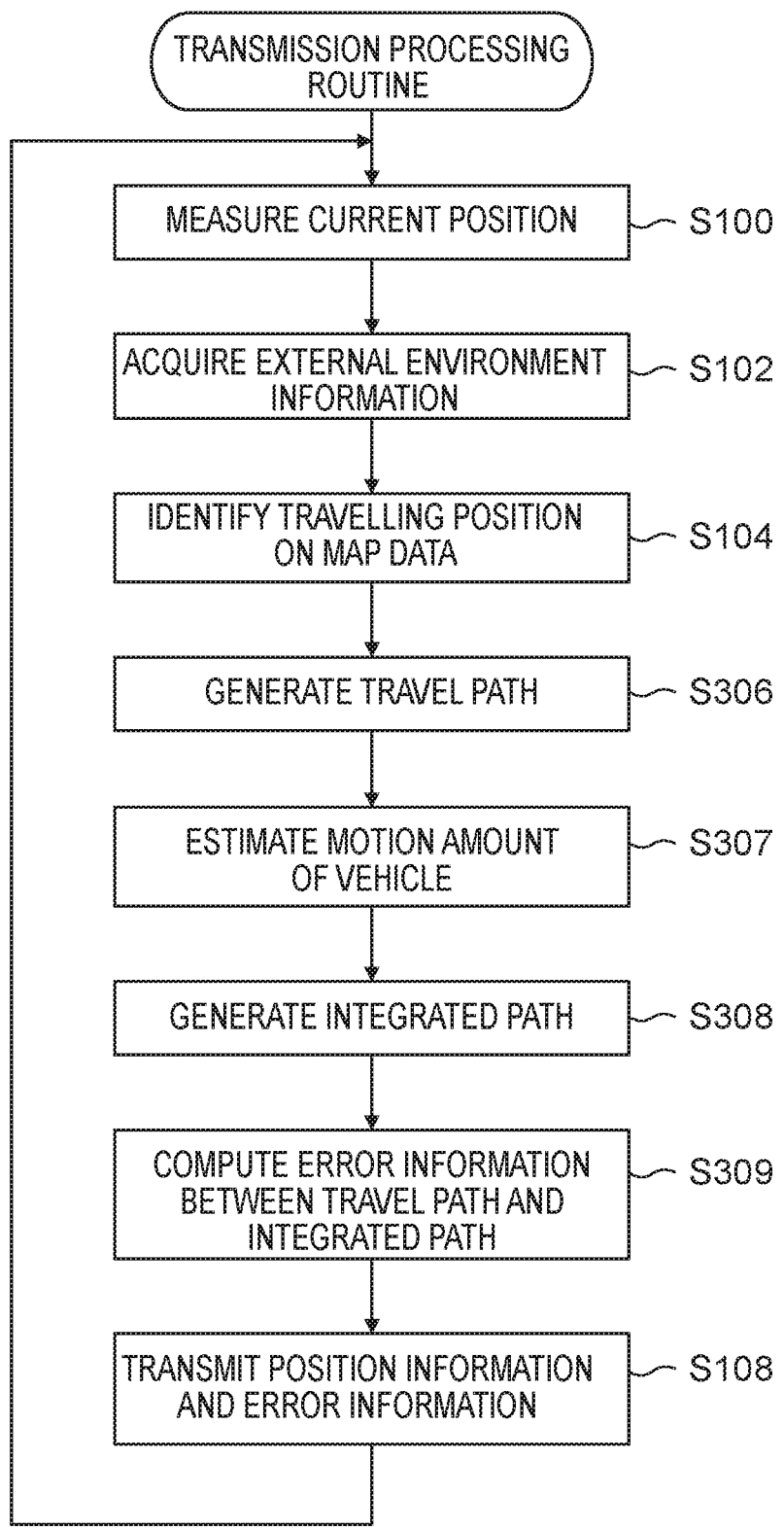
FIG. 15 is a flowchart illustrating content of a transmission processing routine on a computer of an on-board device according to the second exemplary embodiment.

Explanation follows regarding a transmission processing routine executed by the on-board device 212 of each of the vehicles. In the on-board device 212, a satellite signal is received by the GPS 124, and when surrounding images of the vehicle are successively captured by the camera 122, the transmission processing routine illustrated in FIG. 15 is executed.

Transmission Processing Routine

At step S306, the travel path generation section 230 generates the travel path of the vehicle based on the time series of travelling positions obtained from the travelling position identified this time, and travelling positions identified the previous time and earlier at step S104.

At step S307, the vehicle motion estimation section 232 estimates the vehicle speed and yaw rate based on consecutive frames of the surrounding images of the surroundings of the vehicle acquired at step S102.

At step S308, the integrated path generation section 234 generates an integrated path of the vehicle based on the time series of the speeds and the time series of the yaw rates obtained from the speed and the yaw rate of the vehicle estimated the current time, and the speed and the yaw rate estimated the previous time and earlier at step S307.

At step S309, the position error measurement section 236 computes the error information indicating the difference between the travel path generated at step S306 mentioned above and the integrated path generated at step S308 mentioned above.

Since other operation and configuration of the map data updating system 210 according to the second exemplary embodiment is similar to that of the first exemplary embodiment, explanation thereof is omitted.

As explained above, the map data updating system of the second exemplary embodiment generates the travel path of the vehicle based on the time series of travelling positions, and generates the integrated path of the vehicle based on the time series of the estimated motion amounts of the vehicle, and thereby computes the error information indicating the difference between the travel path and the integrated path. Then, the map data updating system transmits the computed error information and the position information to the server 14, and stores the error information in the error database in association with the transmitted position information. Then, the map data updating system sets a priority level corresponding to the given position information based on the error information corresponding to the position information stored in the error database. The need for an update at respective positions in the map data can thereby be determined.

Third Exemplary Embodiment

Next, explanation follows regarding a third exemplary embodiment. Portions configured similarly to those of the first exemplary embodiment are allocated the same reference numerals and explanation thereof is omitted.

The third exemplary embodiment differs from the first and second exemplary embodiments in that the on-board device of the first exemplary embodiment determines whether or not the computed error information is to be transmitted to the server.

Figure 16:
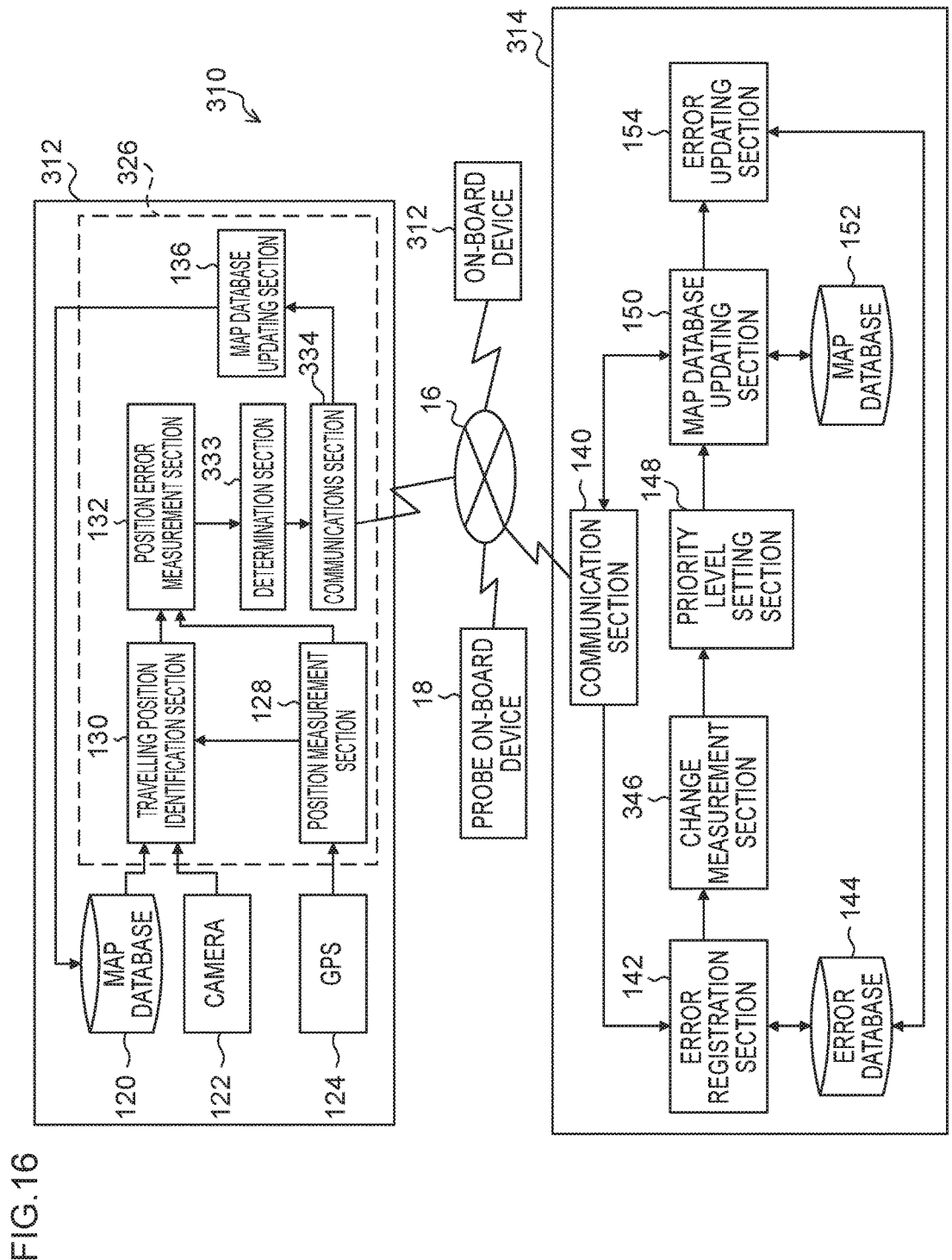
FIG. 16 is a block diagram illustrating a map data updating system according to a third exemplary embodiment.

Configuration of Map Data Updating System According to Third Exemplary Embodiment As illustrated in FIG. 16, a map data updating system 310 according to the third exemplary embodiment includes an on-board device 312, a server 314, and a probe on-board device 18. The on-board device 312, the server 314, and the probe on-board device 18 are connected together via a network such as the internet. The on-board device 312 is an example of an installed device.

The on-board device 312 is installed to a vehicle. The server 314 receives the error information transmitted from the on-board device 312 and updates the map database according to the error information. The probe on-board device 18 transmits, to the server 314, the sensor information for updating the map data based on the signal output from the server 314.

On-Board Device 312

The on-board device 312 includes a map database 120, a camera 122, a GPS 124, and a computer 326. The on-board device 312 is installed to a vehicle.

Map data is stored in the map database 120. The camera 122 captures an image of the surroundings of the vehicle. The GPS 124 receives a satellite signal transmitted from a positioning satellite. The computer 326 computes and transmits error information based on the image of the surroundings of the vehicle captured by the camera 122, and the satellite signal received by the GPS 124.

The computer 326 includes a CPU, RAM, and ROM storing a program for executing a transmission processing routine, described later, and is functionally configured as follows. The computer 326 includes a position measurement section 128, a travelling position identification section 130, a position error measurement section 132, a determination section 333, a communications section 334, and a map database updating section 136.

The position measurement section 128 measures the position of the vehicle based on the satellite signal received by the GPS 124. The travelling position identification section 130 identifies a travelling position of the vehicle on the map data based on the position of the vehicle measured by the position measurement section 128, the surrounding image of the surroundings of the vehicle captured by the camera 122, and the map data of the map database 120. The position error measurement section 132 computes the error information indicating the difference between the position of the vehicle measured by the position measurement section 128 and the travelling position of the vehicle identified by the travelling position identification section 130. The determination section 333 determines whether or not to transmit the error information to the server 314. The communications section 334 transmits, to the server 314, the error information and the position information computed by the position error measurement section 132 based on the determination result made by the determination section 333. The map database updating section 136 updates the map data stored in the map database 120 according to the map data update information transmitted from the server 314.

The determination section 333 determines whether or not to transmit the error information and the position information according to the error information computed by the position error measurement section 132. More specifically, based on the error information computed by the position error measurement section 132 and a predetermined threshold value, the determination section 333 outputs the error information and the position information to the communications section 134 when the error information is the predetermined threshold value or above. The communications section 134 then transmits, to the server 14, the error information and the position information output by the determination section 333.

The determination section 333 does not output the error information or the position information when the error information computed by the position error measurement section 132 is less than the predetermined threshold value.

The predetermined threshold value may be set to an always constant value, or may be set to a value that varies according to the travelling position of the vehicle identified by the travelling position identification section 130 or the position of the vehicle measured by the position measurement section 128.

Although determination as to whether or not the error information and the position information are to be transmitted is made according to the error information computed by the position error measurement section 132 in the present exemplary embodiment, determination as to whether or not the error information and the position information are to be transmitted may be made by another method. For example, determination as to whether or not transmission is required may be made according to the travelling position of the vehicle, such that the same vehicle does not transmit large volumes of error information for the same location. Alternatively, determination as to whether or not to transmit the error information and the position information may be made according to the number of times that the vehicle travelled through the place on the map data that corresponds to the position information. Alternatively, determination as to whether or not to transmit the error information and the position information may be made according to the date and time of travel when the vehicle was travelling.

The communications section 334 transmits the error information and the position information according to the determination result made by the determination section 333.

Server 314

The server 314 is configured as a server that includes a CPU, ROM storing, for example, a program for implementing a processing routine, described later, RAM that temporarily stores data, memory serving as a storage unit, a network interface, and the like. The server 314 can be functionally represented as being configured including a communication section 140, an error registration section 142, an error database 144, a change measurement section 346, a priority level setting section 148, a map database updating section 150, a map database 152, and an error updating section 154. The communication section 140 is an example of a reception unit.

The communication section 140 receives the error information and the position information transmitted from the on-board device 312. The error registration section 142 registers the error information received by the communication section 140 in the error database 144. Error information is stored in the error database 144. The change measurement section 346 measures the amount of change in the error information stored in the error database 144. The priority level setting section 148 sets the priority level for a map data update based on the amount of change measured by the change measurement section 346. The map database updating section 150 updates the map data based on the priority level set by the priority level setting section 148. The map data is stored in the map database 152. The error updating section 154 updates the error information stored in the error database 144.

Based on the number of updates to error information corresponding to a site stored in the error database 144, the change measurement section 346 measures the amount of change at that site. In the present exemplary embodiment, the change measurement section 346 employs the number of receptions for a registered site in the error database 144 as the amount of change since only large error information is transmitted from the on-board device 312.

The change measurement section 346 computes the amount of change similarly to in the first exemplary embodiment in cases in which determination as to whether or not to transmit the error information and the position information is made by the determination section 333 according to the travelling position, the time and date of travel, or the like of the vehicle.

Map Data Updating System Operation

Figure 17:
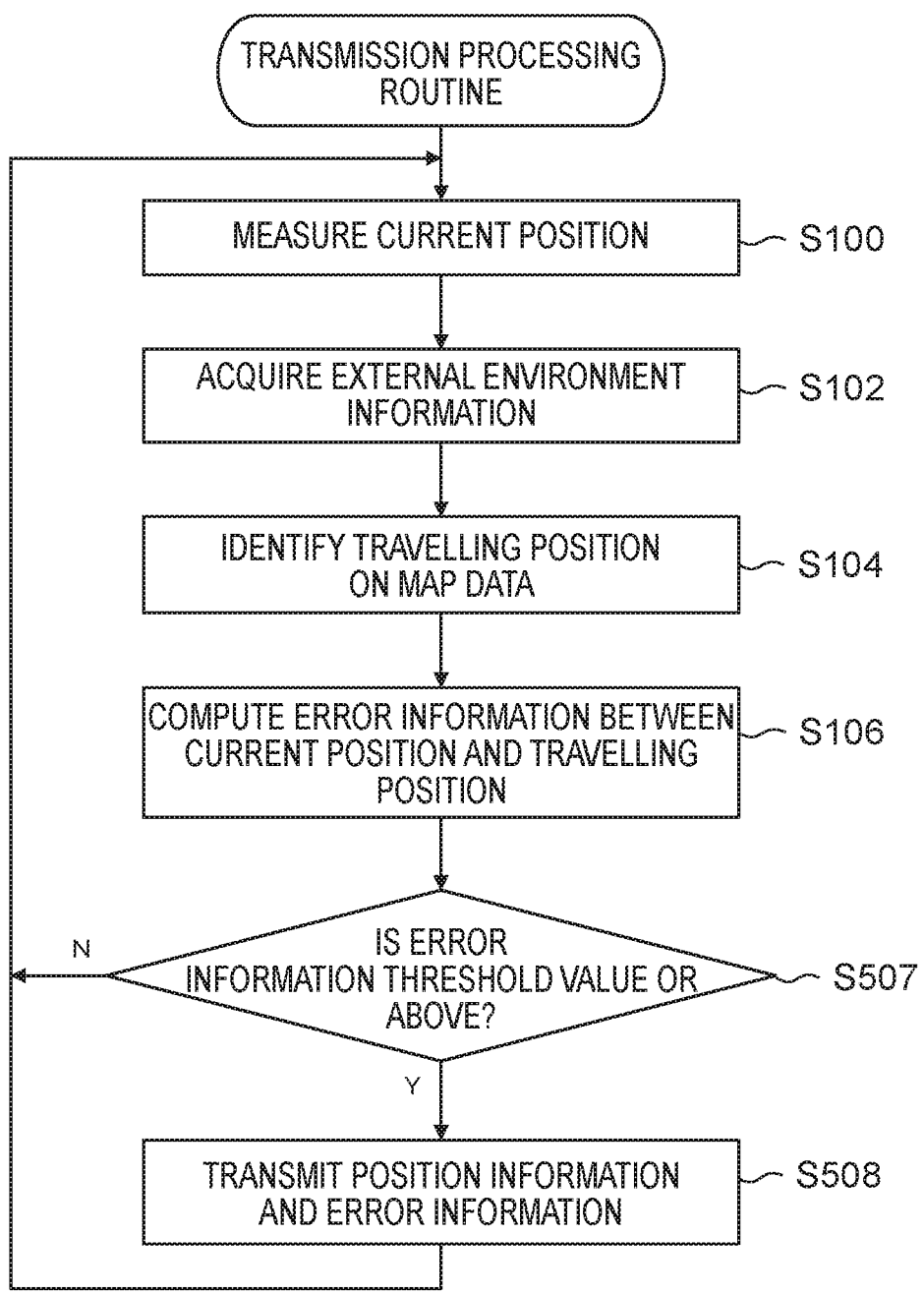
FIG. 17 is a flowchart illustrating content of a transmission processing routine on a computer of an on-board device according to the third exemplary embodiment.

Next, explanation follows regarding operation of the map data updating system 310 according to the third exemplary embodiment. When respective vehicles installed with the on-board device 312 are travelling, the on-board device 312 of each of the vehicles executes the transmission processing routine illustrated in FIG. 17, and the server 14 executes the update processing routine illustrated in FIG. 9.

Explanation follows regarding a transmission processing routine executed by the on-board device 312 of each of the vehicles. The on-board device 312 executes the transmission processing routine illustrated in FIG. 17 when the satellite signal is received by the GPS 124 and images of the surroundings of the vehicle are successively captured by the camera 122.

Transmission Processing Routine

At step S507, the determination section 333 determines whether or not the error information is the predetermined threshold value or above based on the error information computed at step S106 above and the predetermined threshold value. Processing transitions to step S508 when the error information is the predetermined threshold value or above. Otherwise, processing returns to step S100 when the error information is less than the predetermined threshold value.

At step S508, the communications section 334 transmits the error information and the position information.

Other configuration and operation of the map data updating system 310 according to the third exemplary embodiment is similar to that of the first exemplary embodiment, and explanation thereof is therefore omitted.

As explained above, the map data updating system of the third exemplary embodiment computes the error information indicating the difference between the position of the vehicle measured by the position measurement section 128 and the travelling position identified by the travelling position identification section 130. Then, the map data updating system determines whether or not to transmit the computed error information and position information to the server 14, and stores the transmitted error information in the error database in association with the position information. Then, the map data updating system sets a priority level corresponding to that position information based on the error information corresponding to the position information stored in the error database. Communications and the server processing load can thereby be reduced by determining whether or not transmission is required of the error information and the position information.

Fourth Exemplary Embodiment

Next, explanation follows regarding a fourth exemplary embodiment. Portions configured similarly to those of the second exemplary embodiment are allocated the same reference numerals and explanation thereof is omitted.

The fourth exemplary embodiment differs from the first to third exemplary embodiments in that the on-board device of the second exemplary embodiment determines whether or not to transmit computed error information to a server.

Figure 18:
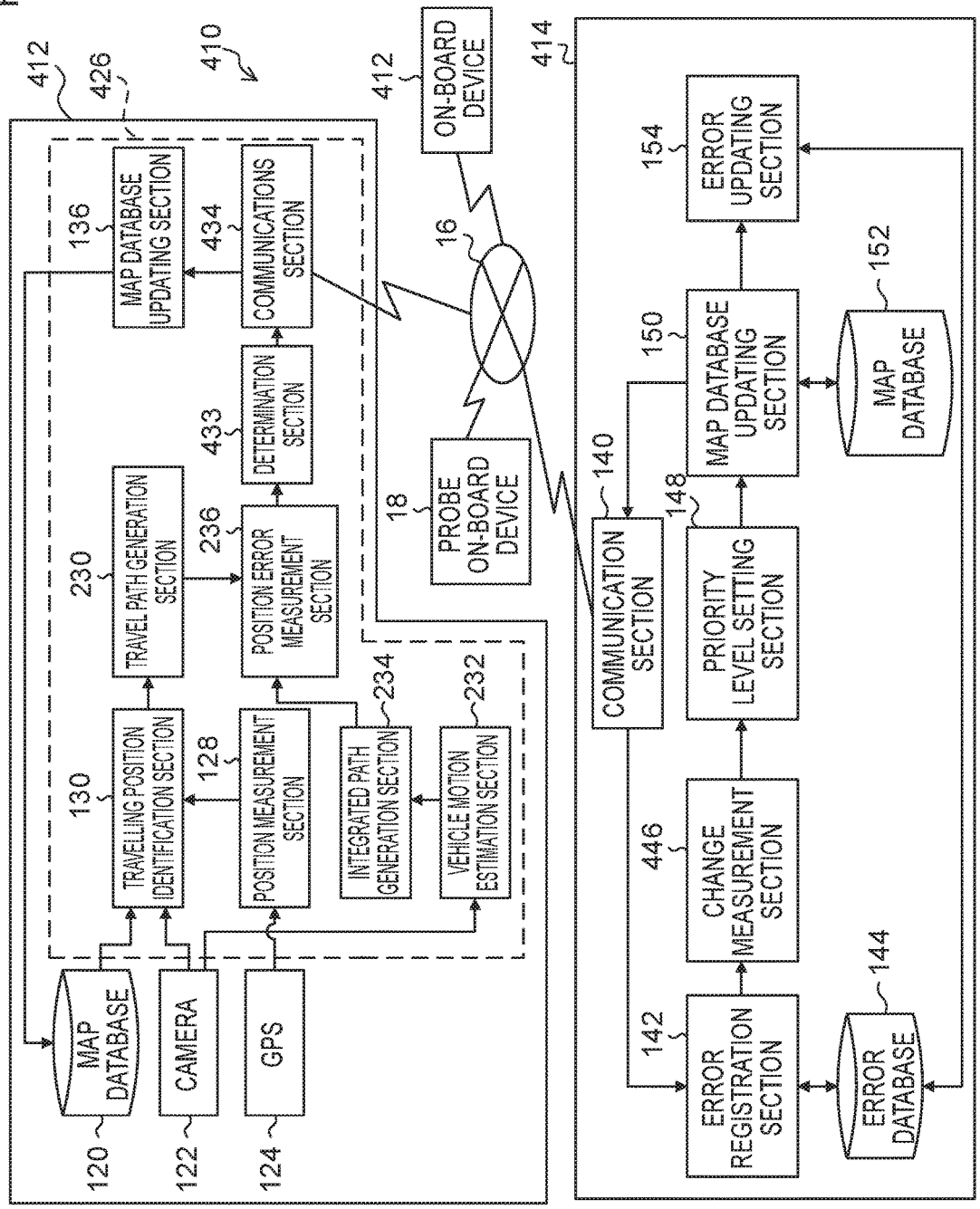
FIG. 18 is a block diagram illustrating a map data updating system according to a fourth exemplary embodiment.

Configuration of Map Data Updating System According to Fourth Exemplary Embodiment As illustrated in FIG. 18, a map data updating system 410 according to the fourth exemplary embodiment includes an on-board device 412, a server 414, and a probe on-board device 18. The on-board device 412, the server 414, and the probe on-board device 18 are connected together via a network 16 such as the internet. The on-board device 412 is an example of an installed device.

The on-board device 412 is installed to a vehicle. The server 414 receives the error information transmitted from the on-board device 412 and updates the map database according to the error information. The probe on-board device 18 transmits, to the server 414, the sensor information for updating the map data, based on the signal output from the server 414.

On-Board Device 412

The on-board device 412 includes the map database 120, the camera 122, the GPS 124, and a computer 426. The on-board device 412 is installed to a vehicle.

Map data is stored in the map database 120. The camera 122 captures images of the surroundings of the vehicle. The GPS 124 receives the satellite signal transmitted from the positioning satellite. The computer 426 computes error information based on the images of the surroundings of the vehicle captured by the camera 122 and the satellite signals received by the GPS 124.

The computer 426 includes a CPU, RAM, and ROM storing a program for executing a transmission processing routine, described later, and is functionally configured as follows. The computer 426 includes a position measurement section 128, a travelling position identification section 130, a travel path generation section 230, a vehicle motion estimation section 232, an integrated path generation section 234, a position error measurement section 236, a communications section 434, and a map database updating section 136.

The position measurement section 128 measures the position of the vehicle based on the satellite signal received by the GPS 124. The travelling position identification section 130 identifies a travelling position of the vehicle on the map data based on the position of the vehicle measured by the position measurement section 128, the surrounding image of the surroundings of the vehicle captured by the camera 122, and the map data of the map database 120. The travel path generation section 230 generates a travel path of the vehicle based on a time series of travelling positions of the vehicle identified by the travelling position identification section 130. The vehicle motion estimation section 232 estimates the motion amount of the vehicle based on the surrounding images of the surroundings of the vehicle captured by the camera 122. The integrated path generation section 234 generates an integrated path of the vehicle based on a time series of motion amounts of the vehicle estimated by the vehicle motion estimation section 232. The position error measurement section 236 computes the error information indicating the difference between the travel path generated by the travel path generation section 230 and the integrated path generated by the integrated path generation section 234. The determination section 433 determines whether or not to transmit the error information to the server 414. The communications section 434 transmits, to the server 414, the error information and the position information computed by the position error measurement section 236 based on the determination result made by the determination section 433. The map database updating section 136 updates the map data stored in the map database 120 according to the map data update information transmitted from the server 414.

The determination section 433 determines whether or not to transmit the error information and the position information according to the error information computed by the position error measurement section 236. More specifically, based on the error information computed by the position error measurement section 236 and a predetermined threshold value, the determination section 433 outputs the error information and the position information to the communications section 434 in cases in which the error information is the predetermined threshold value or above. Then, the communications section 434 transmits, to the server 414, the error information and position information output by the determination section 433.

Based on the error information computed by the position error measurement section 236 and the predetermined threshold value, the determination section 433 does not output the error information or the position information in cases in which the error information is less than the predetermined threshold value.

The predetermined threshold value may be a value that is always constant, or may be set to values that vary according to the travelling position of the vehicle identified by the travelling position identification section 130 or the position of the vehicle measured by the position measurement section 128.

Although determination as to whether or not to transmit the error information and the position information is made according to the error information computed by the position error measurement section 236 in the present exemplary embodiment, determination as to whether or not to transmit the error information and the position information may be made by another method. For example, whether or not transmission is required may be determined according to the travelling position of the vehicle, such that the same vehicle does not transmit large volumes of error information for the same location. Alternatively, determination as to whether or not the error information and position information is to be transmitted may be made according to the number of times that the vehicle has travelled through the place on the map data corresponding to the position information. Alternatively, determination as to whether or not the error information and the position information are to be transmitted may be made according to the date and time of travel when the vehicle was travelling.

The communications section 434 transmits the error information and the position information according to the determination result made by the determination section 433.

Server 414

The server 414 is configured as a server including a CPU, ROM storing, for example, a program for implementing a processing routine, described later, RAM that temporarily stores data, memory serving as a storage unit, a network interface, and the like. The server 414 can be functionally represented as being configured by a communication section 140, an error registration section 142, an error database 144, a change measurement section 446, a priority level setting section 148, a map database updating section 150, a map database 152, and an error updating section 154. The communication section 140 is an example of a reception unit.

The communication section 140 receives the error information and the position information transmitted from the on-board device 412. The error registration section 142 registers the error information received by the communication section 140 in the error database 144. Error information is stored in the error database 144. The change measurement section 446 measures the amount of change in the error information stored in the error database 144. The priority level setting section 148 sets the priority level for a map data update based on the amount of change measured by the change measurement section 446. The map database updating section 150 updates the map data based on the priority level set by the priority level setting section 148. The map data is stored in the map database 152. The error updating section 154 updates the error information stored in the error database 144.

Based on the number of updates to the error information corresponding to a site stored in the error database 144, the change measurement section 446 measures the amount of change at that site. In the present exemplary embodiment, the change measurement section 446 employs the number of receptions at sites registered in the error database 144 as the amount of change since only large error information is transmitted from the on-board device 412. When determination as to whether or not to transmit the error information and the position information is made by the determination section 433 according to the travelling position, the date and time of travel, or the like of the vehicle, the change measurement section 446 computes the amount of change similarly to in the second exemplary embodiment above.

Map Data Updating System Operation

Figure 19:
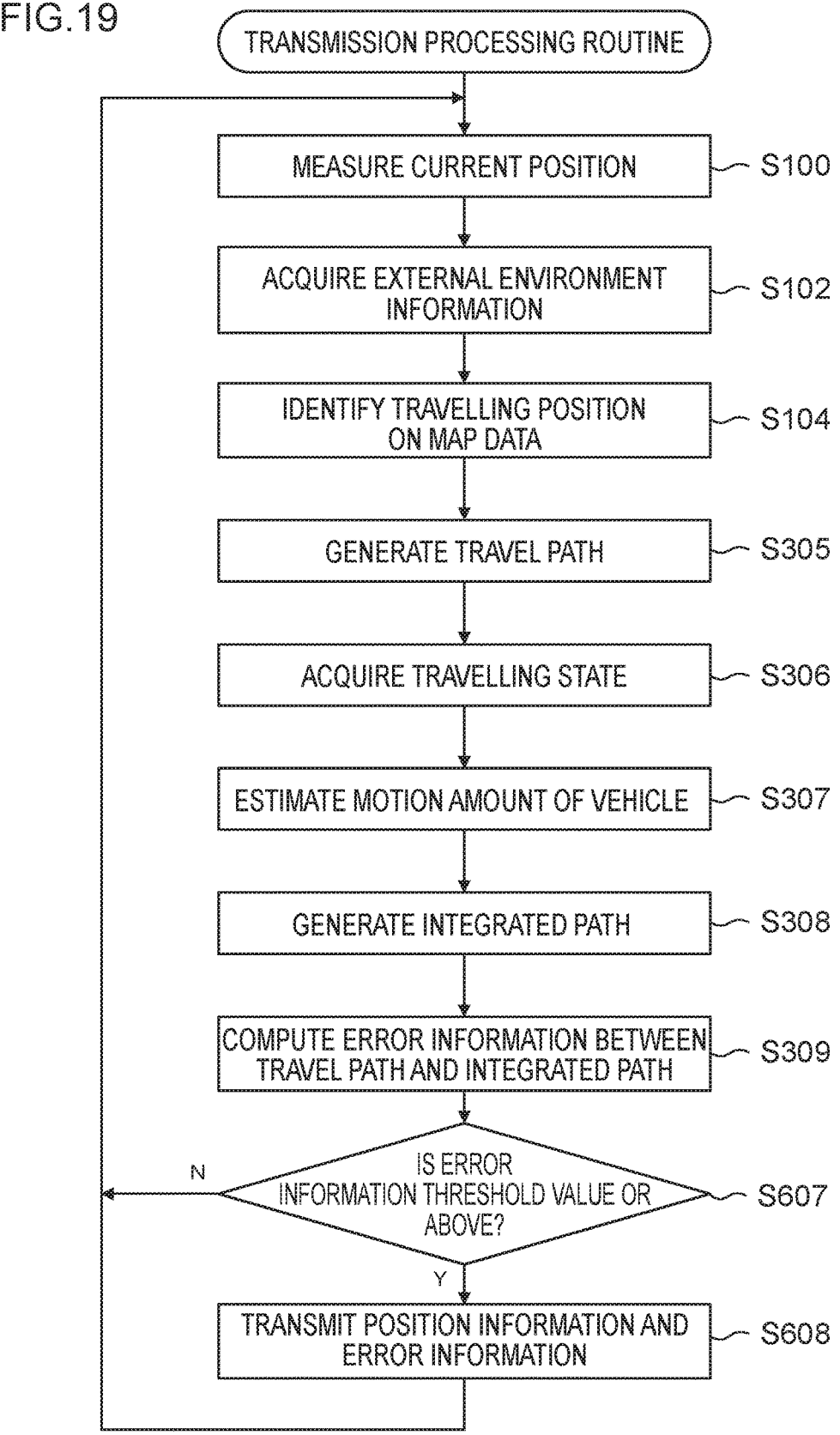
FIG. 19 is a flowchart illustrating content of a transmission processing routine on a computer of an on-board device according to a fourth exemplary embodiment.

Next, explanation follows regarding operation of the map data updating system 410 according to the fourth exemplary embodiment. When respective vehicles installed with the on-board device 412 are travelling, the on-board device 412 of each vehicle executes the transmission processing routine illustrated in FIG. 19, and the server 414 executes the update processing routine illustrated in FIG. 9 mentioned above.

Explanation follows regarding the transmission processing routine executed by the on-board device 412 of each of the vehicles. When the satellite signal is received by the GPS 124 and images of the surroundings of the vehicle are successively captured by the camera 122, the on-board device 412 executes the transmission processing routine illustrated in FIG. 19.

Transmission Processing Routine

At step S607, the determination section 433 determines whether or not the error information is the predetermined threshold value or above based on the error information computed at step S309 above and the predetermined threshold value. Processing transitions to step S608 when the error information is the predetermined threshold value or above. Otherwise, processing returns to step S100 when the error information is less than the predetermined threshold value.

At step S608, the communications section 334 transmits the error information and the position information.

Other configuration and operation of the map data updating system 410 according to the fourth exemplary embodiment is similar to that of the second exemplary embodiment, and explanation thereof is therefore omitted.

As explained above, the map data updating system of the fourth exemplary embodiment generates the travel path of the vehicle based on the time series of travelling positions, generates the integrated path of the vehicle based on the time series of the estimated motion amounts of the vehicle, and computes the error information indicating the difference between the travel path and the integrated path. Then, the map data updating system determines whether or not the computed error information and position information are to be transmitted to the server 414, transmits the computed error information and position information to the server 414, and stores the error information in the error database in association with the transmitted position information. Then, the map data updating system sets the priority level corresponding to the position information based on the error information corresponding to the position information stored in the error database. Communications and the server processing load can thereby be reduced, by determining whether or not transmission of the error information and the position information is required.

Fifth Exemplary Embodiment

Next, explanation follows regarding a fifth exemplary embodiment. Portions configured similarly to those of the first to fourth exemplary embodiments are allocated the same reference numerals, and explanation thereof is omitted.

The fifth exemplary embodiment differs from the first to fourth exemplary embodiment in that the inertial measurement unit (IMU) of the second exemplary embodiment is used to estimate the motion amount of the vehicle.

Figure 20:
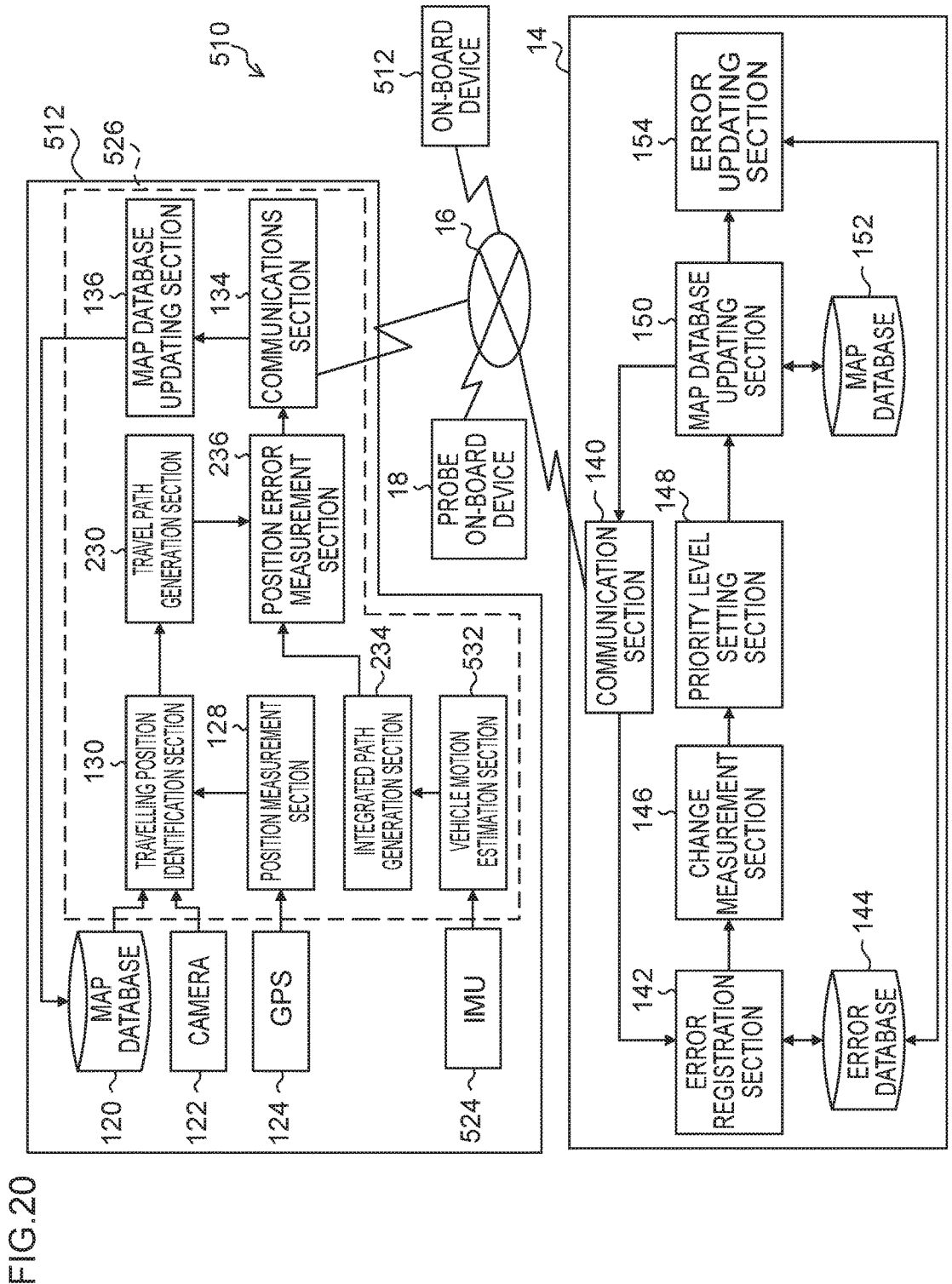
FIG. 20 is a block diagram illustrating a map data updating system according to a fifth exemplary embodiment.

Configuration of Map Data Updating System 510 According to Fifth Exemplary Embodiment As illustrated in FIG. 20, a map data updating system 510 according to the fifth exemplary embodiment includes an on-board device 512, a server 14, and a probe on-board device 18. The on-board device 512, the server 14, and the probe on-board device 18 are connected together via a network 16 such as the internet. The on-board device 512 is an example of an installed device.

The on-board device 512 is installed to a vehicle. The server 14 receives error information transmitted from the on-board device 512, and updates a map database according to the error information. The probe on-board device 18 transmits, to the server 14, sensor information for updating the map data based on a signal output from the server 14.

On-Board Device 512

The on-board device 512 includes a map database 120, a camera 122, a GPS 124, and a computer 526. The on-board device 512 is installed to a vehicle.

Map data is stored in the map database 120. The camera 122 captures images of the surroundings of the vehicle. The GPS 124 receives a satellite signal transmitted from a positioning satellite. The computer 526 computes and transmits error information based on the images of the surroundings of the vehicle captured by the camera 122, the satellite signal received by the GPS 124, and the travelling state of the vehicle detected by an IMU 524.

The IMU 524 successively measures the triaxial angular velocity and acceleration of the vehicle as the travelling state of the vehicle.

The computer 526 includes a CPU, RAM, and ROM storing a program for executing a transmission processing routine, described later, and is functionally configured as follows. The computer 526 includes a position measurement section 128, a travelling position identification section 130, a travel path generation section 230, a vehicle motion estimation section 532, an integrated path generation section 234, a position error measurement section 236, a communications section 134, and a map database updating section 136. The vehicle motion estimation section 532 is an example of a motion amount estimation unit. The position measurement section 128 measures the position of the vehicle based on the satellite signal received by the GPS 124. The travelling position identification section 130 identifies a travelling position of the vehicle on the map data based on the position of the vehicle measured by the position measurement section 128, the surrounding images of the surroundings of the vehicle captured by the camera 122, and the map data of the map database 120. The travel path generation section 230 generates travelling positions of the vehicle based on a time series of travelling positions of the vehicle identified by the travelling position identification section 130. The vehicle motion estimation section 532 estimates the motion amount of the vehicle based on the angular velocity and acceleration of the vehicle detected by the IMU 524. The integrated path generation section 234 generates the integrated path of the vehicle based on the time series of the motion amounts of the vehicle estimated by the vehicle motion estimation section 532. The position error measurement section 236 computes the error information indicating the difference between the travel path generated by the travel path generation section 230 and the integrated path generated by the integrated path generation section 234. The communications section 134 transmits, to the server 14, the error information and position information computed by the position error measurement section 236. The map database updating section 136 updates the map data stored in the map database 120 according to the map data update information transmitted from the server 14.

The vehicle motion estimation section 532 estimates the vehicle speed and yaw rate as the motion amount of the vehicle based on the triaxial angular velocity and acceleration of the vehicle measured by the IMU 524.

Map Data Updating System Operation

Figure 21:
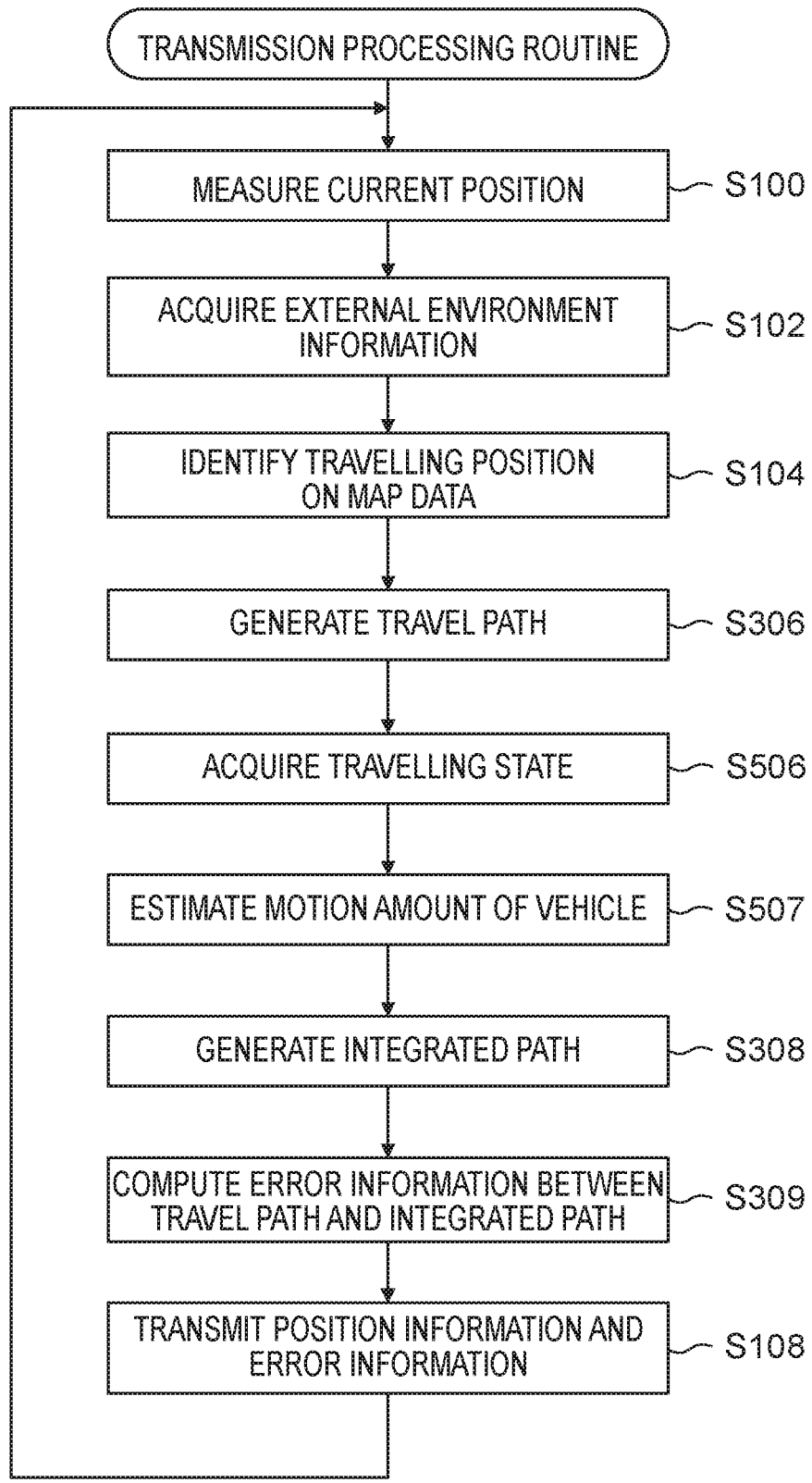
FIG. 21 is a flowchart illustrating content of a transmission processing routine on a computer of an on-board device according to the fifth exemplary embodiment.

Next, explanation follows regarding operation of the map data updating system 510 according to the fifth exemplary embodiment. When respective vehicles installed with the on-board device 512 are travelling, the on-board device 512 of the respective vehicles executes the transmission processing routine illustrated in FIG. 21, and the server 14 executes the update processing routine illustrated in FIG. 9 mentioned above.

Explanation follows regarding a transmission processing routine executed by the on-board device 512 of each of the vehicles. The on-board device 512 executes the transmission processing routine illustrated in FIG. 21 when the satellite signal is received by the GPS 124, images of the surroundings of the vehicle are successively captured by the camera 122, and the angular velocity and acceleration of the vehicle are detected by the IMU 524.

Transmission Processing Routine

At step S506, the vehicle motion estimation section 532 acquires the angular velocity and acceleration of the vehicle detected by the IMU 524.

At step S507, the vehicle motion estimation section 532 estimates the vehicle speed and yaw rate based on the angular velocity and acceleration of the vehicle acquired at step S506 above.

Other configuration and operation of the map data updating system 510 according to the fifth exemplary embodiment is similar to that of the second exemplary embodiment, and explanation thereof is therefore omitted.

As explained above, the map data updating system of the fifth exemplary embodiment generates the travel path of the vehicle based on the time series of travelling positions, and generates the integrated path of the vehicle based on the time series of the motion amounts of the vehicle estimated from the travelling state of the vehicle detected by the IMU 524. Then, the map data updating system computes the error information indicating the difference between the travel path and the integrated path, transmits the computed error information and position information to the server 14, and stores the error information in the error database in association with the transmitted position information. Then, based on the error information corresponding to the position information stored in the error database, the map data updating system sets the priority level corresponding to that position information. The need for an update at respective positions in the map data can thereby be determined.

Sixth Exemplary Embodiment

Next, explanation follows regarding a sixth exemplary embodiment. Portions configured similarly to those of the first to fifth exemplary embodiments are allocated the same reference numerals, and explanation thereof is omitted.

The sixth exemplary embodiment differs from the first to fifth exemplary embodiments in that the difference information is generated based on a result of comparing a travelling position against a lane graph included in the map data, and based on an identification result of the travelling position.

Figure 22:
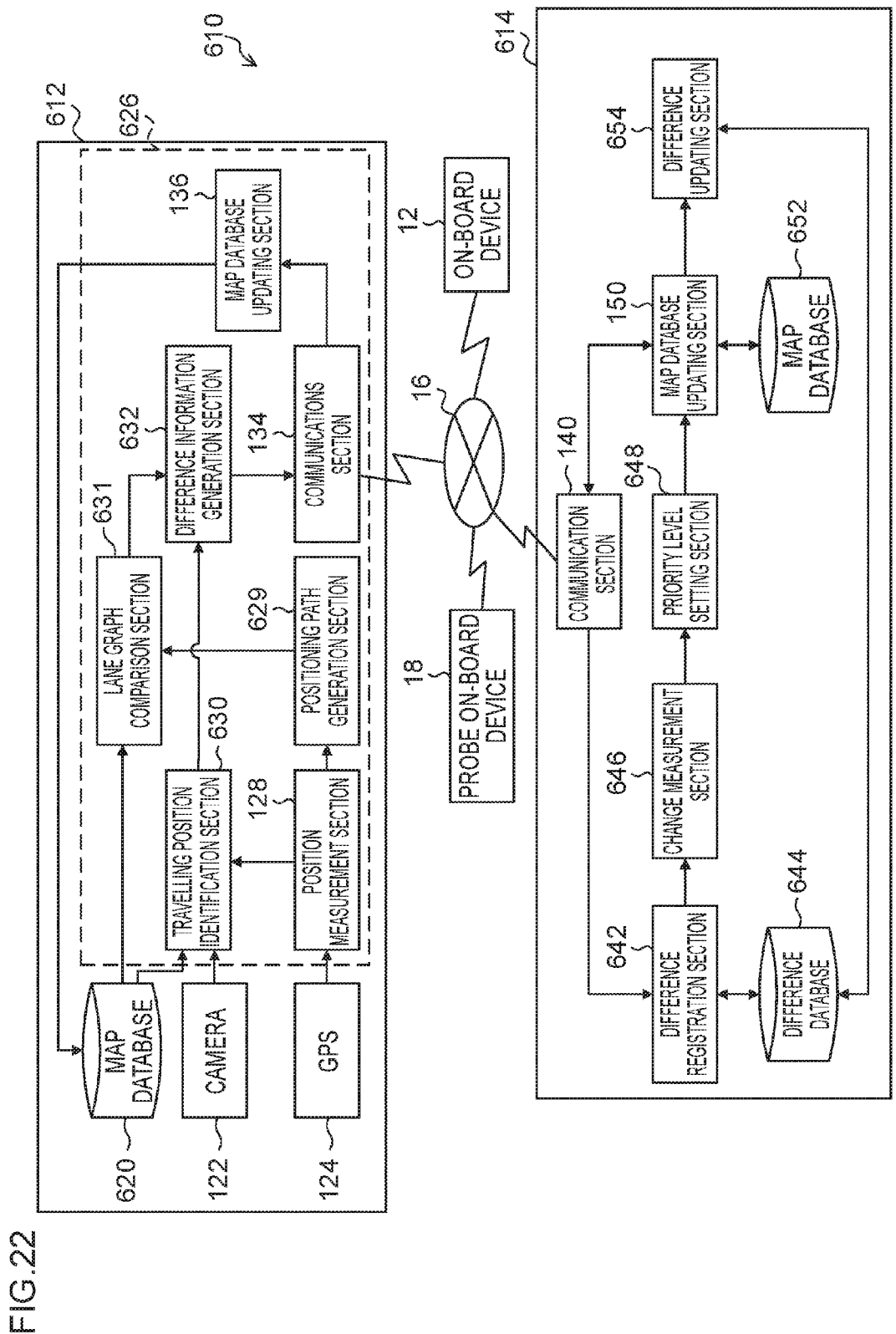
FIG. 22 is a block diagram illustrating a map data updating system according to a sixth exemplary embodiment.

Configuration of a Map Data Updating System 610 According to the Sixth Exemplary Embodiment As illustrated in FIG. 22, the map data updating system 610 according to the sixth exemplary embodiment includes an on-board device 612, a server 614, and a probe on-board device 18. The on-board device 612, the server 614, and the probe on-board device 18 are connected together via a network such as the internet. The on-board device 612 is an example of an installed device. The on-board device 612 is installed to a vehicle. The server 614 receives difference information transmitted from the on-board device 612, and updates a map database according to the difference information. The probe on-board device 18 transmits, to the server 614, sensor information for updating the map data based on a signal output from the server 614.

On-Board Device 612

The on-board device 612 includes a map database 620, a camera 122, a GPS 124, and a computer 626. The on-board device 612 is installed to a vehicle. Map data is stored in the map database 620. The camera 122 captures images of the surroundings of the vehicle. The GPS 124 receives a satellite signal transmitted from a positioning satellite. The computer 626 computes and transmits difference information based on the images of the surroundings of the vehicle captured by the camera 122 and the satellite signal received by the GPS 124.

Figure 23:
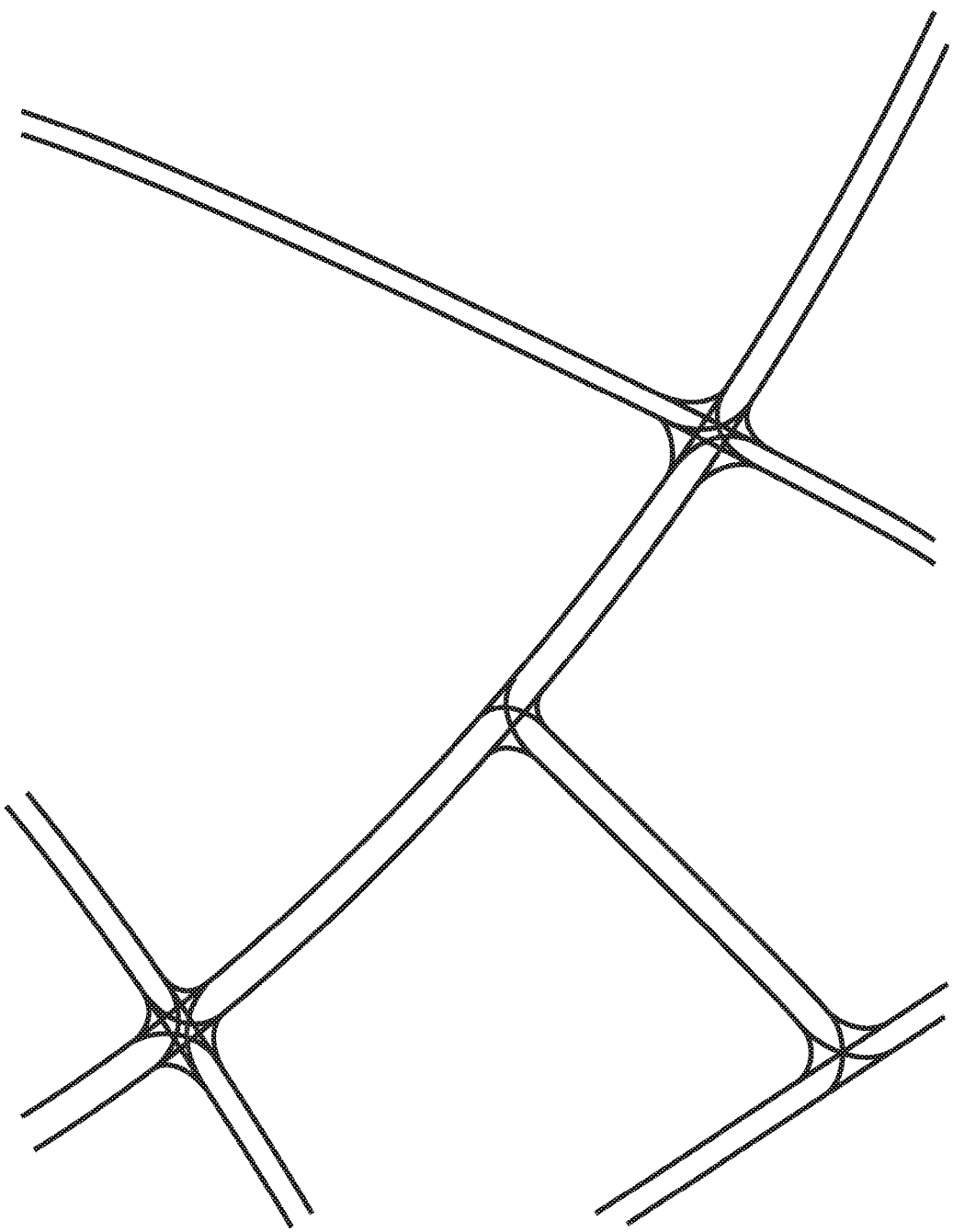
FIG. 23 is a diagram illustrating an example of a lane graph included in map data.

The map data including the lane graph is stored in the map database 620. FIG. 23 is an example of the lane graph. As illustrated in FIG. 23, the lane graph represents a track that guides a vehicle travelling according to traffic regulations. Moreover, the lane graph may be generated from, for example, a travel path of a vehicle, or vehicle lane information drawn on road surfaces. Each point of the lane graph holds latitude, longitude, and altitude information. The lane graph is an example of road information.

The computer 626 includes a CPU, RAM, and ROM storing a program for executing a transmission processing routine, described later, and is functionally configured as follows. The computer 626 includes a position measurement section 128, a travelling position identification section 630, a positioning path generation section 629, a lane graph comparison section 631, a difference information generation section 632, a communications section 134, and a map database updating section 136. The lane graph comparison section 631 is an example of a comparison unit.

The travelling position identification section 630 identifies a travelling position of the vehicle on the map data based on the position of the vehicle measured by the position measurement section 128, the surrounding image of the surroundings of the vehicle captured by the camera 122, and the map data of the map database 620, and computes a confidence level for the collation of the road surface image with the map data. The positioning path generation section 629 generates a positioning path of the vehicle based on a time series of the positions of the vehicle measured by the position measurement section 128. The lane graph comparison section 631 compares the lane graph stored in the map database 620 against the positioning path generated by the positioning path generation section 629. The difference information generation section 632 generates difference information indicating the difference between the road surface image and the map data stored in the map database 620 according to the identification result for the travelling position of the vehicle identified by the travelling position identification section 630 and the comparison result obtained by the lane graph comparison section 631.

The travelling position identification section 630 identifies a travelling position of the vehicle on the map data based on the position of the vehicle measured by the position measurement section 128 and the surrounding image of the surroundings of the vehicle captured by the camera 122, and the map data stored in the map database 620.

More specifically, the travelling position identification section 630 generates a road surface image that is the surrounding image of the surroundings of the vehicle captured by the camera 122 projected onto the road surface. Then, the travelling position identification section 630 identifies a travelling position of the vehicle on the map data by collating the road surface image on the map data obtained from the map database 620 corresponding to the position of the vehicle measured by the position measurement section 128, with the generated road surface image.

Figure 24:
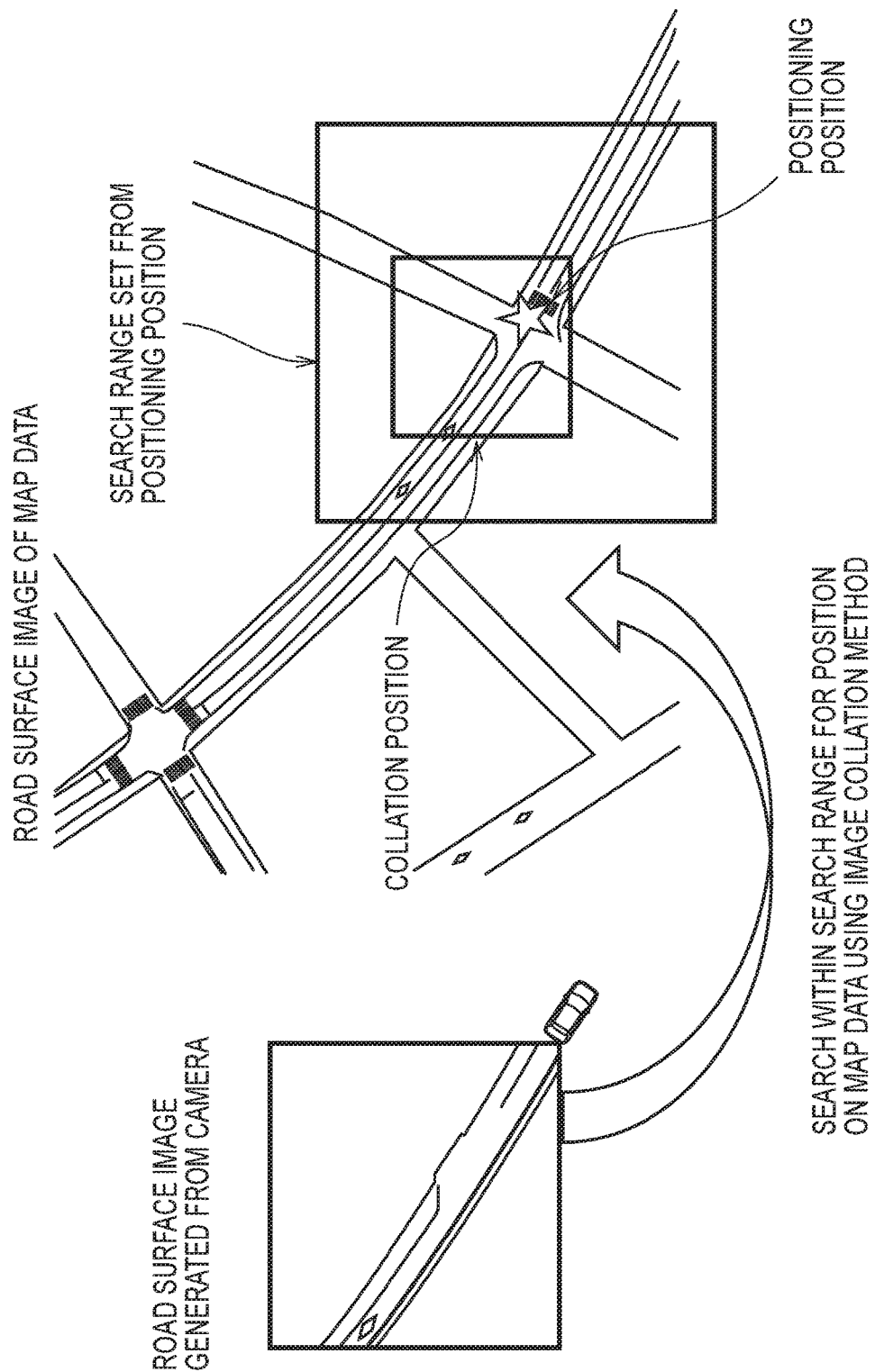
FIG. 24 is an explanatory diagram for explaining an example of collating a road surface image with map data.

In more detail, as illustrated in FIG. 24, the travelling position identification section 630 uses an image collation method to identify the travelling position on the map data by employing the generated road surface image as a template to search for a location on the road surface image of the map data that matches. Normalized correlation matching, phase-only correlation, or the like, may be used as the image collation method.

The travelling position identification section 630 preferably generates an orthoimage over a range of a particular width (for example, approximately 100 m) as the road surface image. This is because even when change occurs in the road surface appearance, there is a high possibility that characteristic patterns or road shapes are included in the orthoimage, and a high possibility that a travelling position of the vehicle on the map data can be identified using this information. In the present exemplary embodiment, explanation is given regarding an example of a case in which an orthoimage is employed as an example of a road surface image.

Next, the travelling position identification section 630 determines whether or not the identification of a travelling position was performed with a high confidence level by collating the road surface image with the map data.

More specifically, the travelling position identification section 630 computes the confidence level for collation of the road surface image with the map data.

Figure 25:
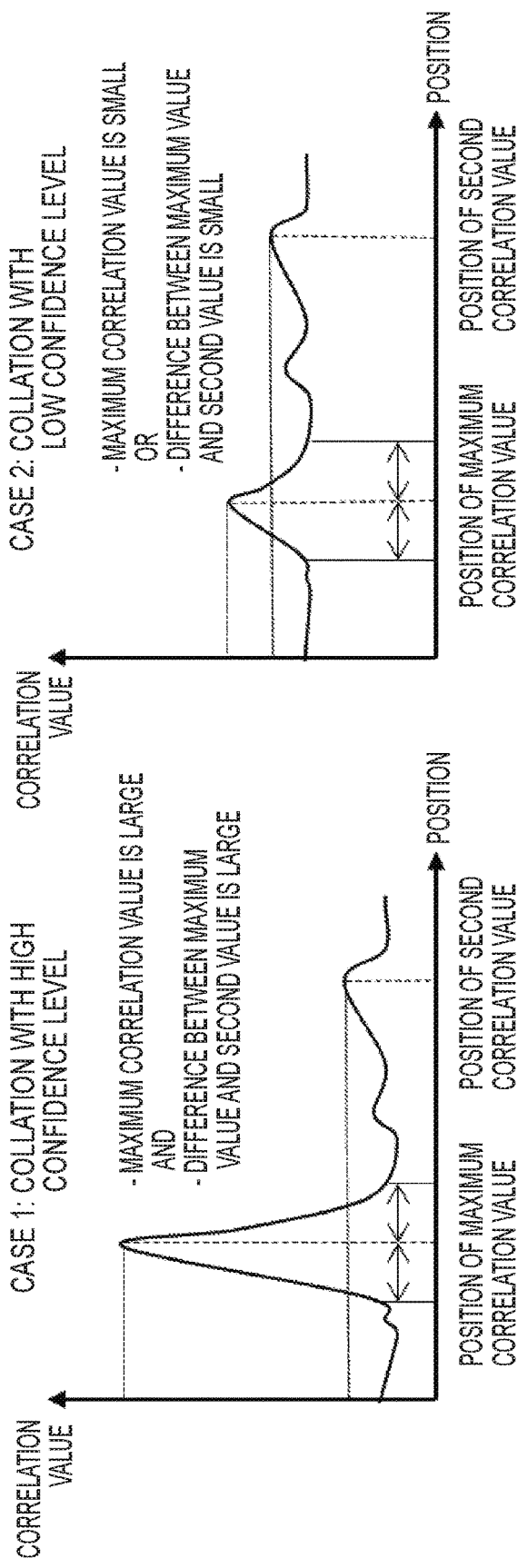
FIG. 25 is an explanatory diagram for explaining an example of a confidence level for collating a road surface image with map data.

For example, as illustrated in FIG. 25, the travelling position identification section 630 computes a correlation value for collation of the road surface image with the road surface image on the map data for respective collation positions. Then, the travelling position identification section 630 determines the collation confidence level to be high in cases in which the maximum correlation value is greater than a predetermined first threshold value, and the difference between the second highest correlation value and the maximum correlation value is greater than a predetermined second threshold value.

Moreover, as illustrated in FIG. 25, the travelling position identification section 630 determines the collation confidence level to be low in cases in which the maximum correlation value is the predetermined first threshold value or less, or the difference between the second highest correlation value and the maximum correlation value is the predetermined second threshold value or less.

In the present exemplary embodiment, a generation method for the difference information, described later, is determined according to the computed collation confidence level.

The positioning path generation section 629 generates the positioning path of the vehicle from a time series of the positions of the vehicle measured by the position measurement section 128.

The lane graph comparison section 631 compares the positioning path generated by the positioning path generation section 629 against the lane graph included in the map data stored in the map database 620, and computes a value indicating a sum of disparities between the positioning path and the lane graph.

In the present exemplary embodiment, explanation is given regarding an example of a case in which a positioning path, indicating a path of positioning positions of past fixed-distance intervals from a current position of the vehicle, is compared against the lane graph.

Figure 26:
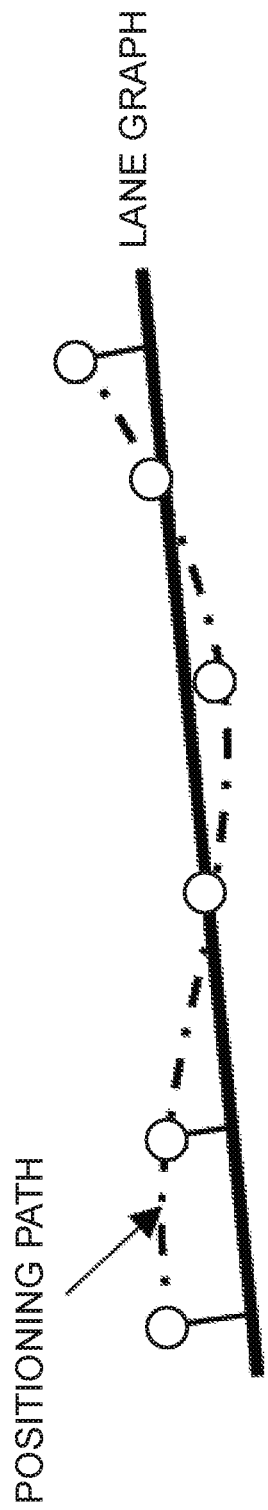
FIG. 26 is an explanatory diagram for explaining an example of difference between a positioning path and a lane graph.

More specifically, as illustrated in FIG. 26, the lane graph comparison section 631 may find the sum of distances between respective points on the positioning path and the closest points on the lane graph as the sum of disparities between the positioning path and the lane graph. Although the positioning path and the lane graph are represented in two dimensions in the example illustrated in FIG. 26, the distances may be measured in three dimensional coordinates since the positioning path and the lane graph hold three dimensional information. Note that other than the sum of the disparities between the positioning path and the lane graph, the maximum value, the average value, and the like may also be employed.

Then, the lane graph comparison section 631 determines that the positioning path and the lane graph match in cases in which the computed value is a preset threshold value or less. Moreover, the lane graph comparison section 631 determines that the positioning path and the lane graph do not match in cases in which the computed value is greater than the preset threshold value. Note that the threshold value may be a constant value at all positions, or different values may be used depending on the position.

According to the identification result for the travelling position of the vehicle in the range for generating the predetermined difference information on the map data identified by the travelling position identification section 630, and the comparison result obtained by the lane graph comparison section 631 for the range for generating the predetermined difference information, the difference information generation section 632 divides the region of the range for generating that difference information into plural part regions. Then, the difference information generation section 632 generates difference information indicating the difference between the road surface image generated by the travelling position identification section 630 and the road surface image of the map data stored in the map database 620, for each of the part regions.

In the present exemplary embodiment, by employing information covering a particular wide range in the identification of the travelling position by the travelling position identification section 630, stable identification of the positioning path is performed even when change arises in that range. Then, in the generation of the difference information, rather than finding difference information using the entire road surface image, the points on the map data which are points where a difference arises are more finely ascertained by dividing respective collated road surface images (for example, a road surface image generated from a camera and a portion of a road surface image of map data) into part regions, and generating difference information for each of the divided part regions.

When the travelling position identification processing is performed on information over a wide range, the possibility that the correct travelling position can be identified (for example, that collation can be performed with a high confidence level) is high, and the difference information can be generated by difference processing of simple characteristics when a travelling position is identifiable, such that a low processing load suffices.

However, if difference information were to be generated by employing road surface images collated with each other, there would be no change between large portions of the collated road surface images even if a change was actually present in the road surface image or the like, and difference information of the changed portion would be buried. However, for differences of respective pixels of the road surface images, there would be a possibility that large value difference information would be mistakenly generated in response to noise and the like.

Thus, the travelling position identification is performed over a predetermined wide range, and there is a higher possibility that efficient and stable difference information can be generated due to finding the difference information to the map data by dividing the predetermined wide range employed in the travelling position identification into part regions.

More specifically, when determination is made that the positioning path matches the lane graph in the comparison result made by the lane graph comparison section 631 and the travelling position identification section 630 determines that the collation confidence level is high, the difference information generation section 632 generates difference information indicating the difference between the road surface image and the map data based on the respective part regions of the road surface images generated by the travelling position identification section 630 and the respective part regions of road surface images in the map data.

Figure 27:
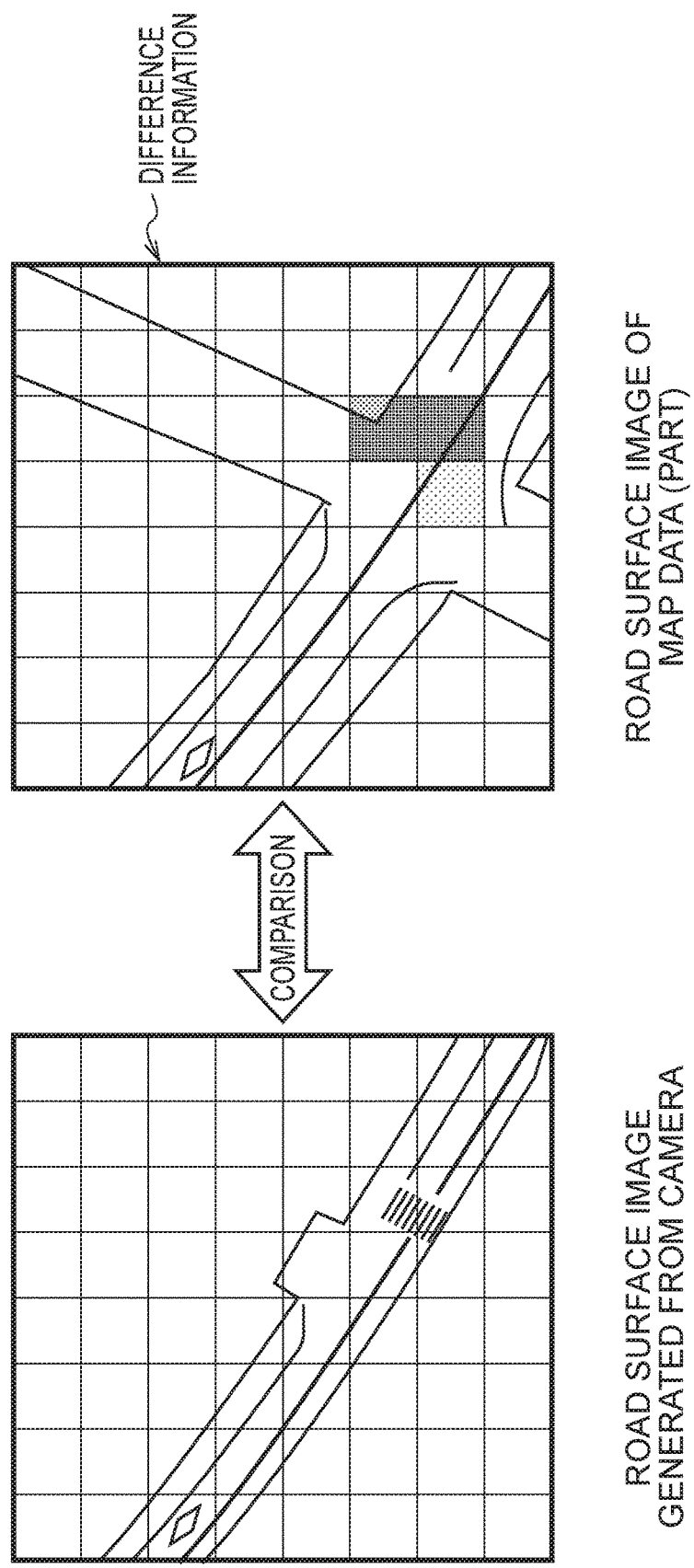
FIG. 27 is an explanatory diagram for explaining difference information.

In more detail, as illustrated in FIG. 27, for each part region, the difference information generation section 632 calculates the difference between the part region of the road surface image of the map data and the part region of the road surface image corresponding to that part region. In the present exemplary embodiment, the total of disparities in brightness values for respective pixels in the part region is employed as the difference information. The average disparity in brightness values of the respective pixels of the part region may also be employed as the difference information. The correlation of a histogram of edge gradients in the part region may also be used as the difference information.

In the example of FIG. 27, a diamond shaped road marking on the map data, a vehicle lane division, or the like is effective collation information, and collation can be performed at a high confidence level. Due to a newly constructed pedestrian crossing present at the lower right of the road surface image, the result of the comparison between the part regions is a large difference for only the part region corresponding to the newly constructed pedestrian crossing.

However, when the positioning path and the lane graph are determined to be matching in the comparison result made by the lane graph comparison section 631, and the travelling position identification section 630 has determined that the collation confidence level is low, the difference information generation section 632 generates difference information based on feature regions of the respective part regions of the road surface image generated by the travelling position identification section 630 and the feature regions of the respective part regions of the road surface image of the map data.

Figure 28:
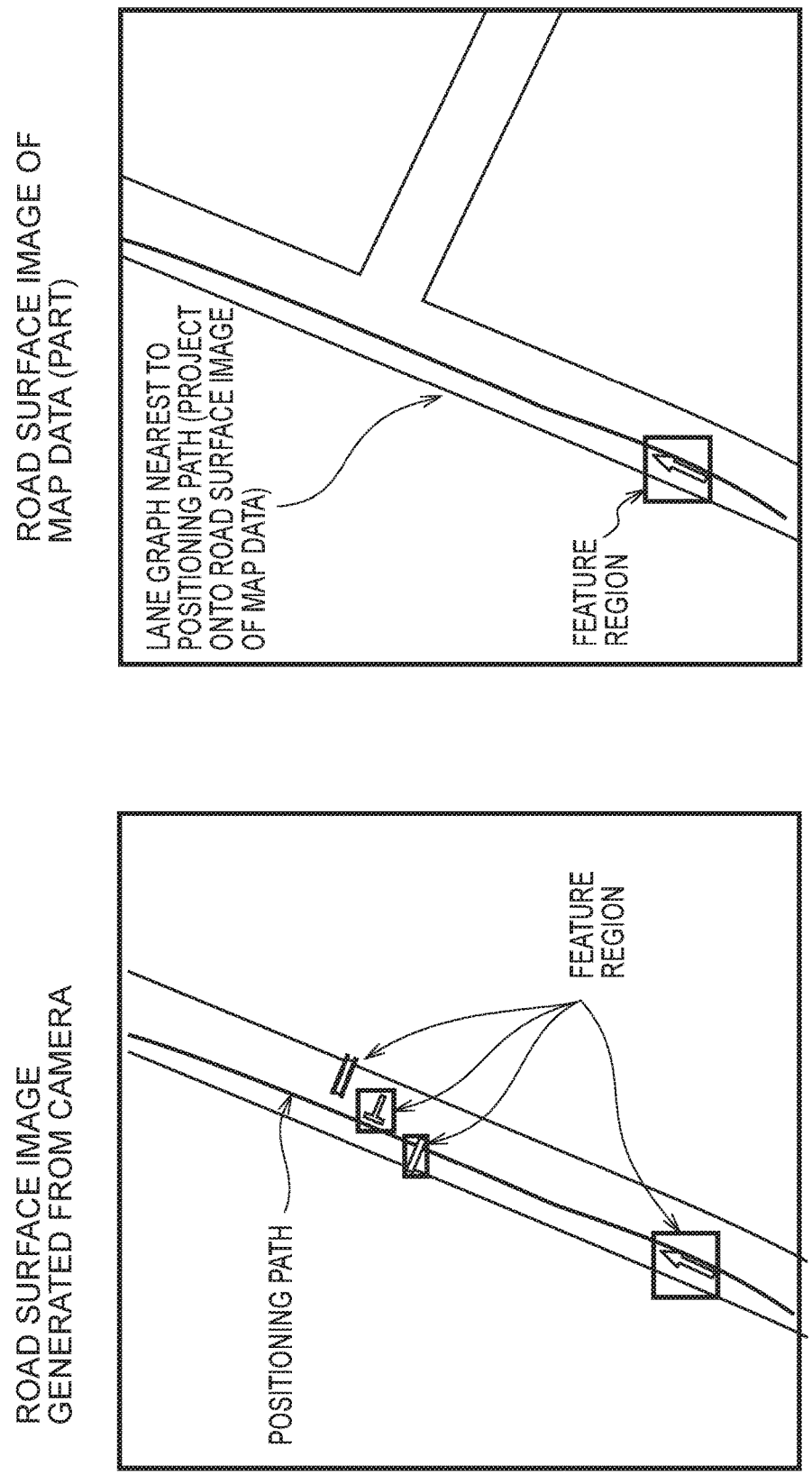
FIG. 28 is an explanatory diagram for explaining difference information.

In more detail, as illustrated in FIG. 28, the difference information generation section 632 extracts a feature region from the respective part regions of the road surface image as the feature region.

For example, the difference information generation section 632 extracts a region having an edge gradient in a direction orthogonal to the positioning path, or a group of equivalent brightness levels (for example, white colors, orange colors, or the like) as the feature region.

Next, as illustrated in FIG. 28, the difference information generation section 632 selects the lane graph closest to the positioning path. Then, the difference information generation section 632 extracts a feature region on the road surface image of the map data corresponding to the selected lane graph. Feature regions extracted in this case are only those in the vicinity of the selected lane graph. Note that when there is additional processing time or resources available, the difference information generation section 632 may also implement road surface marking detection. This approach is adopted in consideration of which regions are effective for identifying travelling position. When the collation confidence level is low, despite the presence of such information, it is conceivable that there is a large scale change to the road surface appearance or a newly constructed road.

Figure 29:
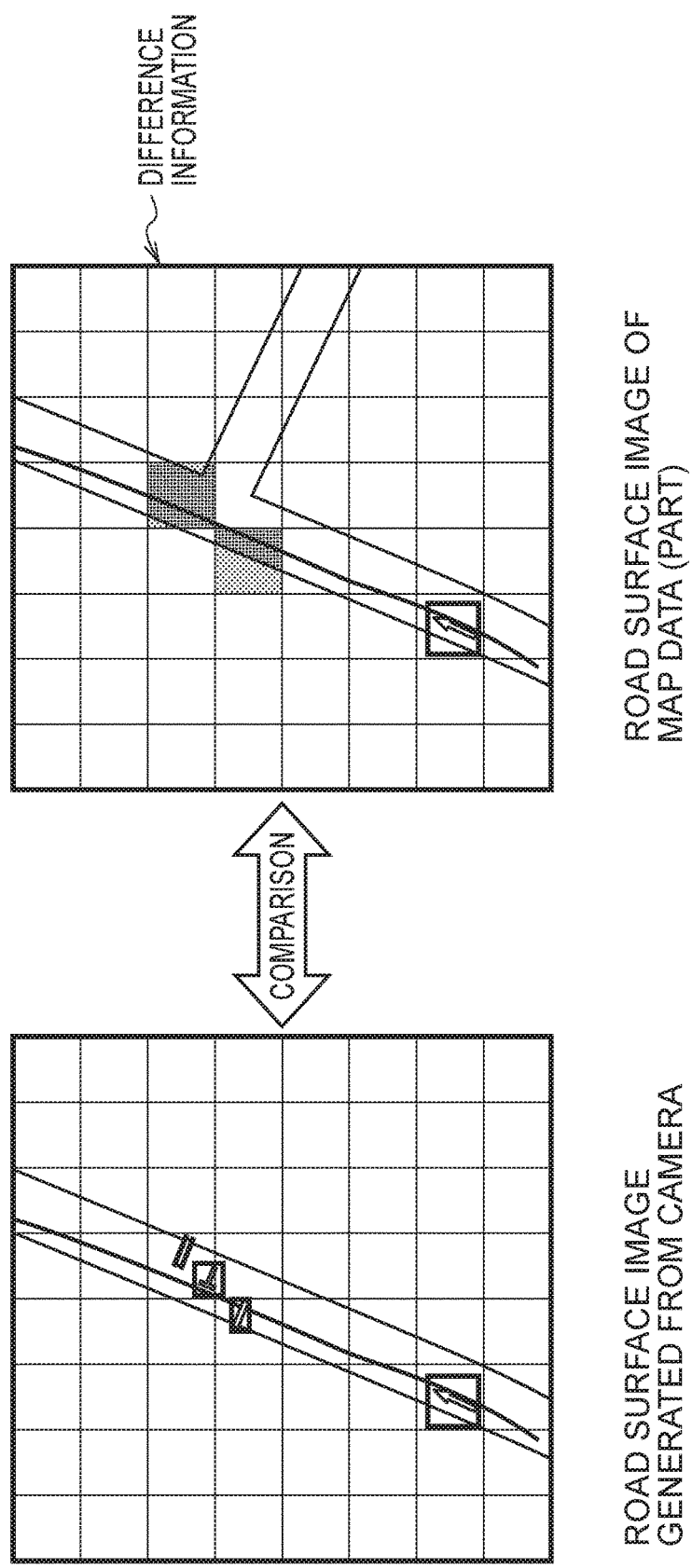
FIG. 29 is an explanatory diagram for explaining difference information.

Then, as illustrated in FIG. 29, the difference information generation section 632 compares the presence or absence of a feature region in the corresponding region between the road surface image and the road surface image of the map data. Then, when there is a disparity in the presence or absence of the feature region, the difference information generation section 632 adds a difference value to that feature region and generates difference information.

In the example illustrated in FIG. 29, a forward direction indication, a stop line, and an intersection point cross mark are extracted as the feature region from the road surface image, and the forward direction display is extracted as the feature region from the road surface image of the map data. In the example illustrated in FIG. 29, the difference information generation section 632 determines that there is no difference since the forward direction indication is present in same feature region, and the difference value is not included in that feature region in the generated difference information. However, the difference information generation section 632 adds the difference value to the feature regions where the stop line and the intersection point cross mark are present, and the difference values of those feature regions are included in the generated difference information. Note that the difference values may all be constant, or may vary depending on the size and shape of the extracted features.

Moreover, when it is determined that the positioning path and the lane graph do not match in the comparison result made by the lane graph comparison section 631, and the travelling position identification section 630 it is determined that the collation confidence level is high, the difference information generation section 632 generates difference information indicating the difference between the road surface image and the map data based on the respective part regions of the road surface image generated by the travelling position identification section 630 and the respective part regions of the road surface image of the map data.

When it is determined that the positioning path and the lane graph do not match and it is determined that the collation confidence level is high, it is conceivable that the difference between the lane graph and the positioning path has become large due to a positioning error arising.

Thus, it is determined that a travelling position on the map data was correctly identified since the collation confidence level is high, and the processing performed is similar to that performed when it is determined that the positioning path and the lane graph match and it is determined that the collation confidence level is high.

Moreover, cases are also conceivable of collation to another position that is different from the travelling position on the map, but that has a similar road surface pattern (for example, collation to another intersection point several tens of meters from the target), due to a large misalignment in the positioning result. Thus, the difference information generation section 632 may also generate difference information in which the value of the difference value is made smaller according to the amount of misalignment between the positioning path and the lane graph.

Moreover, when it is determined that the positioning path and the lane graph do not match in the comparison result made by the lane graph comparison section 631 and the travelling position identification section 630 determines that the collation confidence level is low, the difference information generation section 632 generates difference information based on the respective part regions of the road surface image generated by the travelling position identification section 630 and the respective part regions on the positioning path generated by the positioning path generation section 629.

Figure 30:
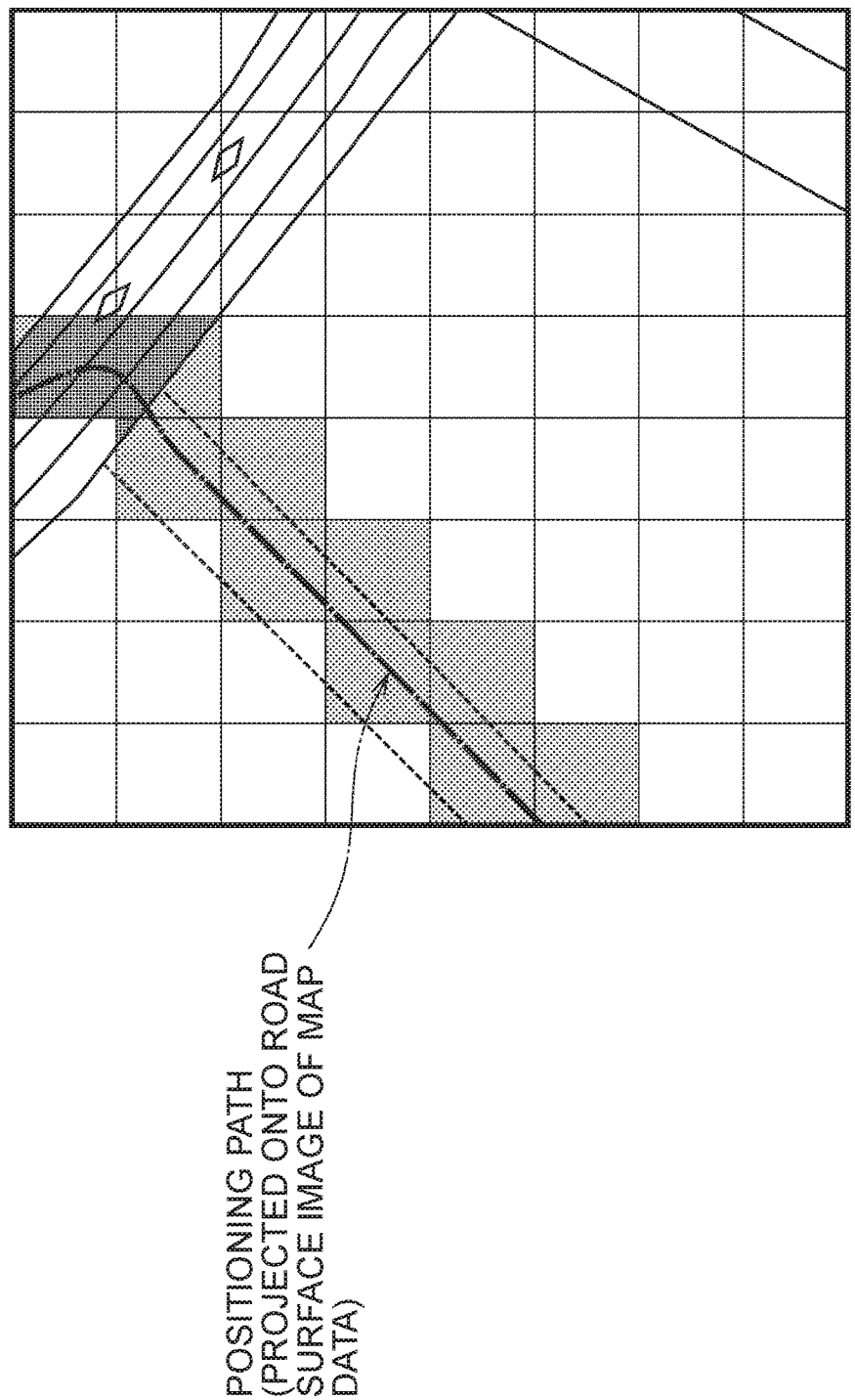
FIG. 30 is an explanatory diagram for explaining difference information.

Since the possibility of a new road is particularly high in such cases, the difference information generation section 632, as illustrated in FIG. 30, projects the positioning path onto the map data, and sets the difference value of the part region on the projected positioning path to a predetermined value for generation as difference information.

Figure 31:
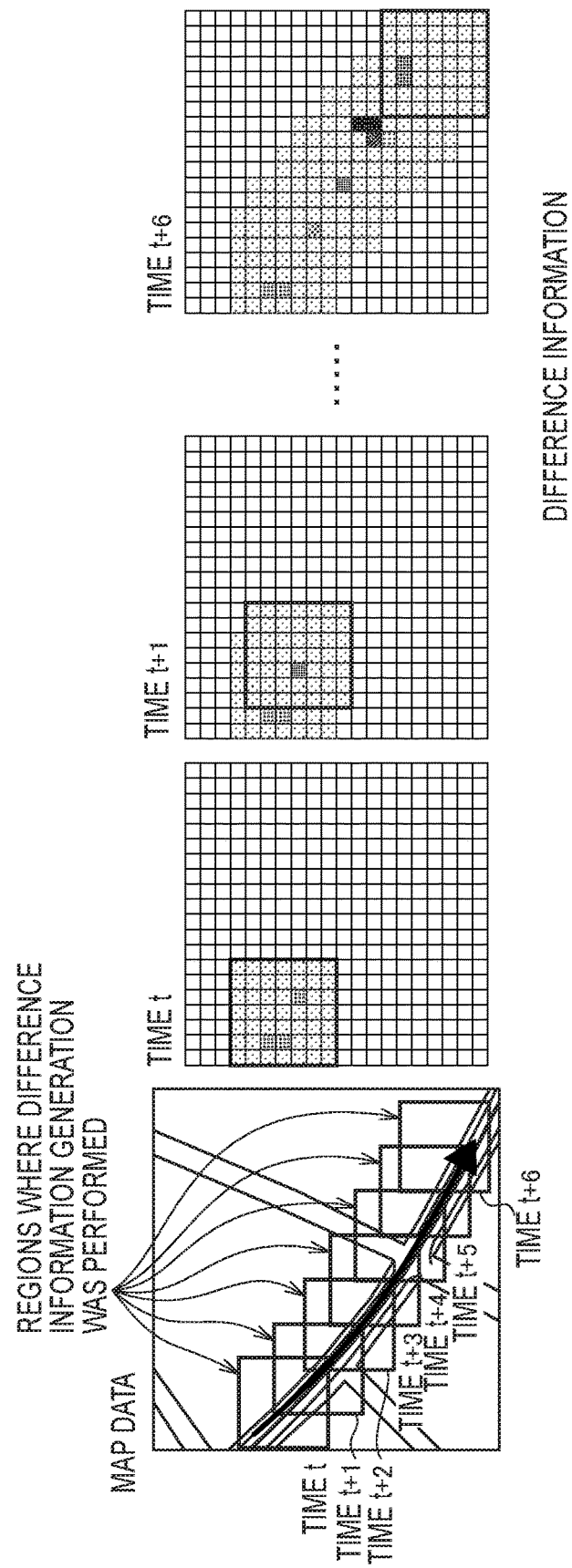
FIG. 31 is an explanatory diagram for explaining difference information.

Note that the difference information generated by the first round of processing by the difference information generation section 632 is the difference information for a single portion of the map data, such as that illustrated in FIG. 31. Accordingly, it is efficient to hold difference information on the same map data, and to dispatch the difference information to the next round of processing at a timing at which the travelling position of the vehicle has migrated to a neighboring map database. Holding the difference information enables the difference values of respective part regions to be averaged. Moreover, the number of times that the difference values of the respective part regions have been measured is registered as supplementary information.

The communications section 134 transmits, to the server 614, difference information generated by the difference information generation section 632, and the position information indicating the position of the vehicle measured by the position measurement section 128 and the travelling position of the vehicle identified by the travelling position identification section 630. Distinguishing information representing the position is appended to each part region in the difference information, and this information is employed to update a difference database 644, described later.

Moreover, the communications section 134 receives the map data update information transmitted from the server 614. Note that one out of the position of the vehicle measured by the position measurement section 128 or the travelling position of the vehicle identified by the travelling position identification section 630 may be employed as the position information.

Server 614

The server 614 is configured as a server including ROM storing, for example, a program for implementing a processing routine, described later, RAM that temporarily stores data, memory serving as a storage unit, a network interface, and the like. The server 614 can be functionally represented as being configured by a communication section 140, a difference registration section 642, a difference database 644, a change measurement section 646, a priority level setting section 648, a map database updating section 150, a map database 652, and a difference updating section 654. The communication section 140 is an example of a reception unit, and the priority level setting section 648 is an example of an update information setting unit.

The communication section 140 receives the difference information and position information transmitted from the on-board device 612. The difference registration section 642 registers the difference information received by the communication section 140 in the difference database 644. The difference information is stored in the difference database 644. The change measurement section 646 sets the amount of change in the difference information stored in the difference database 644. The priority level setting section 648 sets the map data update priority level based on the amount of change set by the change measurement section 646. The map database updating section 150 updates the map data based on the priority level set by the priority level setting section 648. Map data that includes the lane graph is stored in the map database 652. The difference updating section 654 updates the difference information stored in the difference database 644.

The communication section 140 receives the difference information and position information transmitted from the on-board device 612. Moreover, the communication section 140 transmits, to the on-board device 612, the map data update information output from the map database updating section 150, described later. Moreover, the communication section 140 transmits an information request to the probe on-board device 18 requesting sensor information for the area at which the map data is to be updated. Moreover, the communication section 140 receives the sensor information transmitted from the probe on-board device 18.

The difference registration section 642 stores difference information in the difference database 644 in association with the site corresponding to the position information received by the communication section 140. More specifically, the difference registration section 642 registers difference information in a storage region corresponding to the difference database 644 based on the position information on the map data appended to the difference information.

Figure 32:
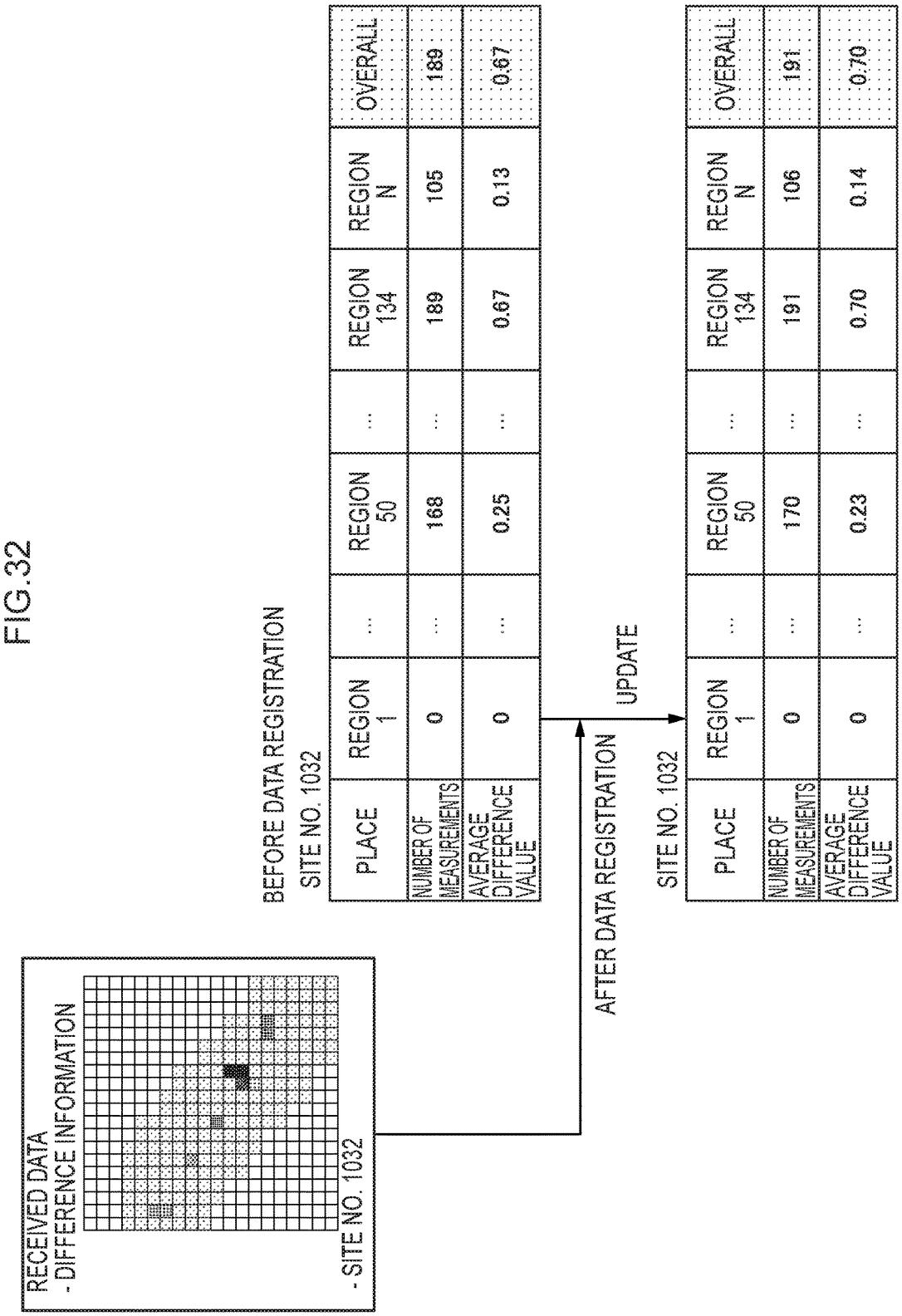
FIG. 32 is an explanatory diagram for explaining an example of a difference database.

Difference information, stored in association with sites, is stored in the difference database 644. FIG. 32 schematically illustrates the difference database 644.

As illustrated in FIG. 32, difference information is stored in the difference database 644 for each site, and the difference information for the corresponding site is updated. In the example of FIG. 32, the number of measurements for the respective part regions of site No. 1032 and the averages of the difference values included in the difference information are being updated.

Based on the difference information corresponding to a site stored in the difference database 644, the change measurement section 646 sets an index of the amount of change at that site. In order to set a priority level, described later, for each site, the change measurement section 646 sets the index of the amount of change for the site overall, and stores the index in the difference database 644. In the present exemplary embodiment, the maximum value of the difference values of the part regions registered for each site of the map data is set as the difference value of the site overall, and this index is used to determine priority levels. The number of part regions having a difference value of a fixed value or above may, for example, be employed as the difference value of the site overall. Moreover, the cumulative total times may also be employed when setting the priority level such that the value of the site overall is set. Although the number of measurements is set to the measurement count for the part region having the maximum difference value here, the number of times that the difference database 644 has been updated may be set to the number of measurements.

For each registered site, the priority level setting section 648 sets the update priority level as the information indicating whether or not the map data corresponding to the site is to be updated, based on the difference information corresponding to the site stored in the difference database 644 and the index of the amount of change set by the change measurement section 646. As the method of setting the update priority level in the present exemplary embodiment, values for five stages, from one to five (for example, one indicating that an update is not required, and five indicating that an update is required), are set by a predetermined threshold value for the difference value of the site overall. In such cases, the threshold value may be the same value for all of the sites, or may different determination conditions may be set for each site.

However, data indicating the number of measurements is not included in the magnitude of the difference value, and in cases in which a large difference value is inadvertently measured when the number of measurements is low (for example, when the map data has just been updated), the update priority level is sometimes set high despite there being insufficient data. Thus, it is preferable to set the update priority level low in cases in which the number of measurements is not a given number or above. However, in such cases, it is possible that the required minimum number of measurements will not be obtained in places with low traffic volumes even after a long time has elapsed. Thus, configuration is made such that in cases in which a period of a given length has elapsed since the previous update, the priority level setting section 648 can set the priority level high using the difference value even though the minimum measurement count has not been reached.

The difference updating section 654 updates the difference information at the site at which the map data was updated. More specifically, the difference updating section 654 is configured to be capable of erasing all of the difference information for a site at which the map data was updated, and capable of recording the difference information corresponding to newly acquired map data.

Note that in cases in which the time and date information is appended to difference information, processing to erase past difference information may also be performed even in cases in which the map data was not updated, under predetermined conditions in consideration of the server capacity.

Map Data Updating System Operation

Figure 33:
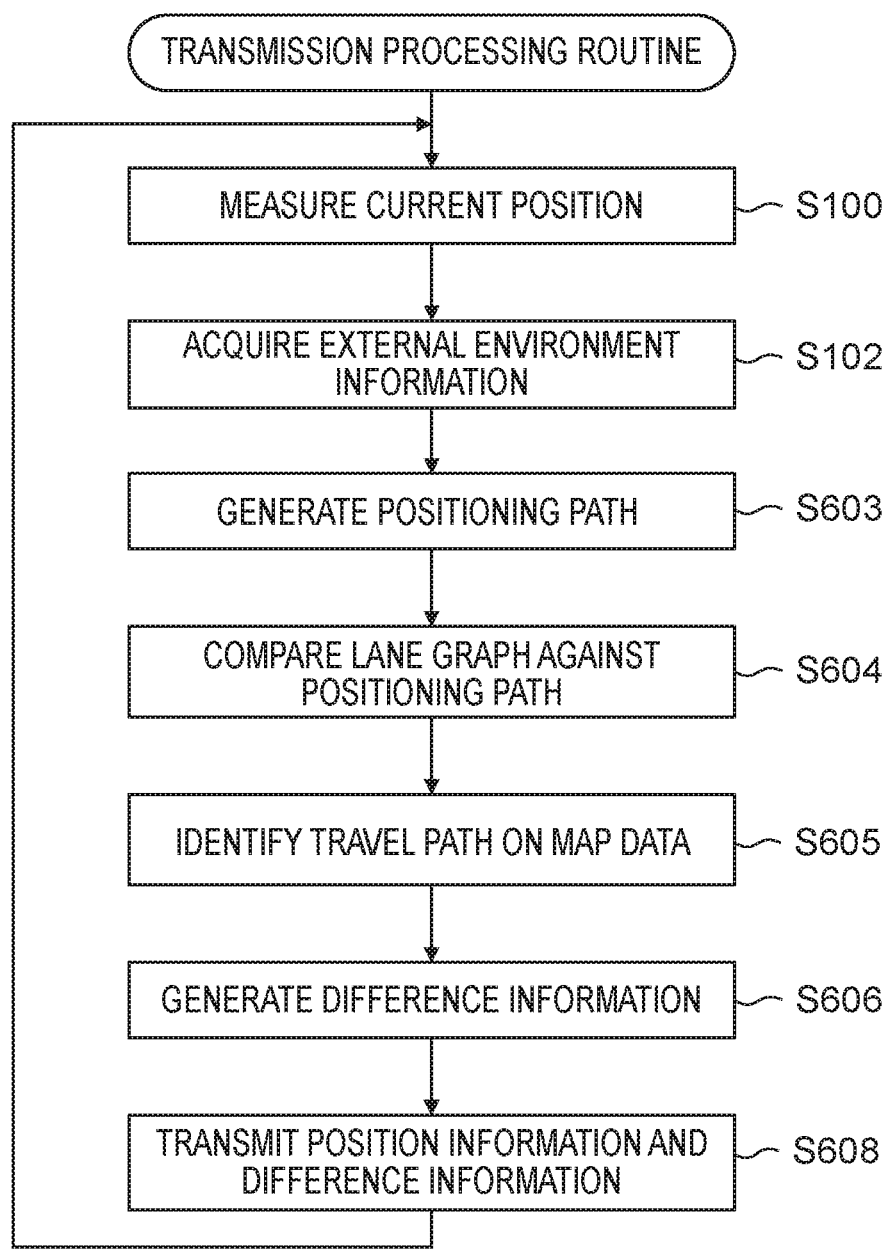
FIG. 33 is a flowchart illustrating content of a transmission processing routine on a computer of an on-board device according to the sixth exemplary embodiment.

Next, explanation follows regarding operation of the map data updating system 610 according to the sixth exemplary embodiment. When respective vehicles installed with the on-board device 612 are travelling, the on-board device 612 of each vehicle executes the transmission processing routine illustrated in FIG. 33, and the server 614 executes the update processing routine illustrated in FIG. 9 mentioned above.

Explanation follows regarding the transmission processing routine executed by the on-board device 612 of each of the vehicles. When the satellite signal is received by the GPS 124 and images of the surroundings of the vehicle are successively captured by the camera 122, the on-board device 612 executes the transmission processing routine illustrated in FIG. 33.

Transmission Processing Routine

At step S603, the positioning path generation section 629 generates the positioning path of the vehicle from the time series of the positions of the vehicle measured at step S100.

At step S604, the lane graph comparison section 631 compares the positioning path generated at step S603 mentioned above against the lane graph included in the map data stored in the map database 620, and computes a value indicating the sum of the disparities between the positioning path and the lane graph.

At step S605, the travelling position identification section 630 generates a road surface image that is the surrounding image of the surroundings of the vehicle acquired at step S102 mentioned above projected onto the road surface. Then, the travelling position identification section 630 identifies a travelling position of the vehicle on the map data by collating the road surface image on the map data obtained from the map database 620 corresponding to the position of the vehicle measured at step S100 mentioned above, with the generated road surface image. Moreover, the travelling position identification section 630 computes a collation confidence level for the road surface image with the map data.

At step S606, the difference information generation section 632 generates difference information indicating the difference between the road surface image generated by the travelling position identification section 630 and the map data stored in the map database 620, according to the collation confidence level between the road surface image and map data computed at step S605 above, and the comparison result obtained by the lane graph comparison section 631.

At step S608, the communications section 134 transmits, to the server 614, the difference information generated at step S606 mentioned above, and the position information indicating the position of the vehicle measured at step S100 and the travelling position of the vehicle identified at step S605 mentioned above.

Next, explanation follows regarding operation of the server 614. When the communication section 140 of the server 614 receives the difference information and position information transmitted from the on-board device 612, the difference registration section 642 stores the difference information in the difference database 644 in association with the site corresponding to the position information received by the communication section 140. The difference registration section 642 of the server 614 stores the difference information in the difference database 644 each time position information and difference information are received.

Then, the server 14 executes the update processing routine illustrated in FIG. 9 mentioned above for respective predetermined periods.

Other configuration and operation of the map data updating system 610 according to the sixth exemplary embodiment is similar to that of the first exemplary embodiment, and explanation thereof is therefore omitted.

As explained above, the map data updating system of the sixth exemplary embodiment generates difference information according to the identification result for the travelling position of the vehicle on the map data identified by the travelling position identification section 630, and the comparison result obtained by the lane graph comparison section 631. The need for an update at respective positions in the map data can thereby be determined.

Moreover, the need for an update to the map data and the priority level can be determined according to the discrepancy between the travelling position of the vehicle and the lane graph on the map data, and the discrepancy between the road surface image obtained from the external environment information of the vehicle and the road surface image on the map data.

In the sixth exemplary embodiment, explanation has been given regarding a case in which difference information is generated according to the identification result of the travelling position of the vehicle on the map data, and the comparison result between the lane graph and the positioning path of the vehicle; however, there is no limitation thereto.

For example, difference information may be generated according to the identification result of the travelling position of the vehicle on the map data alone. In such cases, for example, the difference information generation section 632 generates difference information in cases in which the collation confidence level determined for the identification of the travelling position of the vehicle on the map data is high, as illustrated in FIG. 27.

However, in cases in which it is determined that the collation confidence level is low, the difference information generation section 632 assumes that the positioning path matches the lane graph. Then, the difference information generation section 632 may project the positioning path onto the road surface image of the map data, carry out processing to generate difference information as illustrated in FIG. 28 above, and determine whether or not to perform calculation of the difference values included in the difference information.

Moreover, difference information may be generated according to the comparison result between the positioning path and the lane graph obtained by the lane graph comparison section 631 alone. In such cases, for example, in cases in which it is determined that the positioning path and the lane graph do not match, the difference information generation section 632 may generate difference information based on the respective part regions of the road surface image generated by the travelling position identification section 630 and the respective part regions on the positioning path generated by the positioning path generation section 629, as illustrated in FIG. 30 above.

However, in cases in which it is determined that the positioning path and the lane graph match, the difference information generation section 632 may assume that the position of the vehicle at the current moment along the positioning path is a position on the road surface image of the map data, and may carry out processing to generate difference information, as illustrated in FIG. 27 above. Alternatively, the difference information generation section 632 may determine that the difference values included in the difference information are not to be calculated.

Figure 34:
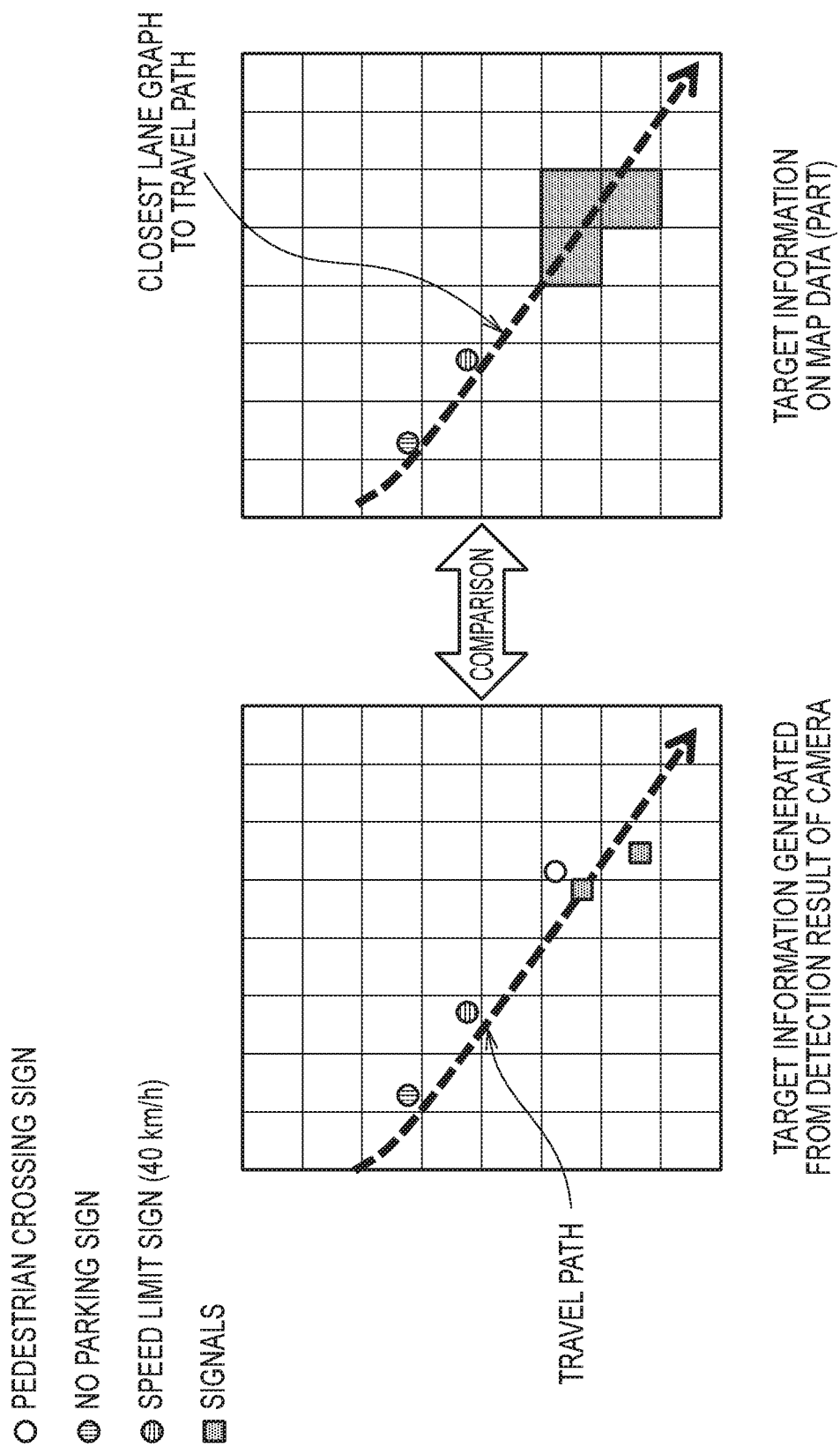
FIG. 34 is an explanatory diagram for explaining a case in which difference information is generated using target object information.

Explanation has been given in the sixth exemplary embodiment regarding an example of a case in which difference information indicating the difference between the road surface image generated by the travelling position identification section 630 and the road surface image of the map data stored in the map database 620 is generated in cases in which the road surface image is included in the map data; however, there is no limitation thereto. For example, in cases in which target information (for example, type or position information such as signals or signage) like that illustrated in FIG. 34 is included in the map data, difference information can also be generated in relation to target information detected using the vehicle sensor during the difference information generation. The target information is an example of surrounding environment information generated from the external environment information.

In such cases, the identification result of the travelling position of the vehicle on the map data identified by the travelling position identification section 630 and the difference, between the target information at the collation position on the map data and the target information generated from the detection result corresponding to that collation position detected by the vehicle sensor, may be calculated as difference information, according to the identification result obtained by the lane graph comparison section 631.

For example, the target information of the map data in the vicinity of the lane graph that most resembles the target information generated from the detection result by the vehicle camera, as illustrated by the diagram at the left side of FIG. 34, and the travelling position, as illustrated by the diagram at the right side of FIG. 34, may be divided into part regions, the discrepancy between the types and amounts of targets in the corresponding respective part regions may be found, and the discrepancy in the amount may be taken as difference information.

Seventh Exemplary Embodiment

Next, explanation follows regarding a seventh exemplary embodiment. Portions configured similar to those of the first to sixth exemplary embodiment are allocated the same reference numbers, and explanation thereof is omitted.

The seventh exemplary embodiment differs from the first to sixth exemplary embodiments in that the travelling position identification section and the position error measurement section that were installed at the on-board device side are installed at the server side.

It is possible to transmit large volumes of image data from the on-board device to the server, and when the processing performance of the server is high, the travelling position identification section and the position error measurement section of the first exemplary embodiment can be carried out at the server side. The data to be transmitted in such cases is the position of the vehicle and the image data. Moreover, in cases in which the processing mentioned above is carried out at the server side, error information is generated by individually processing data from plural vehicles, and individually generated error information is registered.

Figure 35:
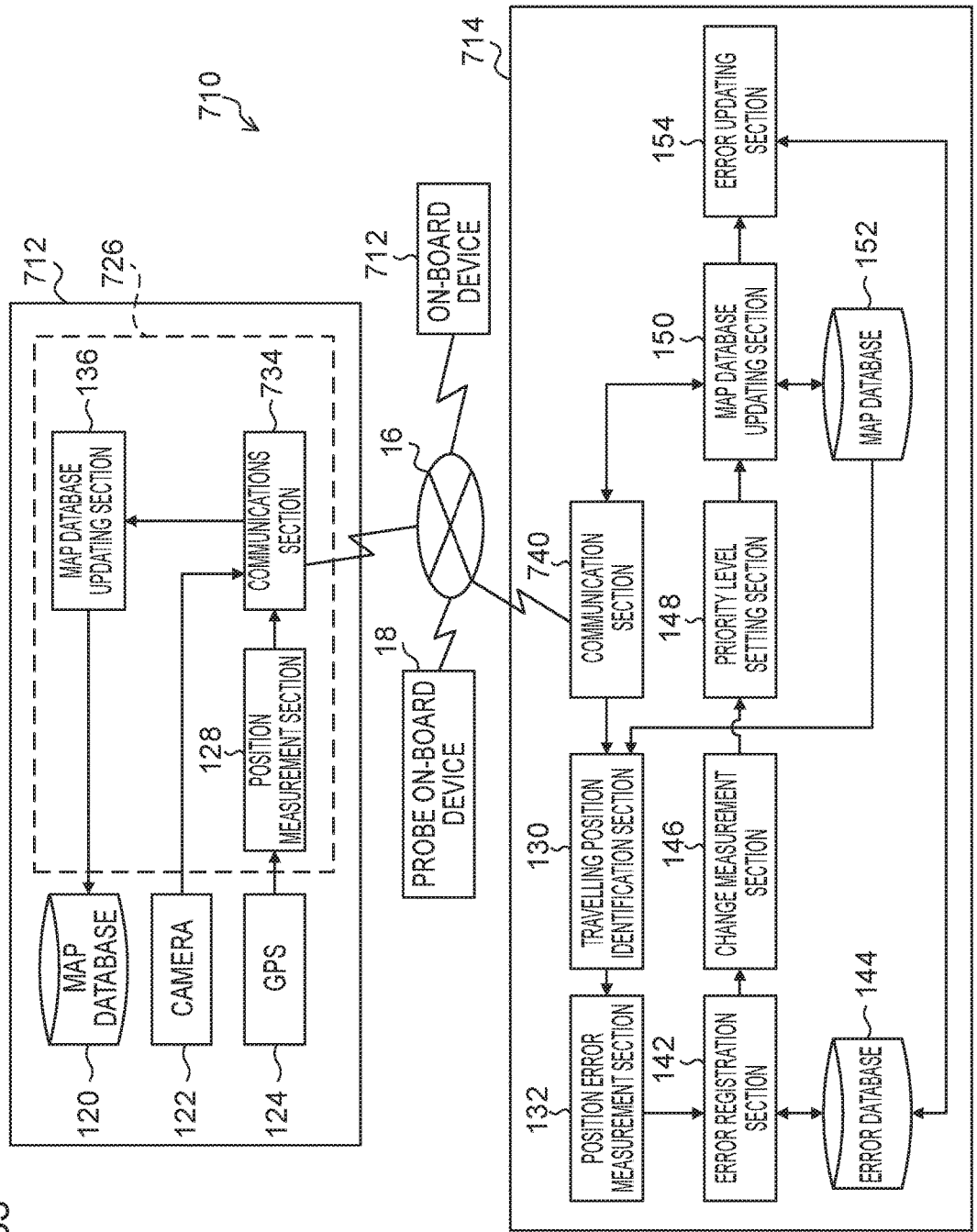
FIG. 35 is a block diagram illustrating a map data updating system according to a seventh exemplary embodiment.

Configuration of Map Data Updating System 710 According to Seventh Exemplary Embodiment As illustrated in FIG. 35, a map data updating system 710 according to the seventh exemplary embodiment includes an on-board device 712, a server 714, and a probe on-board device 18. The on-board device 712, the server 714, and the probe on-board device 18 are connected together via a network 16 such as the internet. The on-board device 712 is an example of an installed device. The on-board device 712 is installed to a vehicle. The server 714 receives information transmitted from the on-board device 712, generates the error information, and updates a map database according to the error information. The probe on-board device 18 transmits, to the server 714, sensor information for updating the map data, based on a signal output from the server 714.

On-Board Device 712

The on-board device 712 includes a map database 120, a camera 122, a GPS 124, and a computer 726. The on-board device 712 is installed to a vehicle.

The map data is stored in the map database 120. The camera 122 captures images of the surroundings of the vehicle. The GPS 124 receives a satellite signal transmitted from a positioning satellite. The computer 726 transmits the image of the surroundings of the vehicle captured by the camera 122 and the satellite signal received by the GPS 124.

The computer 726 includes a CPU, RAM, and ROM storing a program for executing a transmission processing routine, described later. The computer 726 is functionally configured as follows. The computer 726 includes a position measurement section 128, a communications section 734, and a map database updating section 136. The communications section 734 transmits, to the server 714, the position of the vehicle measured by the position measurement section 128 and a surrounding image of the surroundings of the vehicle captured by the camera 122. The map database updating section 136 updates the map data stored in the map database 120 according to the map data update information transmitted from the server 714.

Server 714

The server 714 is configured as a server that includes a CPU, ROM storing, for example, a program for implementing a processing routine, described later, RAM that temporarily stores data, memory serving as a storage unit, a network interface, and the like. The server 714 can be functionally represented as being configured by a communication section 740, a travelling position identification section 130, a position error measurement section 132, an error registration section 142, an error database 144, a change measurement section 146, a priority level setting section 148, a map database updating section 150, a map database 152, and an error updating section 154.

The communication section 740 receives the satellite signal and the surrounding image of the surroundings of the vehicle transmitted from the on-board device 712. The travelling position identification section 130 identifies a travelling position of the vehicle on the map data based on the position of the vehicle and the surrounding images of the surroundings of the vehicle received by the communication section 740. The position error measurement section 132 computes the error information indicating the difference between the position of the vehicle received by the communication section 740 and the travelling position of the vehicle identified by the travelling position identification section 130. The error registration section 142 stores the error information calculated by the position error measurement section 132 in the error database 144 in association with a site corresponding to the position information indicating the position of the vehicle and received by the communication section 740 and the travelling position of the vehicle identified by the travelling position identification section 130. Error information is stored in the error database 144. The change measurement section 146 measures the amount of change in the error information stored in the error database 144. The priority level setting section 148 sets the priority level for a map data update based on the amount of change measured by the change measurement section 146. The map database updating section 150 updates the map data based on the priority level set by the priority level setting section 148. The map data is stored in the map database 152. The error updating section 154 updates the error information stored in the error database 144.

For each vehicle, the travelling position identification section 130 identifies a travelling position of the vehicle on the map data based on the position of the vehicle received by the communication section 740 and the surrounding image of the vehicle surroundings.

For each vehicle, the position error measurement section 132 computes error information indicating the difference between the position of the vehicle received by the communication section 740 and the travelling position of the vehicle identified by the travelling position identification section 130.

Map Data Updating System Operation

Next, explanation follows regarding operation of the map data updating system 710 according to the seventh exemplary embodiment.

First, explanation follows regarding operation of the on-board device 712. When respective vehicles installed with the on-board device 712 are travelling, the communications section 734 of the on-board device 712 of each vehicle transmits, to the server 714, the position of the vehicle measured by the position measurement section 128 and the surrounding image of the surroundings of the vehicle captured by the camera 122.

Figure 36:
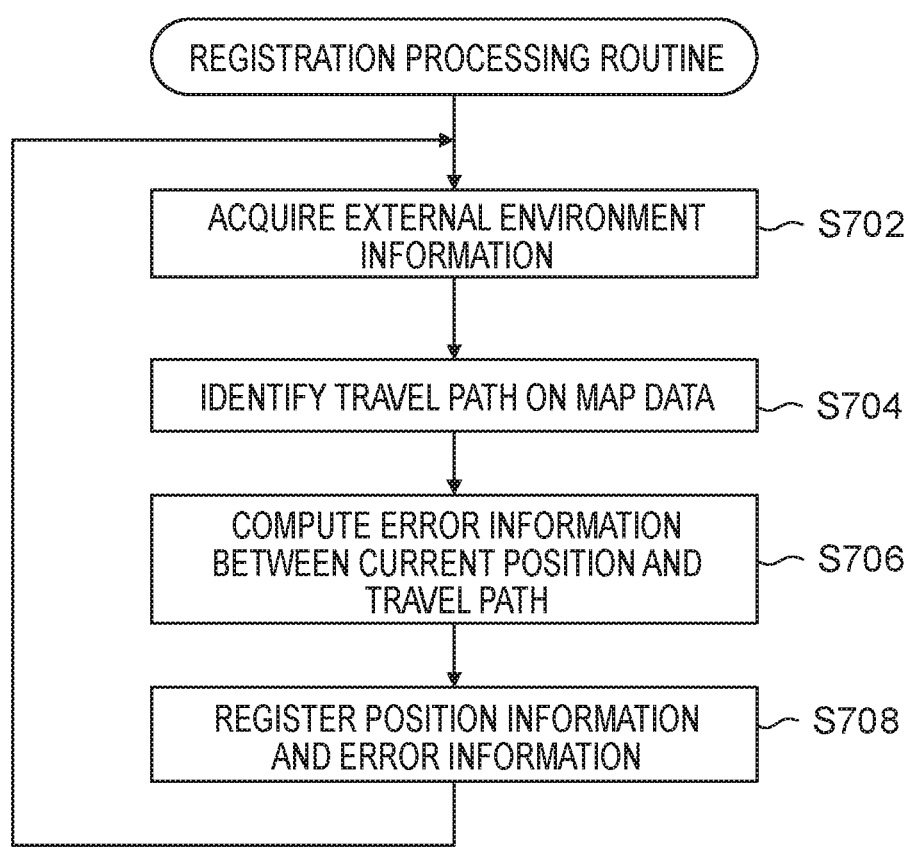
FIG. 36 is a flowchart illustrating content of a registration processing routine on a server according to a seventh exemplary embodiment.

Next, explanation follows regarding operation of the server 714. When the position of the vehicle and the surrounding image of the surroundings of the vehicle transmitted from the on-board device 712 are received by the communication section 740 of the server 714, the server 714 executes the registration processing routine illustrated in FIG. 36 for each of the vehicles.

Registration Processing Routine

At step S702, the travelling position identification section 130 acquires the surrounding image of the vehicle surroundings received by the communication section 740 as external environment information.

At step S704, the travelling position identification section 130 identifies a travelling position of the vehicle on the map data based on the position of the vehicle received by the communication section 740 and the surrounding image of the surroundings of the vehicle acquired at step S702 mentioned above, and the map data stored in the map database 152.

At step S706, the position error measurement section 132 computes difference information indicating the difference between the position of the vehicle received by the communication section 740 and the travelling position of the vehicle identified at step S704.

At step S708, the error registration section 142 stores the error information computed at step S706 mentioned above in the error database 144 in association with the site corresponding to the position information of the vehicle.

As explained above, the map data updating system of the seventh exemplary embodiment computes the error information indicating the difference between the position of the vehicle measured by the position measurement section 128 provided to the on-board device, and the travelling position identified by the travelling position identification section 130 provided to the server. Then, the map data updating system stores the error information in the error database in association with the computed error information and position information, and, based on the error information corresponding to the position information stored in the error database, sets the priority level corresponding to that position information. The need for an update at respective positions in the map data can thereby be determined.

Note that the present exemplary embodiment is not limited to the exemplary embodiments explained using each of the drawings, and various modifications may be made within a range not departing from the spirit thereof.

For example, the system configuration explained for the seventh exemplary embodiment above may be applied to the second and fifth exemplary embodiment. In such cases, configuration is made such that the position measurement section is provided at the on-board device side, and the travelling position identification section, travel path generation section, vehicle motion estimation section, integrated path generation section, and position error measurement section are provided at the server side.

Moreover, the system configuration explained for the seventh exemplary embodiment above may be applied to the sixth exemplary embodiment. In such cases, the position measurement section may be provided to the on-board device side, and the travelling position identification section, the positioning path generation section, the lane graph comparison section, and the difference information generation section may be provided to the server side.

Although explanation has been given regarding an example of a case in which the position measurement section 128 measures the position of the vehicle based on the satellite signal received by the GPS 124 in the exemplary embodiments above, there is no limitation thereto, and the position of the vehicle may be measured by a combination of the satellite signal received by the GPS 124 and a controller area network (CAN) (for example, vehicle speed, yaw angular velocity, and the like) or the like. Alternatively, the position measurement section 128 may measure the current position of the vehicle based on a past measurement result for the position of the vehicle.

Although an explanation has been given regarding an example of a case in which the road surface image over which the vehicle is travelling is recorded for respective sites on the map data stored in the map database in the exemplary embodiments above, there is no limitation thereto. For example, three-dimensional position information (for example, distance information) regarding solid objects in the surroundings through which the vehicle is travelling may be recorded for respective sites on the map data. In cases in which three-dimensional position information regarding solid objects is recorded for respective sites on the map data, the travelling position identification section may identify the travelling position using the three-dimensional position information regarding solid objects obtained from a stereocamera, or using three-dimensional position information regarding solid objects from a laser radar, and generate difference information in the three-dimensional information.

Although explanation has been given regarding an example of a case in which the change measurement section computes average values of difference information recorded for each site as the amount of change in the exemplary embodiments above, there is no limitation thereto, and the amount of change may be computed using another method.

Although explanation has been given regarding an example of a case in which the vehicle motion estimation section estimates the motion amount of the vehicle based on the external environment information of the vehicle or the travelling state of the vehicle in the exemplary embodiments above, there is no limitation thereto. For example, the motion amount of the vehicle may be estimated based on the external environment information of the vehicle and the travelling state of the vehicle.

Although explanation has been given regarding an example of a case in which the vehicle and the probe vehicle are distinct in the exemplary embodiments above, there is no limitation thereto, and the vehicle and the probe vehicle need not be distinct.

In the first to sixth exemplary embodiments above, explanation has been given regarding an example of a case in which the position measurement section and a travelling position measurement section are provided at the on-board device side, and in the seventh exemplary embodiment, explanation has been given regarding a case in which the travelling position measurement section is provided at the server side. However, there is no limitation thereto. The placement of the respective processing sections to the on-board devices and the server may be any placement as long as the placement enables the map data updating system of the exemplary embodiments to be implemented.

In the present specification, explanation has been given regarding exemplary embodiments in which the program is pre-installed; however, the program may be provided stored on a recording medium that is readable by a computer, or may be provided over a network. The respective sections of the devices of the exemplary embodiments may also be configured using software.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
    a memory storing a difference database; and
    a first processor programmed to:
        determine a position of a moving object based on a satellite signal transmitted from a positioning satellite;
        determine a travelling position of the moving object on map data identified based on (i) at least one of the position of the moving object or external environment information indicating an environment of surroundings of the moving object and (ii) the map data;
        associate (A) difference information indicating a difference between (a) the determined position of the moving object and (b) the determined travelling position of the moving object, with (B) position information indicating at least one of the position of the moving object or the travelling position, and stores the associated information in a difference database; and
        for each item of the position information:
            measure an average of the difference information associated with the item of position information as an amount of change, based on the difference information associated with the position information stored in the difference database,
            determine a time series of the measured average of the difference information associated with the item of position information, and
            set information for updating the map data based on the average of past difference information and the average of current difference information.

2. The information processing device of claim 1, wherein, for each item of the position information, the first processor measures a variance of the difference information associated with the item of position information as the amount of change, based on the difference information associated with the position information stored in the difference database, and sets information indicating whether or not the map data associated with the item of position information is to be updated based on a time series of the measured variance of the difference information associated with the item of position information.

3. The information processing device of claim 1, wherein, for each item of the position information, the first processor measures the number of items of the difference information associated with the item of position information of a predetermined threshold value or greater as the amount of change, based on the difference information associated with the position information stored in the difference database, and sets information indicating whether or not the map data associated with the item of position information is to be updated based on a time series of the measured number of items of difference information associated with the item of position information.

4. A map data updating system, comprising:
an installed device that is installed in a moving object; and
the information processing device of claim 1, wherein the installed device comprises:
a second processor programmed to:
   detect external environment information indicating an environment of the surroundings of the moving object;
   measure the position of the moving object based on a satellite signal transmitted from a positioning satellite; and
   transmit, to the information processing device, the detected external environment information and the measured position information indicating the position of the moving object, and
wherein, in the information processing device, the first processor associates the difference information indicating the difference between positions of the moving object measured by the second processor with the position information, and stores the difference information in a difference database.

5. The map data updating system of claim 4, wherein:
the second processor programmed to:
   identify the travelling position of the moving object on map data based on the map data and on at least one of the position of the moving object measured by the second processor or the external environment information detected by the second processor that detects external environment information indicating the environment of the surroundings of the moving object;
   compute difference information indicating the difference between the position of the moving object measured by the second processor and the identified travelling position; and
   transmit, to the information processing device, the computed difference information, and the position information indicating at least one of the position of the moving object measured by the second processor or the identified travelling position;
the first processor of the information processing device is further programmed to receive the difference information and the position information transmitted by the second processor; and
the first processor stores the difference information in the difference database in association with the received position information.

6. The map data updating system of claim 5, wherein:
the second processor of the installed device is further programmed to determine whether or not the difference information and the position information are to be transmitted, according to at least one of the computed difference information, a travelling date and time at which the moving object was travelling, or a number of times that the moving object has travelled through a place on the map data associated with the position information; and
the second processor transmits the difference information and the position information according to the determination result.

7. The map data updating system of claim 4, wherein:
the second processor of the installed device is further programmed to determine whether or not data is to be transmitted from the installed device, according to at least one of a travelling date and time at which the moving object was travelling, or a number of times that the moving object has travelled through a position on the map data; and
the second processor transmits the data according to the determination result.

8. The map data updating system of claim 4, wherein:
the second processor of the installed device is further programmed to update the map data based on information set by the first processor indicating whether or not the map data is to be updated; and
a travelling position of the moving object on the map data is identified based on the external environment information and the updated map data.

9. An information processing device, comprising:
a memory storing a difference database; and
a first processor programmed to:
   determine a travel path of a moving object generated from a time series of travelling positions of the moving object on map data, the travel path being identified based on external environment information indicating an environment of surroundings of the moving object and on the map data;
   determine an integrated path of the moving object generated from a time series of motion amounts of the moving object generated based on at least one of the external environment information or a travelling state of the moving object;
   associate (A) difference information indicating a difference between (a) the travel path of the moving object, and (b) the integrated path of the moving object, with (B) position information indicating a travelling position;
   store the associated information in the difference database; and
   for each item of the position information:
      measure an average of the difference information associated with the item of position information as an amount of change, based on the difference information associated with the position information stored in the difference database,
      determine a time series of the measured average of the difference information associated with the item of position information, and
      set information for updating the map data based on the average of past difference information and the average of current difference information.

10. A map data updating system, comprising:
an installed device that is installed in a moving object; and
the information processing device of claim 9, wherein the installed device comprises a second processor programmed to:
   detect external environment information indicating an environment of the surroundings of the moving object; and
   transmit the detected external environment information to the information processing device, and
wherein, in the information processing device, the first processor associates the difference information indicating a difference in the travel path generated from a time series of travelling positions identified based on the detected external environment information, with the position information indicating the travelling position, and stores the associated difference information in the difference database.

11. The map data updating system of claim 10, wherein:
the second processor of the installed device is further programmed to:

identify the travelling position of the moving object on map data, based on the detected external environment information and the map data, generate the travel path of the moving object based on a time series of the identified travelling positions, estimate an amount of movement of the moving object based on at least one of the external environment information or the travelling state of the moving object, generate an integrated path of the moving object based on a time series of the estimated motion amounts, compute the difference information indicating the difference between the generated travel path and the generated integrated path, and transmit the computed difference information, and position information indicating the identified travelling position, to the information processing device;

the first processor of the information processing device is further programmed to receive the difference information and the position information transmitted by the second processor; and the first processor stores the difference information in the difference database in association with the position information received by the second processor.

12. An information processing device, comprising:
a memory storing a difference database; and
a first processor programmed to:
  associate (A) difference information indicating a difference between (a) at least one of surrounding environment information generated from external environment information indicating an environment of surroundings of a moving object or a positioning path of the moving object generated from a position of the moving object, and (b) map data, the difference information being generated according to at least one of (i) a result of a comparison between the position of the moving object measured based on a satellite signal transmitted from a positioning satellite and road information included in the map data, or (ii) an identification result for a travelling position of the moving object on the map data identified from the external environment information and the map data, with (B) position information indicating at least one of a position of the moving object or the travelling position;
  store the associated information in the difference database; and
  for each item of the position information:
    measure an average of the difference information associated with the item of position information as an amount of change, based on the difference information associated with the position information stored in the difference database,
    determine a time series of the measured average of the difference information associated with the item of position information, and
    set information for updating the map data based on the average of past difference information and the average of current difference information.

13. The information processing device of claim 12, wherein:
the difference information is generated for a predetermined range over which difference information is to be generated, according to at least one of a result of a comparison of the positioning path of the moving object generated from positions of the moving object against the road information included in the map data, or an identification result for a travelling position of the moving object in the predetermined range on the map data for which the difference information is to be generated, the identification result being identified from the external environment information and the map data; and the difference information is generated for each of a plurality of part regions derived by dividing a region of a predetermined range over which the difference information is to be generated.

14. A map data updating system, comprising:
an installed device that is installed in a moving object; and
the information processing device of claim 12, wherein:
the installed device comprises a second processor programmed to:
  detect external environment information indicating an environment of the surroundings of the moving object,
  measure positions of the moving object based on a satellite signal transmitted from a positioning satellite, and
  transmit the detected external environment information, and the measured position information indicating a position of the moving object, to the information processing device; and in the information processing device, the first processor associates (1) difference information that is generated according to at least one of the identification result or a result of comparing the positioning path of the moving object generated from the measured position of the moving object against the road information included in the map data, and that indicates a difference between the map data and at least one of surrounding environment information generated from the external environment information or the positioning path of the moving object generated from the positions of the moving object, with (2) at least one of the position of the moving object or the travelling position, and stores the difference information in the difference database.

15. The map data updating system of claim 14, wherein:
the second processor of the installed device further is further programmed to:
  compare the measured position of the moving object against the road information included in the map data,
  identify a travelling position of the moving object on the map data based on the map data and at least one of the measured position of the moving object unit or the detected external environment information detected by the second processor that detects external environment information indicating an environment of the surroundings of the moving object,
  generate difference information indicating a difference between the external environment information and the map data, based on at least one of the comparison result or the identification result, and
  transmit, to the information processing device, the generated difference information, and the position information indicating at least one of the measured position of the moving object or the identified travelling position;

the first processor of the information processing device is further programmed to receive the difference information and the position information transmitted by the second processor; and the first processor stores the difference information in the difference database in association with the position information received by the first processor.

16. A non-transitory computer readable medium storing a program executable by a computer to perform a process for information processing, the process comprising:
- associating (A) difference information indicating a difference between (a) a position of a moving object measured based on a satellite signal transmitted from a positioning satellite and (b) a travelling position of the moving object on map data identified based on (i) at least one of the position of the moving object or external environment information indicating an environment of surroundings of the moving object and (ii) the map data, with (B) position information indicating at least one of the position of the moving object or the travelling position;
- storing the associated information in a difference database; and
- for each item of the position information:
  - measure an average of the difference information associated with the item of position information as an amount of change, based on the difference information associated with the position information stored in the difference database,
  - determine a time series of the measured average of the difference information associated with the item of position information, and
  - set information for updating the map data based on the average of past difference information and the average of current difference information.

17. A non-transitory computer readable medium storing a program executable by a computer to perform a process for information processing, the process comprising:
- associating (A) difference information indicating a difference between (a) a travel path of a moving object generated from a time series of travelling positions of the moving object on map data identified based on external environment information indicating an environment of surroundings of the moving object and on the map data, and (b) an integrated path of the moving object generated from a time series of motion amounts of the moving object generated based on at least one of the external environment information or a travelling state of the moving object, with (B) position information indicating the travelling position;
- storing the associated information in a difference database; and
- for each item of the position information:
  - measure an average of the difference information associated with the item of position information as an amount of change, based on the difference information associated with the position information stored in the difference database,
  - determine a time series of the measured average of the difference information associated with the item of position information, and
  - set information for updating the map data based on the average of past difference information and the average of current difference information.

18. A non-transitory computer readable medium storing a program executable by a computer to perform a process for information processing, the process comprising:
- associating (A) difference information indicating a difference between (a) at least one of surrounding environment information generated from external environment information indicating an environment of surroundings of a moving object or a positioning path of the moving object generated from positions of the moving object, and (b) map data, the difference information being generated according to at least one of (i) a result of a comparison between a position of the moving object measured based on a satellite signal transmitted from a positioning satellite and road information included in the map data, or (ii) an identification result for a travelling position of the moving object on the map data identified from the external environment information and the map data, with (B) position information indicating at least one of a position of the moving object or the travelling position, and
- storing the associated information in a difference database; and
- for each item of the position information:
  - measure an average of the difference information associated with the item of position information as an amount of change, based on the difference information associated with the position information stored in the difference database,
  - determine a time series of the measured average of the difference information associated with the item of position information, and
  - set information for updating the map data based on the average of past difference information and the average of current difference information.

* * * * *